(12) United States Patent
Pivac et al.

(10) Patent No.: US 12,175,164 B2
(45) Date of Patent: Dec. 24, 2024

(54) PATH CORRECTION FOR END EFFECTOR CONTROL

(71) Applicant: FASTBRICK IP PTY LTD, High Wycombe (AU)

(72) Inventors: Mark Joseph Pivac, Lesmurdie (AU); James Gary Robertson, Huntingdale (AU)

(73) Assignee: FASTBRICK IP PTY LTD, High Wycombe (AU)

( * ) Notice: Subject to any disclaimer, the term of this patent is extended or adjusted under 35 U.S.C. 154(b) by 344 days.

(21) Appl. No.: 16/631,424

(22) PCT Filed: Jul. 16, 2018

(86) PCT No.: PCT/AU2018/050740
§ 371 (c)(1),
(2) Date: Jan. 15, 2020

(87) PCT Pub. No.: WO2019/014707
PCT Pub. Date: Jan. 24, 2019

(65) Prior Publication Data
US 2020/0215688 A1    Jul. 9, 2020

(30) Foreign Application Priority Data

Jul. 17, 2017    (WO) ................ PCT/AU2017/050739

(51) Int. Cl.
*B25J 5/00*      (2006.01)
*B25J 9/02*      (2006.01)
(Continued)

(52) U.S. Cl.
CPC ............... *G06F 30/13* (2020.01); *B25J 5/00* (2013.01); *B25J 9/023* (2013.01); *B25J 9/161* (2013.01);
(Continued)

(58) Field of Classification Search
CPC ..... B25J 9/162; B25J 5/00; B25J 5/007; B25J 9/1664; B25J 13/089; B25J 9/1635;
(Continued)

(56) References Cited

U.S. PATENT DOCUMENTS 1,633,192 A    6/1927    Reagan
1,829,435 A    10/1931   Barnhart
(Continued)

FOREIGN PATENT DOCUMENTS

AU    645640 B2    1/1994
CH    673498 A     3/1990
(Continued)

OTHER PUBLICATIONS

Delgado, R. et al.: "Development and Control of an Omnidirectional Mobile Robot on an EtherCAT Network", International Journal of Applied Engineering Research, vol. 11, No. 21, 2016, pp. 10586-10592, XP055574484.

(Continued)

*Primary Examiner* — Stephen Holwerda
*Assistant Examiner* — Tanner L Cullen
(74) *Attorney, Agent, or Firm* — Perkins Coie LLP

(57) ABSTRACT

A system for performing interactions within a physical environment including a robot base that undergoes movement relative to the environment, a robot arm mounted to the robot base, the robot arm including an end effector mounted thereon and a tracking system that measures a robot base position indicative of a position of the robot base relative to the environment. A control system acquires an indication of an end effector destination, determines a reference robot base position, calculates an end effector path extending to the end effector destination and repeatedly determines a current robot base position using signals from the tracking system, calculates a correction based on the current robot (Continued)

base position, the correction being indicative of a path modification, and controls the robot arm in accordance with the correction to move the end effector towards the end effector destination.

18 Claims, 34 Drawing Sheets

(51) Int. Cl.
| | |
|---|---|
| *B25J 9/16* | (2006.01) |
| *B25J 13/08* | (2006.01) |
| *B25J 19/02* | (2006.01) |
| *B28D 1/00* | (2006.01) |
| *B28D 1/10* | (2006.01) |
| *B28D 1/18* | (2006.01) |
| *B28D 7/00* | (2006.01) |
| *B28D 7/04* | (2006.01) |
| *B60P 1/48* | (2006.01) |
| *E04B 1/02* | (2006.01) |
| *E04G 21/22* | (2006.01) |
| *G05B 19/4097* | (2006.01) |
| *G05B 19/416* | (2006.01) |
| *G06F 16/00* | (2019.01) |
| *G06F 16/17* | (2019.01) |
| *G06F 30/13* | (2020.01) |
| *B60P 3/28* | (2006.01) |
| *B66C 13/22* | (2006.01) |
| *E04B 2/04* | (2006.01) |
| *E04F 21/02* | (2006.01) |
| *G01C 15/00* | (2006.01) |
| *G01S 17/66* | (2006.01) |
| *G06F 111/20* | (2020.01) |

(52) U.S. Cl.
CPC ............ *B25J 9/1612* (2013.01); *B25J 9/162* (2013.01); *B25J 9/1633* (2013.01); *B25J 9/1635* (2013.01); *B25J 9/1638* (2013.01); *B25J 9/1651* (2013.01); *B25J 9/1664* (2013.01); *B25J 9/1674* (2013.01); *B25J 9/1679* (2013.01); *B25J 9/1684* (2013.01); *B25J 9/1694* (2013.01); *B25J 13/089* (2013.01); *B25J 19/021* (2013.01); *B25J 19/022* (2013.01); *B28D 1/003* (2013.01); *B28D 1/10* (2013.01); *B28D 1/186* (2013.01); *B28D 7/005* (2013.01); *B28D 7/04* (2013.01); *B60P 1/48* (2013.01); *E04B 1/02* (2013.01); *E04G 21/22* (2013.01); *G05B 19/4097* (2013.01); *G05B 19/416* (2013.01); *G06F 16/00* (2019.01); *G06F 16/1734* (2019.01); *B25J 9/1697* (2013.01); *B60P 3/28* (2013.01); *B66C 13/22* (2013.01); *E04B 2/04* (2013.01); *E04F 21/023* (2013.01); *G01C 15/002* (2013.01); *G01S 17/66* (2013.01); *G05B 2219/35207* (2013.01); *G05B 2219/39001* (2013.01); *G05B 2219/40257* (2013.01); *G05B 2219/45086* (2013.01); *G06F 2111/20* (2020.01)

(58) Field of Classification Search
CPC ............ B25J 5/02; G05B 2219/45086; G05B 2219/39172; G05B 2219/40298; G05B 2219/40513; G05B 2219/40623; G05B 2219/39033; G05B 2219/40257; G05B 2219/40292; E04G 21/22
See application file for complete search history.

(56) References Cited

U.S. PATENT DOCUMENTS

| | | |
|---|---|---|
| 3,438,171 A | 4/1969 | Demarest |
| 3,757,484 A | 9/1973 | Williamson et al. |
| 3,790,428 A | 2/1974 | Lingl |
| RE28,305 E | 1/1975 | Williamson et al. |
| 3,930,929 A | 1/1976 | Lingl |
| 3,950,914 A | 4/1976 | Lowen |
| 4,033,463 A | 7/1977 | Cervin |
| 4,106,259 A | 8/1978 | Taylor-smith |
| 4,221,258 A | 9/1980 | Richard |
| 4,245,451 A | 1/1981 | Taylor-smith |
| 4,303,363 A | 12/1981 | Cervin |
| 4,523,100 A | 6/1985 | Payne |
| 4,708,562 A | 11/1987 | Melan et al. |
| 4,714,339 A | 12/1987 | Lau |
| 4,758,036 A | 7/1988 | Legille et al. |
| 4,765,789 A | 8/1988 | Lonardi et al. |
| 4,790,651 A | 12/1988 | Brown et al. |
| 4,827,689 A | 5/1989 | Lonardi et al. |
| 4,852,237 A | 8/1989 | Tradt et al. |
| 4,911,595 A | 3/1990 | Kirchen et al. |
| 4,945,493 A | 7/1990 | Huang et al. |
| 4,952,772 A | 8/1990 | Zana |
| 4,954,762 A | 9/1990 | Miyake et al. |
| 4,969,789 A | 11/1990 | Searle |
| 5,004,844 A | 4/1991 | Van et al. |
| 5,013,986 A | 5/1991 | Gauggel |
| 5,018,923 A | 5/1991 | Melan et al. |
| 5,049,797 A | 9/1991 | Phillips |
| 5,080,415 A | 1/1992 | Bjornson |
| 5,196,900 A | 3/1993 | Pettersen |
| 5,284,000 A | 2/1994 | Milne et al. |
| 5,321,353 A | 6/1994 | Furness |
| 5,403,140 A | 4/1995 | Carmichael et al. |
| 5,413,454 A | 5/1995 | Movsesian |
| 5,419,669 A | 5/1995 | Kremer et al. |
| 5,420,489 A | 5/1995 | Hansen et al. |
| 5,469,531 A | 11/1995 | Faure et al. |
| 5,497,061 A | 3/1996 | Nonaka et al. |
| 5,523,663 A | 6/1996 | Tsuge et al. |
| 5,527,145 A | 6/1996 | Duncan |
| 5,557,397 A | 9/1996 | Hyde et al. |
| 5,737,500 A | 4/1998 | Seraji et al. |
| 5,838,882 A | 11/1998 | Gan et al. |
| 6,018,923 A | 2/2000 | Wendt |
| 6,049,377 A | 4/2000 | Lau et al. |
| 6,101,455 A | 8/2000 | Davis |
| 6,134,507 A | 10/2000 | Markey, Jr. et al. |
| 6,166,809 A | 12/2000 | Pettersen et al. |
| 6,166,811 A | 12/2000 | Long et al. |
| 6,172,754 B1 | 1/2001 | Niebuhr |
| 6,213,309 B1 | 4/2001 | Dadisho |
| 6,285,959 B1 | 9/2001 | Greer |
| 6,310,644 B1 | 10/2001 | Keightley |
| 6,330,503 B1 | 12/2001 | Sharp et al. |
| 6,370,837 B1 | 4/2002 | Mcmahon et al. |
| 6,427,122 B1 | 7/2002 | Lin |
| 6,429,016 B1 | 8/2002 | Mcneil |
| 6,512,993 B2 | 1/2003 | Kacyra et al. |
| 6,516,272 B2 | 2/2003 | Lin |
| 6,584,378 B1 | 6/2003 | Anfindsen |
| 6,611,141 B1 | 8/2003 | Schulz |
| 6,618,496 B1 | 9/2003 | Tassakos et al. |
| 6,628,322 B1 | 9/2003 | Cerruti |
| 6,643,002 B2 | 11/2003 | Drake, Jr. |
| 6,664,529 B2 | 12/2003 | Pack et al. |
| 6,681,145 B1 | 1/2004 | Greenwood et al. |
| 6,683,694 B2 | 1/2004 | Cornil |
| 6,704,619 B1 | 3/2004 | Coleman et al. |
| 6,741,364 B2 | 5/2004 | Lange et al. |
| 6,825,937 B1 | 11/2004 | Gebauer et al. |
| 6,850,946 B1 | 2/2005 | Rappaport et al. |
| 6,859,729 B2 | 2/2005 | Breakfield et al. |
| 6,864,966 B2 | 3/2005 | Giger |
| 6,868,847 B2 | 3/2005 | Ainedter et al. |
| 6,873,880 B2 | 3/2005 | Hooke et al. |

(56) References Cited

U.S. PATENT DOCUMENTS

| | | |
|---|---|---|
| 6,917,893 B2 | 7/2005 | Dietsch et al. |
| 6,935,036 B2 | 8/2005 | Barber et al. |
| 6,957,496 B2 | 10/2005 | Raab et al. |
| 6,965,843 B2 | 11/2005 | Hobden et al. |
| 6,970,802 B2 | 11/2005 | Ban et al. |
| 6,996,912 B2 | 2/2006 | Raab et al. |
| 7,044,314 B2 | 5/2006 | Nayfeh |
| 7,050,930 B2 | 5/2006 | Hobden et al. |
| 7,051,450 B2 | 5/2006 | Barber et al. |
| 7,069,664 B2 | 7/2006 | Barber et al. |
| 7,107,144 B2 | 9/2006 | Capozzi et al. |
| 7,111,437 B2 | 9/2006 | Ainedter |
| 7,130,034 B2 | 10/2006 | Barvosa-carter et al. |
| 7,142,981 B2 | 11/2006 | Hablani |
| 7,145,647 B2 | 12/2006 | Suphellen et al. |
| 7,153,454 B2 | 12/2006 | Khoshnevis |
| 7,174,651 B2 | 2/2007 | Barber et al. |
| 7,230,689 B2 | 6/2007 | Lau |
| 7,246,030 B2 | 7/2007 | Raab et al. |
| 7,269,910 B2 | 9/2007 | Raab et al. |
| 7,305,094 B2 | 12/2007 | Kashani |
| 7,347,311 B2 | 3/2008 | Rudge |
| 7,519,493 B2 | 4/2009 | Atwell et al. |
| 7,551,121 B1 | 6/2009 | Oconnell et al. |
| 7,564,538 B2 | 7/2009 | Sakimura et al. |
| 7,570,371 B1 | 8/2009 | Storm |
| 7,576,836 B2 | 8/2009 | Bridges |
| 7,576,847 B2 | 8/2009 | Bridges |
| 7,591,078 B2 | 9/2009 | Crampton |
| 7,639,347 B2 | 12/2009 | Eaton |
| 7,693,325 B2 | 4/2010 | Pulla et al. |
| 7,701,587 B2 | 4/2010 | Shioda et al. |
| 7,774,159 B2 | 8/2010 | Cheng et al. |
| 7,800,758 B1 | 9/2010 | Bridges et al. |
| 7,804,602 B2 | 9/2010 | Raab |
| RE42,055 E | 1/2011 | Raab et al. |
| RE42,082 E | 2/2011 | Raab et al. |
| 7,881,896 B2 | 2/2011 | Atwell et al. |
| 7,967,549 B2 | 6/2011 | Geist et al. |
| 7,993,289 B2 | 8/2011 | Quistgaard et al. |
| 8,036,452 B2 | 10/2011 | Pettersson et al. |
| 8,054,451 B2 | 11/2011 | Karazi et al. |
| 8,060,344 B2 | 11/2011 | Stathis |
| 8,145,446 B2 | 3/2012 | Atwell et al. |
| 8,166,727 B2 | 5/2012 | Pivac et al. |
| 8,169,604 B2 | 5/2012 | Braghiroli et al. |
| 8,185,240 B2 | 5/2012 | Williams et al. |
| 8,195,368 B1 | 6/2012 | Leban et al. |
| 8,229,208 B2 | 7/2012 | Pulla et al. |
| 8,233,153 B2 | 7/2012 | Knuettel |
| 8,244,030 B2 | 8/2012 | Pettersson et al. |
| 8,248,620 B2 | 8/2012 | Wicks et al. |
| 8,269,984 B2 | 9/2012 | Hinderling et al. |
| 8,287,522 B2 | 10/2012 | Moses |
| 8,322,468 B2 | 12/2012 | Nagasaka |
| 8,327,555 B2 | 12/2012 | Champ |
| 8,337,407 B2 | 12/2012 | Quistgaard et al. |
| 8,345,926 B2 | 1/2013 | Clark et al. |
| 8,346,392 B2 | 1/2013 | Walser et al. |
| 8,352,129 B2 | 1/2013 | Yuan et al. |
| 8,401,698 B2 | 3/2013 | Kamrani |
| 8,405,716 B2 | 3/2013 | Yu et al. |
| 8,467,072 B2 | 6/2013 | Cramer et al. |
| 8,467,888 B2 | 6/2013 | Gahinet |
| 8,537,372 B2 | 9/2013 | Siercks et al. |
| 8,537,376 B2 | 9/2013 | Day et al. |
| 8,558,992 B2 | 10/2013 | Steffey |
| 8,588,974 B2 | 11/2013 | Aoba |
| 8,593,648 B2 | 11/2013 | Cramer et al. |
| 8,595,948 B2 | 12/2013 | Raab et al. |
| 8,606,399 B2 | 12/2013 | Williams et al. |
| 8,634,950 B2 | 1/2014 | Simonetti et al. |
| 8,644,964 B2 | 2/2014 | Hendron et al. |
| 8,670,114 B2 | 3/2014 | Bridges et al. |
| 8,677,643 B2 | 3/2014 | Bridges et al. |
| 8,792,709 B2 | 7/2014 | Pulla et al. |
| 8,803,055 B2 | 8/2014 | Lau et al. |
| 8,812,155 B2 | 8/2014 | Brethe |
| 8,825,208 B1 | 9/2014 | Benson |
| 8,832,954 B2 | 9/2014 | Atwell et al. |
| 8,848,203 B2 | 9/2014 | Bridges et al. |
| 8,875,409 B2 | 11/2014 | Kretschmer et al. |
| 8,898,919 B2 | 12/2014 | Bridges et al. |
| 8,902,408 B2 | 12/2014 | Bridges |
| 8,913,814 B2 | 12/2014 | Gandyra |
| 8,931,182 B2 | 1/2015 | Raab et al. |
| 8,942,940 B2 | 1/2015 | York |
| 8,965,571 B2 | 2/2015 | Peters et al. |
| 8,996,244 B2 | 3/2015 | Summer et al. |
| 8,997,362 B2 | 4/2015 | Briggs et al. |
| 9,020,240 B2 | 4/2015 | Pettersson et al. |
| 9,033,998 B1 | 5/2015 | Schaible et al. |
| RE45,565 E | 6/2015 | Bridges et al. |
| 9,046,360 B2 | 6/2015 | Atwell et al. |
| 9,074,381 B1 | 7/2015 | Drew |
| 9,109,877 B2 | 8/2015 | Thierman |
| 9,146,315 B2 | 9/2015 | Bosse et al. |
| 9,151,830 B2 | 10/2015 | Bridges |
| 9,163,922 B2 | 10/2015 | Bridges et al. |
| 9,170,096 B2 | 10/2015 | Fowler et al. |
| 9,188,430 B2 | 11/2015 | Atwell et al. |
| 9,207,309 B2 | 12/2015 | Bridges |
| 9,223,025 B2 | 12/2015 | Debrunner et al. |
| 9,229,108 B2 | 1/2016 | Debrunner et al. |
| 9,266,238 B2 | 2/2016 | Huettenhofer |
| 9,267,784 B2 | 2/2016 | Atwell et al. |
| 9,278,448 B2 | 3/2016 | Freeman |
| 9,279,661 B2 | 3/2016 | Tateno et al. |
| 9,303,988 B2 | 4/2016 | Tani |
| 9,353,519 B2 | 5/2016 | Williams |
| 9,354,051 B2 | 5/2016 | Dunne et al. |
| 9,358,688 B2 | 6/2016 | Drew |
| 9,367,741 B2 | 6/2016 | Le Marec |
| 9,377,301 B2 | 6/2016 | Neier et al. |
| 9,383,200 B2 | 7/2016 | Hulm et al. |
| 9,395,174 B2 | 7/2016 | Bridges |
| 9,405,293 B2 | 8/2016 | Meuleau |
| 9,423,282 B2 | 8/2016 | Moy |
| 9,437,005 B2 | 9/2016 | Tateno et al. |
| 9,443,308 B2 | 9/2016 | Pettersson et al. |
| 9,452,533 B2 | 9/2016 | Calkins et al. |
| 9,454,818 B2 | 9/2016 | Cramer |
| 9,476,695 B2 | 10/2016 | Becker et al. |
| 9,482,524 B2 | 11/2016 | Metzler et al. |
| 9,482,525 B2 | 11/2016 | Bridges |
| 9,482,746 B2 | 11/2016 | Bridges |
| 9,494,686 B2 | 11/2016 | Maryfield et al. |
| 9,513,100 B2 | 12/2016 | Raab et al. |
| 9,536,163 B2 | 1/2017 | Veeser et al. |
| 9,541,371 B2 | 1/2017 | Pettersson et al. |
| 9,561,019 B2 | 2/2017 | Mihailescu et al. |
| 9,593,046 B2 | 3/2017 | Bastelberger |
| 9,607,239 B2 | 3/2017 | Bridges et al. |
| 9,618,620 B2 | 4/2017 | Zweigle et al. |
| 9,658,061 B2 | 5/2017 | Wilson et al. |
| 9,671,221 B2 | 6/2017 | Ruhland et al. |
| 9,679,385 B2 | 6/2017 | Suzuki et al. |
| 9,686,532 B2 | 6/2017 | Tohme |
| 9,708,079 B2 | 7/2017 | Desjardien et al. |
| 9,715,730 B2 | 7/2017 | Suzuki |
| 9,720,087 B2 | 8/2017 | Christen et al. |
| 9,734,609 B2 | 8/2017 | Pulla et al. |
| 9,739,595 B2 | 8/2017 | Lau |
| 9,746,308 B2 | 8/2017 | Gong |
| 9,757,859 B1 | 9/2017 | Kolb et al. |
| 9,768,837 B2 | 9/2017 | Charvat et al. |
| 9,772,173 B2 | 9/2017 | Atwell et al. |
| 9,803,969 B2 | 10/2017 | Gong |
| 9,816,813 B2 | 11/2017 | Lettau et al. |
| 9,829,305 B2 | 11/2017 | Gong |
| 9,835,717 B2 | 12/2017 | Bosse et al. |
| 9,844,792 B2 | 12/2017 | Pettersson et al. |
| 9,879,976 B2 | 1/2018 | Bridges et al. |
| 9,897,442 B2 | 2/2018 | Pettersson et al. |

(56) References Cited

U.S. PATENT DOCUMENTS

| | | |
|---|---|---|
| 9,903,939 B2 | 2/2018 | Charvat et al. |
| 9,909,855 B2 | 3/2018 | Becker et al. |
| 9,915,733 B2 | 3/2018 | Fried et al. |
| 9,921,046 B2 | 3/2018 | Gong |
| 9,958,268 B2 | 5/2018 | Ohtomo et al. |
| 9,958,545 B2 | 5/2018 | Eichenholz et al. |
| 9,964,398 B2 | 5/2018 | Becker et al. |
| 9,964,402 B2 | 5/2018 | Tohme et al. |
| 9,967,545 B2 | 5/2018 | Tohme |
| 9,987,746 B2 | 6/2018 | Bradski |
| 9,989,353 B2 | 6/2018 | Bartmann et al. |
| 10,012,732 B2 | 7/2018 | Eichenholz et al. |
| 10,030,972 B2 | 7/2018 | Iseli et al. |
| 10,041,793 B2 | 8/2018 | Metzler et al. |
| 10,054,422 B2 | 8/2018 | Böckem et al. |
| 10,058,394 B2 | 8/2018 | Johnson et al. |
| 10,059,003 B1 | 8/2018 | Linnell et al. |
| 10,073,162 B2 | 9/2018 | Charvat et al. |
| 10,074,889 B2 | 9/2018 | Charvat et al. |
| 10,082,521 B2 | 9/2018 | Atlas et al. |
| 10,089,586 B2 | 10/2018 | Vestal |
| 10,090,944 B1 | 10/2018 | Charvat et al. |
| 10,094,909 B2 | 10/2018 | Charvat et al. |
| 10,126,415 B2 | 11/2018 | Becker et al. |
| 10,150,653 B2 | 12/2018 | Kyllingstad |
| 10,189,176 B2 | 1/2019 | Williams |
| 10,220,511 B2 | 3/2019 | Linnell et al. |
| 10,240,949 B2 | 3/2019 | Peters et al. |
| 10,437,252 B1 | 10/2019 | Liu et al. |
| 10,627,211 B2 | 4/2020 | Luthi |
| 10,744,645 B2 | 8/2020 | Wang et al. |
| 10,876,308 B2 | 12/2020 | Pivac et al. |
| 11,106,836 B2 | 8/2021 | Pivac et al. |
| 11,187,793 B1 | 11/2021 | Liu |
| 11,364,630 B2 | 6/2022 | Henriksson |
| 2001/0055525 A1* | 12/2001 | Inokuchi .................. B25J 5/06 |
| | | 414/730 |
| 2002/0126852 A1 | 9/2002 | Kashani |
| 2002/0176603 A1 | 11/2002 | Bauer et al. |
| 2003/0048459 A1 | 3/2003 | Gooch |
| 2003/0090682 A1 | 5/2003 | Gooch et al. |
| 2003/0120377 A1* | 6/2003 | Hooke .................. B25J 19/022 |
| | | 700/193 |
| 2003/0206285 A1 | 11/2003 | Lau |
| 2003/0208302 A1 | 11/2003 | Lemelson |
| 2004/0073343 A1 | 4/2004 | Nayfeh |
| 2004/0078137 A1 | 4/2004 | Breakfield et al. |
| 2004/0093119 A1 | 5/2004 | Gunnarsson et al. |
| 2004/0200947 A1 | 10/2004 | Lau |
| 2005/0007450 A1 | 1/2005 | Hill et al. |
| 2005/0057745 A1 | 3/2005 | Bontje |
| 2005/0060092 A1 | 3/2005 | Hablani |
| 2005/0086901 A1 | 4/2005 | Chisholm |
| 2005/0131619 A1 | 6/2005 | Rappaport et al. |
| 2005/0196484 A1 | 9/2005 | Khoshnevis |
| 2005/0252118 A1 | 11/2005 | Matsufuji |
| 2006/0167587 A1 | 7/2006 | Read |
| 2006/0215179 A1 | 9/2006 | Mcmurtry et al. |
| 2007/0024870 A1 | 2/2007 | Girard et al. |
| 2007/0106421 A1 | 5/2007 | Kamrani |
| 2007/0229802 A1 | 10/2007 | Lau |
| 2007/0284215 A1 | 12/2007 | Rudge |
| 2008/0030855 A1 | 2/2008 | Lau |
| 2008/0189046 A1 | 8/2008 | Eliasson et al. |
| 2008/0235970 A1 | 10/2008 | Crampton |
| 2009/0038258 A1 | 2/2009 | Pivac et al. |
| 2009/0074979 A1 | 3/2009 | Krogedal et al. |
| 2010/0025349 A1 | 2/2010 | Khoshnevis |
| 2010/0095835 A1 | 4/2010 | Yuan et al. |
| 2010/0138185 A1 | 6/2010 | Kang |
| 2010/0143089 A1 | 6/2010 | Hvass |
| 2010/0152899 A1 | 6/2010 | Chang et al. |
| 2010/0206651 A1 | 8/2010 | Nagasaka |
| 2010/0274390 A1 | 10/2010 | Walser et al. |
| 2010/0281822 A1 | 11/2010 | Murray |
| 2010/0312364 A1 | 12/2010 | Eryilmaz et al. |
| 2011/0043515 A1 | 2/2011 | Stathis |
| 2011/0066393 A1 | 3/2011 | Groll et al. |
| 2011/0153524 A1 | 6/2011 | Schnackel |
| 2011/0208347 A1 | 8/2011 | Otake et al. |
| 2012/0038074 A1 | 2/2012 | Khoshnevis |
| 2012/0053726 A1 | 3/2012 | Peters et al. |
| 2012/0099096 A1 | 4/2012 | Bridges et al. |
| 2012/0136524 A1 | 5/2012 | Everett et al. |
| 2012/0185089 A1 | 7/2012 | Schreiber |
| 2012/0265391 A1 | 10/2012 | Letsky |
| 2012/0277898 A1 | 11/2012 | Kawai et al. |
| 2013/0028478 A1 | 1/2013 | St-pierre et al. |
| 2013/0068061 A1 | 3/2013 | Yoon |
| 2013/0103192 A1* | 4/2013 | Huettenhofer ........... B25J 9/162 |
| | | 700/245 |
| 2013/0104407 A1 | 5/2013 | Lee |
| 2013/0222816 A1 | 8/2013 | Briggs et al. |
| 2013/0250285 A1 | 9/2013 | Bridges et al. |
| 2013/0286196 A1 | 10/2013 | Atwell |
| 2013/0297046 A1* | 11/2013 | Hendron .................. E02F 9/265 |
| | | 700/56 |
| 2013/0310982 A1 | 11/2013 | Scheurer |
| 2014/0002608 A1 | 1/2014 | Atwell et al. |
| 2014/0067121 A1 | 3/2014 | Brooks et al. |
| 2014/0176677 A1 | 6/2014 | Valkenburg et al. |
| 2014/0192187 A1 | 7/2014 | Atwell et al. |
| 2014/0309960 A1 | 10/2014 | Vennegeerts et al. |
| 2014/0343727 A1 | 11/2014 | Calkins et al. |
| 2014/0348388 A1 | 11/2014 | Metzler et al. |
| 2014/0365258 A1 | 12/2014 | Vestal |
| 2014/0366481 A1 | 12/2014 | Benson |
| 2014/0376768 A1 | 12/2014 | Troy |
| 2015/0082740 A1 | 3/2015 | Peters et al. |
| 2015/0100066 A1 | 4/2015 | Kostrzewski et al. |
| 2015/0134303 A1 | 5/2015 | Chang et al. |
| 2015/0153720 A1 | 6/2015 | Pettersson et al. |
| 2015/0158181 A1* | 6/2015 | Kawamura ............ B25J 9/1697 |
| | | 700/259 |
| 2015/0165620 A1 | 6/2015 | Osaka |
| 2015/0166413 A1 | 6/2015 | Crampton |
| 2015/0241203 A1 | 8/2015 | Jordil et al. |
| 2015/0258694 A1 | 9/2015 | Hand et al. |
| 2015/0276402 A1 | 10/2015 | Grsser et al. |
| 2015/0280829 A1 | 10/2015 | Breuer |
| 2015/0293596 A1 | 10/2015 | Krausen et al. |
| 2015/0309175 A1 | 10/2015 | Hinderling et al. |
| 2015/0314890 A1 | 11/2015 | Desjardien et al. |
| 2015/0345959 A1 | 12/2015 | Meuleau |
| 2015/0352721 A1 | 12/2015 | Wicks et al. |
| 2015/0355310 A1 | 12/2015 | Gong et al. |
| 2015/0367509 A1 | 12/2015 | Georgeson |
| 2015/0371082 A1 | 12/2015 | Csaszar et al. |
| 2015/0377606 A1 | 12/2015 | Thielemans |
| 2016/0005185 A1 | 1/2016 | Geissler |
| 2016/0093099 A1 | 3/2016 | Bridges |
| 2016/0153786 A1 | 6/2016 | Liu et al. |
| 2016/0187130 A1 | 6/2016 | Metzler et al. |
| 2016/0187470 A1 | 6/2016 | Becker et al. |
| 2016/0194183 A1 | 7/2016 | Kyllingstad |
| 2016/0221187 A1 | 8/2016 | Bradski |
| 2016/0223364 A1 | 8/2016 | Peters et al. |
| 2016/0239013 A1* | 8/2016 | Troy ....................... B25J 9/1664 |
| 2016/0242744 A1 | 8/2016 | Mihailescu et al. |
| 2016/0263767 A1 | 9/2016 | Williams |
| 2016/0274237 A1 | 9/2016 | Stutz |
| 2016/0282107 A1 | 9/2016 | Roland et al. |
| 2016/0282110 A1 | 9/2016 | Vagman et al. |
| 2016/0282179 A1 | 9/2016 | Nazemi et al. |
| 2016/0288331 A1 | 10/2016 | Sivich et al. |
| 2016/0292918 A1 | 10/2016 | Cummings et al. |
| 2016/0313114 A1 | 10/2016 | Tohme et al. |
| 2016/0318187 A1 | 11/2016 | Tani |
| 2016/0327383 A1 | 11/2016 | Becker et al. |
| 2016/0340873 A1 | 11/2016 | Eidenberger et al. |
| 2016/0341041 A1 | 11/2016 | Puura et al. |
| 2016/0349746 A1 | 12/2016 | Grau |
| 2016/0363436 A1 | 12/2016 | Clark et al. |
| 2016/0363659 A1 | 12/2016 | Mindell et al. |

(56) References Cited

U.S. PATENT DOCUMENTS

| | | |
|---|---|---|
| 2016/0363663 A1 | 12/2016 | Mindell et al. |
| 2016/0363664 A1 | 12/2016 | Mindell et al. |
| 2016/0364869 A1 | 12/2016 | Siercks et al. |
| 2016/0364874 A1 | 12/2016 | Tohme et al. |
| 2017/0028550 A1* | 2/2017 | Terada .................... B25J 9/162 |
| 2017/0066157 A1 | 3/2017 | Peters et al. |
| 2017/0067739 A1 | 3/2017 | Siercks et al. |
| 2017/0071680 A1 | 3/2017 | Swarup |
| 2017/0082436 A1 | 3/2017 | Siercks et al. |
| 2017/0091922 A1 | 3/2017 | Siercks et al. |
| 2017/0091923 A1 | 3/2017 | Siercks et al. |
| 2017/0108528 A1 | 4/2017 | Atlas et al. |
| 2017/0122733 A1 | 5/2017 | Brown |
| 2017/0122736 A1 | 5/2017 | Dold et al. |
| 2017/0166399 A1 | 6/2017 | Stubbs |
| 2017/0173795 A1 | 6/2017 | Tan et al. |
| 2017/0173796 A1 | 6/2017 | Kim et al. |
| 2017/0176572 A1 | 6/2017 | Charvat et al. |
| 2017/0179570 A1 | 6/2017 | Charvat |
| 2017/0179603 A1 | 6/2017 | Charvat et al. |
| 2017/0191822 A1 | 7/2017 | Becker et al. |
| 2017/0225330 A1 | 8/2017 | Wagner |
| 2017/0227355 A1 | 8/2017 | Pettersson et al. |
| 2017/0236299 A1 | 8/2017 | Valkenburg et al. |
| 2017/0254102 A1 | 9/2017 | Peters et al. |
| 2017/0269203 A1 | 9/2017 | Trishaun |
| 2017/0291805 A1 | 10/2017 | Hao et al. |
| 2017/0307757 A1 | 10/2017 | Hinderling et al. |
| 2017/0314909 A1 | 11/2017 | Dang |
| 2017/0314918 A1 | 11/2017 | Shah |
| 2017/0329321 A1 | 11/2017 | Dai et al. |
| 2017/0333137 A1 | 11/2017 | Roessler |
| 2017/0343336 A1 | 11/2017 | Lettau |
| 2017/0371342 A1* | 12/2017 | Hashimoto ............. B25J 9/043 |
| 2018/0001479 A1* | 1/2018 | Li .......................... B25J 9/1684 |
| 2018/0003493 A1 | 1/2018 | Bernhard et al. |
| 2018/0017384 A1 | 1/2018 | Siercks et al. |
| 2018/0023935 A1 | 1/2018 | Atwell et al. |
| 2018/0038684 A1 | 2/2018 | Fröhlich et al. |
| 2018/0046096 A1 | 2/2018 | Shibazaki |
| 2018/0052233 A1 | 2/2018 | Frank et al. |
| 2018/0093380 A1* | 4/2018 | Yoshida ................ B25J 13/088 |
| 2018/0108178 A1 | 4/2018 | Murugappan et al. |
| 2018/0121571 A1 | 5/2018 | Tiwari et al. |
| 2018/0149469 A1 | 5/2018 | Becker et al. |
| 2018/0156601 A1 | 6/2018 | Pontai |
| 2018/0168749 A1 | 6/2018 | Dozeman |
| 2018/0170719 A1 | 6/2018 | Tasch et al. |
| 2018/0180416 A1 | 6/2018 | Edelman et al. |
| 2018/0202796 A1 | 7/2018 | Ziegenbein |
| 2018/0209156 A1 | 7/2018 | Pettersson |
| 2018/0222047 A1* | 8/2018 | Nishi ...................... B25J 5/007 |
| 2018/0239010 A1 | 8/2018 | Mindell et al. |
| 2018/0283017 A1 | 10/2018 | Telleria et al. |
| 2018/0300433 A1 | 10/2018 | Maxam et al. |
| 2019/0026401 A1 | 1/2019 | Benjamin et al. |
| 2019/0032348 A1 | 1/2019 | Parkes |
| 2019/0099902 A1 | 4/2019 | Yamamoto et al. |
| 2019/0184555 A1 | 6/2019 | Linnell et al. |
| 2019/0224846 A1 | 7/2019 | Pivac et al. |
| 2019/0251210 A1 | 8/2019 | Pivac et al. |
| 2019/0316369 A1 | 10/2019 | Pivac et al. |
| 2019/0352146 A1 | 11/2019 | Pivac et al. |
| 2020/0009730 A1 | 1/2020 | Henriksson |
| 2020/0173777 A1 | 6/2020 | Pivac et al. |
| 2020/0206923 A1 | 7/2020 | Pivac et al. |
| 2020/0206924 A1 | 7/2020 | Pivac et al. |
| 2020/0215692 A1 | 7/2020 | Pivac et al. |
| 2020/0215693 A1 | 7/2020 | Pivac et al. |
| 2020/0324981 A1 | 10/2020 | Pivac et al. |
| 2021/0016437 A1 | 1/2021 | Pivac et al. |
| 2021/0016438 A1 | 1/2021 | Pivac et al. |
| 2021/0080582 A1 | 3/2021 | Pivac et al. |
| 2021/0291362 A1 | 9/2021 | Pivac et al. |
| 2021/0370509 A1 | 12/2021 | Pivac et al. |
| 2021/0379775 A1 | 12/2021 | Pivac et al. |

FOREIGN PATENT DOCUMENTS

| | | |
|---|---|---|
| CN | 2730976 Y | 10/2005 |
| CN | 2902981 Y | 5/2007 |
| CN | 2923903 Y | 7/2007 |
| CN | 101100903 A | 1/2008 |
| CN | 201184054 Y | 1/2009 |
| CN | 101360873 B | 2/2009 |
| CN | 101476883 A | 7/2009 |
| CN | 100557169 C | 11/2009 |
| CN | 101694130 A | 4/2010 |
| CN | 201972413 U | 9/2011 |
| CN | 102359282 A | 2/2012 |
| CN | 202248944 U | 5/2012 |
| CN | 202292752 U | 7/2012 |
| CN | 102995911 A | 3/2013 |
| CN | 103042527 A | 4/2013 |
| CN | 202925913 U | 5/2013 |
| CN | 103363902 A | 10/2013 |
| CN | 103698769 A | 4/2014 |
| CN | 203701626 U | 7/2014 |
| CN | 104141391 B2 | 11/2014 |
| CN | 104153591 A | 11/2014 |
| CN | 104493810 A | 4/2015 |
| CN | 204295678 U | 4/2015 |
| CN | 104612411 A | 5/2015 |
| CN | 204311767 U | 5/2015 |
| CN | 103774859 B | 11/2015 |
| CN | 103753586 B | 12/2015 |
| CN | 105113373 A | 12/2015 |
| CN | 105178616 A | 12/2015 |
| CN | 105257008 B | 1/2016 |
| CN | 105452806 A | 3/2016 |
| CN | 105544998 A | 5/2016 |
| CN | 104806028 B | 11/2016 |
| CN | 205668271 U | 11/2016 |
| CN | 205840368 U | 12/2016 |
| CN | 205990775 U | 3/2017 |
| CN | 106607907 A | 5/2017 |
| CN | 206185879 U | 5/2017 |
| CN | 206189878 U | 5/2017 |
| CN | 105089274 B | 6/2017 |
| CN | 105064699 B | 7/2017 |
| CN | 107217859 A | 9/2017 |
| CN | 107237483 A | 10/2017 |
| CN | 107357294 A | 11/2017 |
| CN | 107605167 A | 1/2018 |
| CN | 206844687 U | 1/2018 |
| CN | 107654077 A | 2/2018 |
| CN | 107675891 A | 2/2018 |
| CN | 107740591 A | 2/2018 |
| CN | 106088632 B | 3/2018 |
| CN | 107762165 A | 3/2018 |
| CN | 207063553 U | 3/2018 |
| CN | 106088631 B | 5/2018 |
| CN | 107975245 A | 5/2018 |
| CN | 108061551 A | 5/2018 |
| CN | 108222527 A | 6/2018 |
| CN | 108301628 A | 7/2018 |
| CN | 108331362 A | 7/2018 |
| CN | 106150109 B | 8/2018 |
| CN | 108457479 A | 8/2018 |
| CN | 108708560 A | 10/2018 |
| CN | 208023979 U | 10/2018 |
| CN | 106881711 A | 4/2019 |
| CN | 107083845 A | 6/2019 |
| CN | 108016585 B | 7/2019 |
| DE | 3430915 C2 | 3/1986 |
| DE | 4038260 C2 | 6/1991 |
| DE | 4207384 A1 | 9/1993 |
| DE | 19509809 A1 | 10/1995 |
| DE | 4417928 A1 | 11/1995 |
| DE | 29601535 U1 | 5/1997 |
| DE | 19600006 A1 | 7/1997 |
| DE | 19603234 C2 | 9/1997 |

(56) References Cited

FOREIGN PATENT DOCUMENTS

| | | |
|---|---|---|
| DE | 19743717 C2 | 4/1999 |
| DE | 19849720 A1 | 5/2000 |
| DE | 10230021 C1 | 7/2003 |
| DE | 102006030130 B3 | 9/2007 |
| DE | 102009014766 A1 | 9/2010 |
| DE | 102009018070 A1 | 10/2010 |
| DE | 102009042014 A1 | 3/2011 |
| DE | 202012100646 U1 | 6/2013 |
| DE | 102013019869 A1 | 5/2015 |
| EP | 190076 A1 | 8/1986 |
| EP | 370682 A2 | 5/1990 |
| EP | 456020 A1 | 1/1995 |
| EP | 493020 B1 | 4/1995 |
| EP | 495525 B1 | 4/1995 |
| EP | 836664 B1 | 1/1999 |
| EP | 674069 B1 | 12/1999 |
| EP | 1375083 A2 * | 1/2004 ............ B25J 9/1692 |
| EP | 1918478 A2 | 5/2008 |
| EP | 2112291 A1 | 10/2009 |
| EP | 2219528 A1 | 8/2010 |
| EP | 2249997 A1 | 11/2010 |
| EP | 2353801 A2 | 8/2011 |
| EP | 2631040 A2 * | 8/2013 ............ B25J 19/005 |
| EP | 2199719 B1 | 10/2014 |
| EP | 3084719 A1 | 10/2016 |
| ES | 2296556 A1 | 4/2008 |
| FR | 2230825 A1 | 12/1974 |
| FR | 2524522 A1 | 10/1983 |
| GB | 119331 A | 10/1918 |
| GB | 2198105 A | 5/1923 |
| GB | 673472 A | 6/1952 |
| GB | 682010 A | 11/1952 |
| GB | 839253 A | 6/1960 |
| GB | 1067604 A | 5/1967 |
| GB | 1465068 A | 2/1977 |
| GB | 125079 | 12/2001 |
| GB | 2422400 A | 7/2006 |
| JP | 64006719 A | 1/1989 |
| JP | H07101509 A | 11/1999 |
| JP | 2005283600 A | 10/2005 |
| JP | 4294990 B2 | 4/2009 |
| JP | 2009521630 A | 6/2009 |
| JP | 5508895 B2 | 3/2014 |
| LU | 87054 A1 | 6/1989 |
| LU | 87381 A1 | 6/1990 |
| LU | 88144 A1 | 4/1994 |
| RU | 85392 U1 | 8/2009 |
| WO | 9702397 A1 | 1/1997 |
| WO | 2001076830 A1 | 10/2001 |
| WO | 2004020760 A1 | 3/2004 |
| WO | 2004083540 A3 | 2/2005 |
| WO | 2005014240 A1 | 2/2005 |
| WO | 2005017550 A2 | 2/2005 |
| WO | 2005070657 A1 | 8/2005 |
| WO | 2004011734 A1 | 11/2005 |
| WO | 2006111827 A1 | 10/2006 |
| WO | 2007076581 A1 | 7/2007 |
| WO | WO-2008110559 A2 * | 9/2008 ............ B25J 13/089 |
| WO | 2008124713 A2 | 10/2008 |
| WO | 2009026641 A1 | 3/2009 |
| WO | 2009026642 A1 | 3/2009 |
| WO | 2010020457 A1 | 2/2010 |
| WO | 2011077006 A2 | 6/2011 |
| WO | 2013088154 A1 | 6/2013 |
| WO | 2013134559 A1 | 9/2013 |
| WO | 2015142784 A1 | 9/2015 |
| WO | 2017162630 A1 | 9/2017 |
| WO | 2018009978 A1 | 1/2018 |
| WO | 2018009980 A1 | 1/2018 |
| WO | 2018009981 A1 | 1/2018 |
| WO | 2018009985 A1 | 1/2018 |
| WO | 2018009986 A1 | 1/2018 |
| WO | 2018052469 A3 | 4/2018 |
| WO | 201899323 A1 | 6/2018 |
| WO | 2018149502 A1 | 8/2018 |
| WO | 2019006511 A1 | 1/2019 |
| WO | 2019014701 A1 | 1/2019 |
| WO | 2019014702 A1 | 1/2019 |
| WO | 2019014705 A1 | 1/2019 |
| WO | 2019014706 A1 | 1/2019 |
| WO | 2019014707 A1 | 1/2019 |
| WO | 2019033165 A1 | 2/2019 |
| WO | 2019033166 A1 | 2/2019 |
| WO | 2019033170 A1 | 2/2019 |
| WO | 2019068128 A1 | 4/2019 |
| WO | 2019071313 A1 | 4/2019 |

OTHER PUBLICATIONS

Dorfler, K. et al.: "Mobile Robotic Brickwork, Automation of a Discrete Robotic Fabrication Process Using an Autonomous Mobile Robot Robotic Fabrication in Architecture", Art and Design 2016, Feb. 4, 2016 (Feb. 4, 2016), pp. 204-217, XP055567451.

Egerstedt, M. et al.: "Control of Mobile Platforms using a Virtual Vehicle Approach", IEEE Transactions on Automatic Control, vol. 46, No. 11, Nov. 2001 (Nov. 1, 2001), XP055567515.

Fastbrick Robotics, Fastbrick Robotics: Hadrian 105 First Look Revealed, Nov. 16, 2015 (Nov. 16, 2015), XP054978174, Retrieved from the Internet <URL:https://www.youtube.com/watch?v=7Zw7qHxMtrY> [retrieved on Nov. 16, 2015].

Fastbrick Robotics: Hadrian 105 Demonstrative Model Animation, Jun. 29, 2015 (Jun. 29, 2015), XP054979424, Retrieved from the Internet <URL:https://www.youtube.com/watch?v=Rebqcsb61gY> [retrieved on Mar. 7, 2018].

Fastbrick Robotics: Hadrian 105 Time Lapse, Fastbrick Robotics Time Lapse, May 22, 2016 (May 22, 2016), XP054978173, Retrieved from the Internet <URL:https://www.youtube.com/watch?v=4YcrO8ONcfY> [retrieved on May 22, 2016].

Feng, C. et al.: "Vision Guided Autonomous Robotic Assembly and as-built Scanning on Unstructured Construction Sites", Automation in Construction, vol. 59, Nov. 2015 (Nov. 1, 2015), pp. 128-138, XP055567454.

Gao, X. et al.: "Complete Solution Classification for the Perspective-Three-Point Problem", IEEE Transactions on Pattern Analysis and Machine Intelligence, vol. 25, No. 8, Aug. 2003 (Aug. 1, 2003), pp. 930-943, XP011099374.

Giftthaler, M. et al., "Efficient Kinematic Planning for Mobile Manipulators with Non-holonomic Constraints Using Optimal Control", 2017 IEEE International Conference on Robotics and Automation (ICRA), Singapore, May 29-Jun. 3, 2017.

Heintze, H., "Design and Control of a Hydraulically Actuated Industrial Brick Laying Robot," 264 pages.

Heintze, J. et al., "Controlled hydraulics for a direct drive brick laying robot," Automation in Construction 5 (1996), pp. 23-29.

Helm, V. et al.: "Mobile Robotic Fabrication on Construction Sites: dimRob", IEEE /RSJ International Conference on Intelligent Robots and Systems, Oct. 7, 2012 (Oct. 7, 2012), Vilamoura, Portugal, pp. 4335-4341, XP032287463.

http://www.new-technologies.org/ECT/Other/brickrob.htm. "Emerging Construction Technologies." Dec. 1, 2006.

Huang, S. et al., "Applying High-Speed Vision Sensing to an Industrial Robot for High-Performance Position Regulation under Uncertainties," Sensors, 2016, 16, 1195, 15 pages.

International Preliminary Report on Patentability for International Application No. PCT/AU2017/050731; Date of Mailing: Jan. 15, 2019; 5 pages.

International Preliminary Report on Patentability for International Application No. PCT/AU2017/050738; Date of Mailing: Jan. 15, 2019; 13 pages.

International Preliminary Report on Patentability for International Application No. PCT/AU2017/050739; Date of Mailing: Jan. 15, 2019; 6 pages.

International Preliminary Report on Patentability for International Application No. PCT/AU2018/050733; Date of Mailing: Jan. 21, 2020; 6 pages.

International Preliminary Report on Patentability for International Application No. PCT/AU2018/050734; Date of Mailing: Jan. 21, 2020; 9 pages.

(56) References Cited

OTHER PUBLICATIONS

International Preliminary Report on Patentability for International Application No. PCT/AU2018/050737; Date of Mailing: Jan. 21, 2020; 6 pages.
International Preliminary Report on Patentability for International Application No. PCT/AU2018/050739; Date of Mailing: Jan. 21, 2020; 6 pages.
International Preliminary Report on Patentability for International Application No. PCT/AU2018/050740; Date of Mailing: Jan. 21, 2020; 6 pages.
International Search Report and Written Opinion for International Application No. PCT/AU2017/050730; Date of Mailing: Aug. 23, 2017; 17 pages.
International Search Report and Written Opinion for International Application No. PCT/AU2017/050731; Date of Mailing: Aug. 31, 2017; 8 pages.
International Search Report and Written Opinion for International Application No. PCT/AU2017/050738; Date of Mailing: Oct. 17, 2017; 19 pages.
International Search Report and Written Opinion for International Application No. PCT/AU2017/050739; Date of Mailing: Sep. 28, 2017; 9 pages.
Kazemi, M. et al.: "Path Planning for Image-based Control of Wheeled Mobile Manipulators", 2012 IEEE /RSJ International Conference on Intelligent Robots and Systems, Oct. 7, 2012 (Oct. 7, 2012), Vilamoura, Portugal, XP055567470.
Kleinkes, M. et al.: "Laser Tracker and 6DoF measurement strategies in industrial robot applications", CMSC 2011: Coordinate Metrology System Conference, Jul. 25, 2011 (Jul. 25, 2011), XP055456272.
Koren et al.: "End-effector guidance of robot arms", CIRP Annals-Manufacturing Technology, vol. 36, No. 1, 1987, pp. 289-292, XP055456270.
Kwon, S. et al., "On the Coarse/Fine Dual-Stage Manipulators with Robust Perturbation Compensator," IEEE, May 21-26, 2001, pp. 121-126.
Kyle in CMSC: Charlotte-Concord, Jul. 21-25, 2008.
Latteur, et al., "Drone-Based Additive Manufacturing of Architectural Structures," IASS Symposium 2015, Amsterdam, The Netherlands; Aug. 17-20, 2015; 12 pages.
Lippiello, V. et al.: "Position-Based Visual Servoing in Industrial Multirobot Cells Using a Hybrid Camera Configuration", IEEE Transactions on Robotics, vol. 23, No. 1, Feb. 2007 (Feb. 1, 2007), XP011163518.
Liu, Z. et al.: "EtherCAT Based Robot Modular Joint Controller", Proceeding of The 2015 IEEE International Conference on Information and Automation, Aug. 2015 (Aug. 1, 2015), Lijiang, China, pp. 1708-1713, XP033222650.
Notice of Acceptance of Patent Application received for priority Australian Patent Application No. 2017294796, mailed May 15, 2019 (158 pages).
Pless, R .: "Using Many Cameras as One", IEEE Computer Society Conference on Computer Vision and Pattern Recognition, Jun. 18, 2003 (Jun. 18, 2003), Madison , WI, USA, pp. 1-7, XP055564465.
Posada et al.: "High accurate robotic drilling with external sensor and compliance model-based compensation", Robotics and Automation (ICRA), 2016 IEEE International Conference, May 16, 2016 (May 16, 2016), pp. 3901-3907, XP032908649.
Pritschow, G. et al., "A Mobile Robot for On-Site Construction of Masonry," Inst. Of Control Tech. for Machine Tools and Manuf. Units, pp. 1701-1707.
Pritschow, G. et al., "Application Specific Realisation of a Mobile Robot for On-Site Construction of Masonry," Automation and Robotics in Construction XI, 1994, pp. 95-102.
Pritschow, G. et al., "Configurable Control System of a Mobile Robot for On-Site Construction of Masonry," Inst. Of Control Technology for Machine Tools and Manuf. Units, pp. 85-92.
Pritschow, G. et al., "Technological aspects in the development of a mobile bricklaying robot," Automation in Construction 5 (1996), pp. 3-13.

Riegl Laser Measurement Systems. "Long Range & High Accuracy 3D Terrestrial Laser Scanner System—LMS-Z420i." pp. 1-4.
Salcudean, S. et al., "On the Control of Redundant Coarse-Fine Manipulators," IEEE, pp. 1834-1840.
Sandy, T. et al.: "Autonomous Repositioning and Localization of an In Situ Fabricator", 2016 IEEE International Conference on Robotics and Automation (ICRA), May 16, 2016 (May 16, 2016), pp. 2852-2858, XP055567467.
Skibniewski, M.J., "Current Status of Construction Automation and Robotics in the United States of America," The 9th International Symposium on Automation and Robotics in Construction, Jun. 3-5, 1992, 8 pages.
Trimble ATS. "Advanced Tracking Sensor (ATS) with target recognition capability for stakeless machine control survey applications." pp. 1-4.
Vincze, M. et al., "A Laser Tracking System to Measure Position and Orientation of Robot End Effectors Under Motion," The International Journal of Robotics Research, vol. 13, No. 4, Aug. 1994, pp. 305-314.
Warszawski, A. et al., "Implementation of Robotics in Building: Current Status and Future Prospects," Journal of Construction Engineering and Management, Jan./Feb. 1998, 124(1), pp. 31-41.
Willmann, J. et al.: "Robotic Timber Construction—Expanding Additive Fabrication to New Dimensions", Automation in Construction, vol. 61, 2016, pp. 16-23, XP029310896.
Xu, H. et al.: "Uncalibrated Visual Serving of Mobile Manipulators with an Eye-to-hand Camera", Proceedings of the 2016 IEEE International Conference on Robotics and Biomimetics, Dec. 3, 2016 (Dec. 3, 2016), Qingdao, China, pp. 2145-2150, XP033071767.
Yu, S.N. et al., "Feasibility verification of brick-laying robot using manipulation trajectory and the laying pattern optimization," Dept. of Mech. Eng., Automation in Construction (2009), pp. 644-655.
European search report issued Mar. 28, 2022 in European Patent Application No. 19837417.5, 10 pages.
European search report issued Mar. 7, 2022 in European Patent Application No. 19838430.7, 9 pages.
Examination report issued Feb. 24, 2022 in Australian Patent Application No. 2017295317, 3 pages.
Examination report issued Dec. 26, 2021 in Saudi Arabian Patent Application No. 519400899, 8 pages.
Examination report issued Feb. 9, 2022 in Chinese Patent Application No. 201880067520.0, with English translation, 14 pages.
Partial Supplementary European Search Report mailed Apr. 14, 2020 in European Patent Application No. 17826696.1, 10 pages.
Zaki, T., "Parametric modeling of Blackwall assemblies for automated generation of shop drawings and detailed estimates using BIM", Master's Thesis, May 23, 2016, pp. 1-151.
Boston Dynamics: "Introducing Spot (previously SpotMini)", Jun. 28, 2016, YouTube video, 1 page (screenshot of video); video retrieved at <https://www.youtube.com/watch?v=tf7lEVTDjng>.
Examination Report mailed Apr. 18, 2021 in GCC Patent Application No. 2018-35644, 5 pages.
Examination Report mailed Apr. 30, 2021 in GCC Patent Application No. 2018-35643, 3 pages.
Examination Report mailed Jun. 29, 2021 for India Patent Application No. 201927004006, 6 pages.
Examination Report mailed Sep. 30, 2021 for Australian Patent Application No. 2017295316, 3 pages.
Extended European Search Report mailed Jun. 4, 2021 for European Patent Application No. 18865644.1, 7 pages.
Extended European Search Report mailed Mar. 16, 2021 for European Patent Application No. 18834565.6, 19 pages.
Extended European Search Report mailed Mar. 17, 2021 for European Patent Application No. 18835861.8, 12 pages.
Extended European Search Report mailed Mar. 18, 2021 for European Patent Application No. 18834673.8, 14 pages.
Extended European Search Report mailed Mar. 18, 2021 for European Patent Application No. 18834893.2, 12 pages.
Extended European Search Report mailed Mar. 18, 2021 for European Patent Application No. 18835737.0, 10 pages.
Extended European Search Report mailed Mar. 30, 2021 for European Patent Application No. 18845794.9, 13 pages.

(56) References Cited

OTHER PUBLICATIONS

Extended European Search Report mailed Mar. 5, 2021 for European Patent Application No. 18828425.1, 7 pages.
Fastbrick Robotics: Hadrian X Digital Construction System, published on Sep. 21, 2016 <URL: https://www.youtube.com/watch?v=5bW1vuCgEaA >.
Gander H et al: "Application of a floating point digital signal processor to a dynamic robot measurement system", Instrumentation and Measurement Technology Conference, 1994. IMTC/94. Conference Proceedings. 10$^{th}$ Anniversary. Advanced Technologies in I & M., 1994 IEEE Hamamatsu, Japan May 10-12, 1994, New York, NY, USA, IEEE, May 10, 1994 (May 10, 1994), pp. 372-375, XP010121924, DOI: 10.1109/IMTC.1994.352046, ISBN: 978-0-7803-1880-9, whole document.
Garrido, S. et al., "FM2: A real-time fast marching sensor based motion planner", Advanced Intelligent Mechatronics, 2007 IEEE/ASME International Conference on, IEEE, PI, Sep. 1, 2007 (Sep. 1, 2007), pp. 1-6.
International Search Report and Written Opinion for International Patent Application No. PCT/AU19/50742; Date of Mailing Sep. 23, 2019; 5 pages.
International Search Report and Written Opinion for International Patent Application No. PCT/AU19/50743; Date of Mailing mailed Oct. 1, 2019; 10 pages.
International Search Report and Written Opinion for International Patent Application No. PCT/AU20/50367; Date of Mailing Jun. 29, 2020; 15 pages.
International Search Report and Written Opinion for International Patent Application No. PCT/AU20/50368; Date of Mailing Jun. 25, 2020; 11 pages.
Kleinigger, M. et al.: "Application of 6-DOF sensing for robotic disturbance compensation", Automation Science and Engineering (Case), 2010 IEEE Conference on, IEEE, Piscataway, NJ, USA, Aug. 21, 2010 (Aug. 21, 2010, pp. 344-349, XP031762876, ISBN: 978-1-4244-5477-1, abstract, sections 1 to 3.
Mercedes-Benz: "Mercedes-Benz "Chicken" Magic Body Control TV commercial", YouTube, Sep. 23, 2013, 1 page. Retrieved from the internet: <https://www.youtube.com/watch?v+nLwML2PagbY>.
Office Action mailed Apr. 21, 2021 in Japanese Patent Application No. 2019-523148, 4 pages.
Office Action mailed Aug. 20, 2021 for Japanese Patent Application No. 2019-523147, 3 pages.
Office Action mailed Jul. 5, 2021 for Japanese Patent Application No. 2019-523145, 4 pages.
Office Action mailed May 24, 2021 for Chinese Patent Application No. 201880067520.0, 8 pages.
Office Action mailed Sep. 3, 2021 for Chinese Patent Application No. 201780056460.8, 9 pages.
Siciliano, B. et al., "Robotics—chapters 2-4" Robotics, Dec. 31, 2009 (Dec. 31, 2009), Springer London, London, pp. 39-189.
"Critical Damping Ratio Explained." EngineerExcel. 2022. 16 pages.
Fastbrick Robotics. "Fastbrick Robotics Building a revolution." Jun. 2015. 14 pages.
HandWiki. Damping ratio. Cited by U.S. Patent and Trademark Office in Nov. 21, 2022 Final Office Action for U.S. Appl. No. 16/631,404. 7 pages.
Losada, D.P. et al., "Distributed and Modular CAN-Based Architecture for Hardware Control and Sensor Data Integration." May 3, 2017, pp. 1-17.
Muralikrishnan, B. et al., "Laser Trackers for Large-Scale Dimensional Metrology: A Review." Precision Engineering 44 (2016), pp. 13-28.
Wijenayake, U. et al., "Stereo Vision-Based 3D Pose Estimation of Product Labels for Bin Picking." Journal of Inst. Of Control Robotics and Systems (2016): 22(1): pp. 8-16.
Examination Report dated Apr. 4, 2024 on European Patent Application No. 18846395.4.
Examination Report dated Apr. 30, 2024 on Australian Patent Application No. 2018317936.
Examination Report dated Jan. 31, 2024 on Chinese Patent Application No. 201980059588.9.
Examination Report dated Feb. 27, 2024 on Australian Patent Application No. 2018304730.
Examination Report dated Feb. 16, 2024 on Australian Patent Application No. 2018303837.
Examination Report dated Apr. 12, 2024 on European Patent Application No. 18835861.8.

* cited by examiner

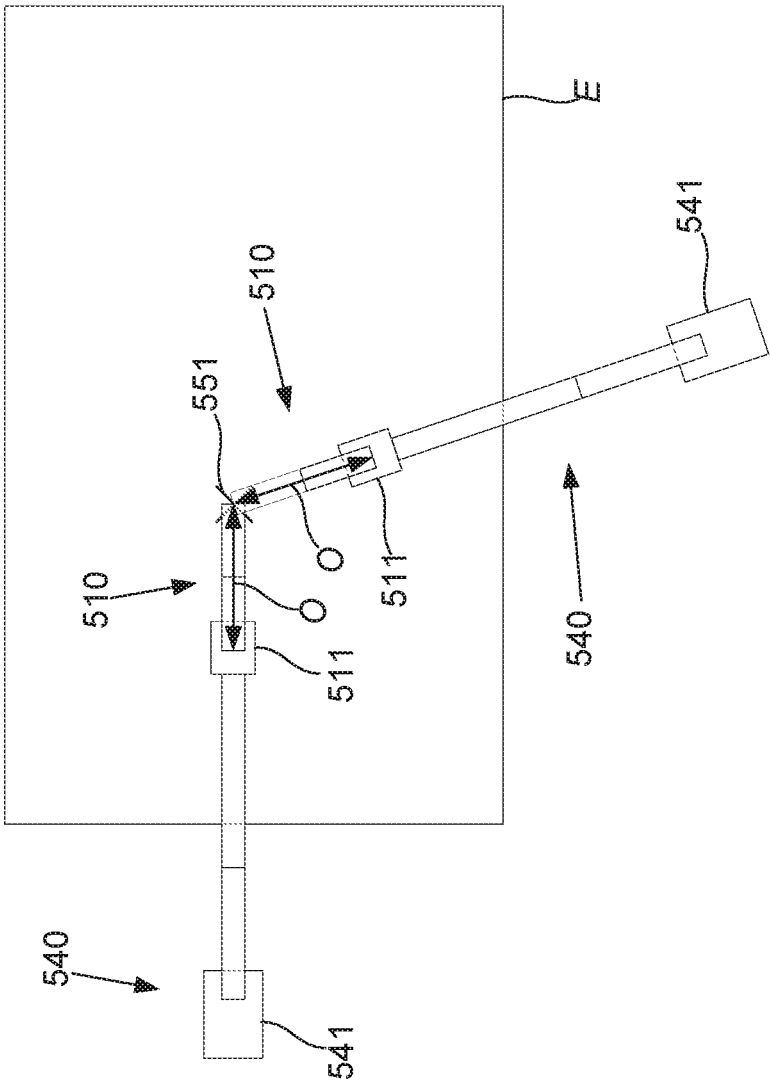

PATH CORRECTION FOR END EFFECTOR CONTROL

CROSS REFERENCE TO RELATED APPLICATIONS

This application is a United States national phase entry of International Application No. PCT/AU2018/050740 filed on Jul. 16, 2018, which claims priority to International Application No. PCT/AU2017/050739 filed on Jul. 17, 2017, both of which are incorporated herein by reference in their entireties.

BACKGROUND OF THE INVENTION

The present invention relates to systems and methods for performing interactions within a physical environment, and in one particular example, to systems and methods for moving an end effector in accordance with an end effector path using corrections to account for relative movement between a robot base and the environment.

DESCRIPTION OF THE PRIOR ART

The reference in this specification to any prior publication (or information derived from it), or to any matter which is known, is not, and should not be taken as an acknowledgment or admission or any form of suggestion that the prior publication (or information derived from it) or known matter forms part of the common general knowledge in the field of endeavour to which this specification relates.

It is known to provide systems in which a robot arm mounted on a moving robot base is used to perform interactions within a physical environment. For example, WO 2007/076581 describes an automated brick laying system for constructing a building from a plurality of bricks comprising a robot provided with a brick laying and adhesive applying head, a measuring system, and a controller that provides control data to the robot to lay the bricks at predetermined locations. The measuring system measures in real time the position of the head and produces position data for the controller. The controller produces control data on the basis of a comparison between the position data and a predetermined or pre-programmed position of the head to lay a brick at a predetermined position for the building under construction. The controller can control the robot to construct the building in a course by course manner where the bricks are laid sequentially at their respective predetermined positions and where a complete course of bricks for the entire building is laid prior to laying of the brick for the next course.

The arrangement described in WO 2007/076581 went a long way toward addressing issues associated with long booms deflecting due to gravity, wind, movement of the end effector, and movement of the boom. Nevertheless, even with the arrangement described in WO 2007/076581, errors in positioning of the end effector could still occur, particularly as the distance from the base of the robot and the end effector increased.

SUMMARY OF THE PRESENT INVENTION

In one broad form, an aspect of the present invention seeks to provide a system for performing interactions within a physical environment, the system including: a robot base that undergoes movement relative to the environment; a robot arm mounted to the robot base, the robot arm including an end effector mounted thereon; a tracking system that measures a robot base position indicative of a position of the robot base relative to the environment; and, a control system that: acquires an indication of an end effector destination; determines a reference robot base position; calculates an end effector path extending to the end effector destination at least in part using the reference robot base position; determines a current robot base position using signals from the tracking system; calculates a correction based on the current robot base position, the correction being indicative of a path modification; generates robot control signals based on the end effector path and the correction; applies the robot control signals to the robot arm to cause the end effector to be moved in accordance with the end effector path and the path modification towards the destination; and, repeats steps (iv) to (vii) to move the end effector towards the end effector destination.

In one embodiment the end effector destination is defined relative to an environment coordinate system and the control system: calculates a transformed end effector destination by transforming the end effector destination from the environment coordinate system to the robot base coordinate system at least in part using the reference robot base position; and, calculates an end effector path extending to the transformed end effector destination in the robot base coordinate system.

In one embodiment the control system: determines an end effector position; and, calculates the end effector path using the end effector position.

In one embodiment the control system determines the end effector position in a robot base coordinate system using robot arm kinematics.

In one embodiment the control system: calculates a robot base deviation based on the robot base position and an expected robot base position; and, calculates the correction based on the robot base deviation.

In one embodiment the expected robot base position is based on at least one of: an initial robot base position; the reference robot base position; and, a robot base path extending to the robot base reference position.

In one embodiment the reference robot base position is at least one of: a current robot base position; a predicted robot base position based on movement of the robot base from a current robot base position; a predicted robot base position based on movement of the robot base along a robot base path; and, an intended robot base position when end effector reaches the end effector destination.

In one embodiment the correction takes into account at least one of: unintentional movement; and, intentional movement.

In one embodiment the correction is a vector indicative of movement in each of six degrees of freedom.

In one embodiment the control system scales the correction based on a relative distance of the current end effector position from the end effector destination.

In one embodiment the control system scales the correction using an S curve to progressively apply the correction.

In one embodiment the control system moves the end effector between first and second end effector destinations defined in the robot base and environment coordinate systems respectively, and wherein the control system scales the correction based on a relative distance of the current end effector position from the first and second end effector destinations.

In one embodiment: no correction is applied when the current end effector position is proximate the first end effector destination; and, full correction is applied when the current end effector position is proximate the second end effector destination.

In one embodiment the end effector destination includes an end effector pose, the tracking system measures a robot base pose and wherein the control system: determines a current robot base pose using signals from the tracking system; and, calculates a correction based on the current robot base pose.

In one embodiment the control system: determines an end effector pose relative; and, calculates the end effector path using the end effector pose at least in part using a reference robot base pose.

In one embodiment for an end effector path having a zero path length, the path modification returns the end effector to the end effector destination to thereby maintain the end effector static within an environment coordinate system.

In one embodiment for an end effector path having a non-zero path length, the path modification returns the end effector to the end effector path.

In one embodiment the robot base moves with a slower dynamic response and the end effector moves with a faster dynamic response to correct for movement of the robot base away from an expected robot base position.

In one embodiment the robot base is a movable robot base, and the system includes a robot base actuator that moves the robot base relative to the environment.

In one embodiment the control system: calculates a robot base path extending from a current robot base position at least in part in accordance with an end effector destination; generates robot base control signals based on the robot base path; and, applies the robot base control signals to the robot base actuator to cause the robot base to be moved along the robot base path.

In one embodiment the robot base path is configured to allow continuous movement of the robot base along the robot base path in accordance with a defined robot base path velocity profile.

In one embodiment control system: determines a virtual robot base position offset from the robot base and defined at least partially in accordance with an end effector position; and, uses the virtual robot base position to at least one of: calculate a robot base path; and, generate robot base actuator control signals.

In one embodiment the virtual robot base position is coincident with a reference end effector position, the reference end effector position being at least one of: an operative position indicative of a position of the end effector when performing an interaction in the environment; a pre-operative position indicative of a position of the end effector prior to commencing an interaction in the environment; and, a default position indicative of a position of the end effector following performing an interaction in the environment.

In one embodiment the tracking system measures a target position indicative of a position of a target mounted on the robot base and the control system determines the virtual robot base position using the target position by transforming the target position to the virtual robot base position.

In one embodiment the control system: acquires an indication of a plurality of end effector destinations; determines a robot base position at least in part using signals from the tracking system; calculates a robot base path extending from the robot base position in accordance with the end effector destinations, the robot base path being configured to allow continuous movement of the robot base along the robot base path in accordance with a defined robot base path velocity profile; generates robot base control signals based on the robot base path; and, applies the robot base control signals to the robot base actuator to cause the robot base to be moved along the robot base path in accordance with the robot base path velocity profile.

In one embodiment, at least one of: the robot base path does not include any discontinuities; and, robot base path velocity profile does not include any discontinuous velocity changes.

In one embodiment the control system: defines an interaction window; and, determines the robot base path at least in part using the interaction window.

In one embodiment the control system: monitors end effector interaction; and, selectively modifies the robot base control signals to cause the robot base to move at a robot base velocity below the robot base path velocity profile, depending on results of the monitoring.

In one embodiment the robot base path includes an interaction window associated with each end effector destination, and wherein as the robot base enters an interaction window, the control system: controls the robot arm to commence at least one of: interaction; and, movement of the end effector along an end effector path to the end effector destination; and, monitors interaction by determining if the interaction will be completed by the time the robot base approaches an exit to an interaction window; and, progressively reduces the robot base velocity to ensure the interaction is completed by the time the robot base reaches an exit to the interaction window.

In one embodiment the system includes: a first tracking system that measures a robot base position indicative of a position of the robot base relative to the environment; and, a second tracking system that measures movement of the robot base, and wherein the control system: determines the robot base position at least in part using signals from the first tracking system; and, in the event of failure of the first tracking system: determines a robot base position using signals from the second tracking system; and, controls the robot arm to move the end effector along the end effector path at a reduced end effector speed.

In one embodiment the system includes: a robot base; and, a robot base actuator that moves the robot base relative to the environment, and wherein the control system uses the robot base position to at least partially control the robot base actuator to move the robot base along a robot base path, and wherein in the event of failure of the first tracking system: determines the robot base position using signals from the second tracking system; and, controls the robot base actuator to move the robot base along the robot base path at a reduced robot base speed.

In one embodiment the tracking system includes: a tracking base including a tracker head having: a radiation source arranged to send a radiation beam to a target; a base sensor that senses reflected radiation; head angle sensors that sense an orientation of the head; a base tracking system that: tracks a position of the target; and, controls an orientation of the tracker head to follow the target; a target including: a target sensor that senses the radiation beam; target angle sensors that sense an orientation of the head; a target tracking system that: tracks a position of the tracking base; and, controls an orientation of the target to follow the tracker head; and, a tracker processing system that determines a relative position of the tracker base and target in accordance with signals from the sensors.

In one embodiment the robot base is static and the environment is moving relative to the robot base.

In one embodiment the control system generates the robot control signals taking into account at least one of: an end effector velocity profile; robot dynamics; and, robot kinematics.

In one embodiment the control system includes a computer numerical control system.

In one embodiment the control system at least one of: repeats steps for processing cycles of the control system; repeats steps for consecutive processing cycles of the control system; and, repeats steps based on a refresh rate of the tracking system.

In one embodiment the robot base includes a head mounted to a boom.

In one embodiment the boom is attached to a vehicle.

In one embodiment the system is used for at least one of: positioning objects or material in the environment; retrieving objects or material from the environment; and, modifying objects or material in the environment.

In one embodiment the environment is at least one of: a building site; a construction site; and, a vehicle. A method for performing interactions within a physical environment using a system including: a robot base that undergoes movement relative to the environment; a robot arm mounted to the robot base, the robot arm including an end effector mounted thereon; and, a tracking system that measures a robot base position indicative of a position of the robot base relative to the environment, and wherein the method includes, in a control system: acquiring an indication of an end effector destination; determining a reference robot base position; calculating an end effector path extending to the end effector destination at least in part using the reference robot base position; determining a current robot base position using signals from the tracking system; calculating a correction based on the current robot base position, the correction being indicative of a path modification; generating robot control signals based on the end effector path and the correction; applying the robot control signals to the robot arm to cause the end effector to be moved in accordance with the end effector path and the path modification towards the destination; and, repeating steps (iv) to (vii) until the end effector destination is reached. A system for performing interactions within a physical environment, the system including: a robot base that undergoes movement relative to the environment; a robot arm mounted to the robot base, the robot arm including an end effector mounted thereon; a tracking system that measures a robot base position indicative of a position of the robot base relative to the environment; and, a control system that: acquires an indication of an end effector destination defined relative to an environment coordinate system; determines a reference robot base position; calculates a transformed end effector destination by transforming the end effector destination from the environment coordinate system to a robot base coordinate system at least in part using the reference robot base position; calculates an end effector path extending from a current end effector position to the transformed end effector destination in the robot base coordinate system; determines a current robot base position using signals from the tracking system; calculates a correction based on the current robot base position; generates robot control signals based on the end effector path and the correction; applies the robot control signals to the robot arm to cause the end effector to be moved along the end effector path towards the destination; and, repeats steps (v) to (viii) until the end effector destination is reached.

In one broad form, an aspect of the present invention seeks to provide a method for performing interactions within a physical environment using a system including: a robot base that undergoes movement relative to the environment; a robot arm mounted to the robot base, the robot arm including an end effector mounted thereon; and, a tracking system that measures a robot base position indicative of a position of the robot base relative to the environment and wherein the method includes in a control system: acquiring an indication of an end effector destination defined relative to an environment coordinate system; determining a reference robot base position; calculating a transformed end effector destination by transforming the end effector destination from the environment coordinate system to a robot base coordinate system at least in part using the reference robot base position; calculating an end effector path extending from a current end effector position to the transformed end effector destination in the robot base coordinate system; determining a current robot base position using signals from the tracking system; calculating a correction based on the current robot base position; generating robot control signals based on the end effector path and the correction; applying the robot control signals to the robot arm to cause the end effector to be moved along the end effector path towards the destination; and, repeating steps (v) to (viii) to move the end effector towards the end effector destination.

In one broad form, an aspect of the present invention seeks to provide a computer program product including computer executable code, which when executed by a suitably programmed control system causes the control system to control a system for performing interactions within a physical environment, the system including: a robot base that undergoes movement relative to the environment; a robot arm mounted to the robot base, the robot arm including an end effector mounted thereon; and, a tracking system that measures a robot base position indicative of a position of the robot base relative to the environment and wherein the control system: acquires an indication of an end effector destination; determines a reference robot base position; calculates an end effector path extending to the end effector destination at least in part using the reference robot base position; determines a current robot base position using signals from the tracking system; calculates a correction based on the current robot base position, the correction being indicative of a path modification; generates robot control signals based on the end effector path and the correction; applies the robot control signals to the robot arm to cause the end effector to be moved in accordance with the end effector path and the path modification towards the destination; and, repeats steps (iv) to (vii) to move the end effector towards the end effector destination.

It will be appreciated that the broad forms of the invention and their respective features can be used in conjunction and/or independently, and reference to separate broad forms is not intended to be limiting.

BRIEF DESCRIPTION OF THE DRAWINGS

Various examples and embodiments of the present invention will now be described with reference to the accompanying drawings, in which: —

FIG. 5B is a schematic plan view illustrating an example of the robot base tracking process of FIG. 4;

DETAILED DESCRIPTION OF THE PREFERRED EMBODIMENTS

Figure 1A:
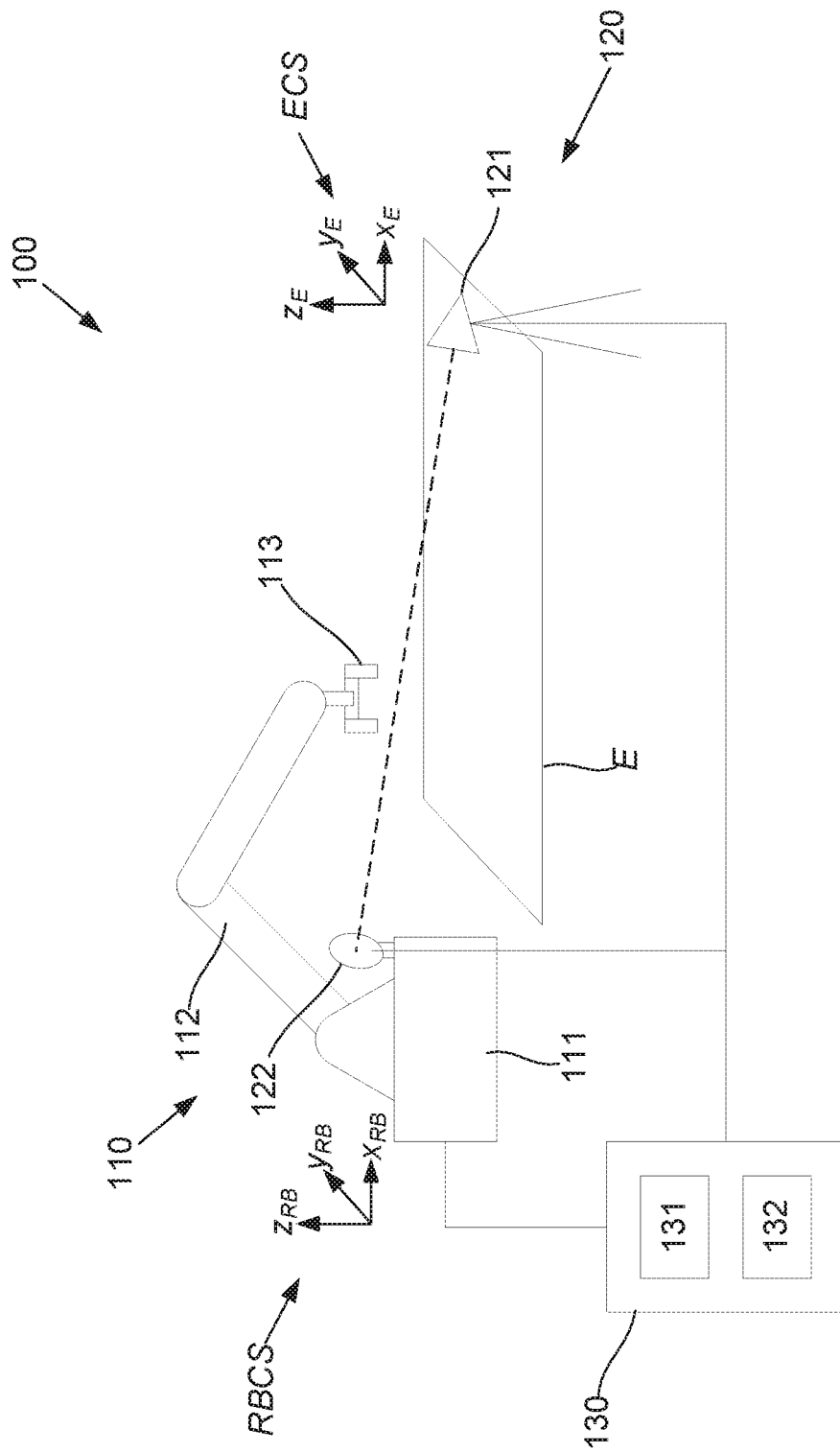
FIG. 1A is a schematic diagram illustrating a first example of a system for performing interactions within a physical environment.

The following description explains a number of different systems and methods for performing interactions within an environment. For the purpose of illustration, the following definitions apply to terminology used throughout.

The term "interaction" is intended to refer to any physical interaction that occurs within, and including with or on, an environment. Example interactions could include placing material or objects within the environment, removing material or objects from the environment, moving material or objects within the environment, modifying, manipulating, or otherwise engaging with material or objects within the environment, modifying, manipulating, or otherwise engaging with the environment, or the like. Further examples of interactions will become apparent from the following description, and it will be appreciated that the techniques could be extended to a wide range of different interactions, and specified examples are not intended to be limiting. Furthermore, in some examples, interactions may comprise one or more distinct steps. For example, when brick laying, an interaction could include the steps of retrieving a brick from a brick supply mechanism and then placing the brick in the environment.

The term "environment" is used to refer to any location, region, area or volume within which, or on which, interactions are performed. The type and nature of the environment will vary depending on the preferred implementation and the environment could be a discrete physical environment, and/or could be a logical physical environment, delineated from surroundings solely by virtue of this being a volume within which interactions occur. Non-limiting examples of environments include building or construction sites, parts of vehicles, such as decks of ships or loading trays of lorries, factories, loading sites, ground work areas, or the like, and further examples will be described in more detail below.

A robot arm is a programmable mechanical manipulator. In this specification a robot arm includes multi axis jointed arms, parallel kinematic robots (such as Stewart Platform, Delta robots), spherical geometry robots, Cartesian robots (orthogonal axis robots with linear motion) etc.

A boom is an elongate support structure such as a slewing boom, with or without stick or dipper, with or without telescopic elements, telescoping booms, telescoping articulated booms. Examples include crane booms, earthmover booms, truck crane booms, all with or without cable supported or cable braced elements. A boom may also include an overhead gantry structure, or cantilevered gantry, or a controlled tensile truss (the boom may not be a boom but a multi cable supported parallel kinematics crane (see PAR systems, Tensile Truss—Chernobyl Crane)), or other moveable arm that may translate position in space.

An end effector is a device at the end of a robotic arm designed to interact with the environment. An end effector may include a gripper, nozzle, sand blaster, spray gun, wrench, magnet, welding torch, cutting torch, saw, milling cutter, router cutter, hydraulic shears, laser, riveting tool, or the like, and reference to these examples is not intended to be limiting.

TCP is an abbreviation of tool centre point. This is a location on the end effector (or tool), whose position and orientation define the coordinates of the controlled object. It is typically located at the distal end of the kinematic chain. Kinematic chain refers to the chain of linkages and their joints between the base of a robot arm and the end effector.

CNC is an abbreviation for computer numerical control, used for automation of machines by computer/processor/microcontroller executed pre-programmed sequences of machine control commands.

The application of coordinate transformations within a CNC control system is usually performed to allow programming in a convenient coordinate system. It is also performed to allow correction of workpiece position errors when clamped in a vice or fixture on a CNC machining centre.

These coordinate transformations are usually applied in a static sense to account for static coordinate shifts or to correct static errors.

Robots and CNC machines are programmed in a convenient Cartesian coordinate system, and kinematic transformations are used to convert the Cartesian coordinates to joint positions to move the pose of the robot or CNC machine.

Measuring the position of a robot arm end effector close to the TCP in real time increases the accuracy of a robot. This is performed on static end effectors on robots used for probing and drilling. This is achieved by a multi-step process of moving to the programmed position, taking a position measurement, calculating a correction vector, adding the compensation vector to the programmed position and then moving the TCP to the new position. This process is not done in hard real time and relies on a static robot arm pose.

Examples of systems for performing interactions within physical environments will now be described with reference to FIGS. 1A to 1C and FIG. 2.

In the example of FIG. 1A the system 100 includes a robot assembly 110 including a robot base 111, a robot arm 112 and an end effector 113. The robot assembly 110 is positioned relative to an environment E, which in this example is illustrated as a 2D plane, but in practice could be a 3D volume of any configuration. In use, the end effector 113 is used to perform interactions within the environment E, for example to perform bricklaying, object manipulation, or the like.

The system 100 also includes a tracking system 120, which is able to track the robot assembly movement, and in one particular example, movement of the robot base relative to the environment. In one example, the tracking system includes a tracker base 121, which is typically statically positioned relative to the environment E and a tracker target 122, mounted on the robot base 111, allowing a position of the robot base 111 relative to the environment E to be determined.

In one example, the tracking system 120 includes a tracking base 121 including a tracker head having a radiation source arranged to send a radiation beam to the target 122 and a base sensor that senses reflected radiation. A base tracking system is provided which tracks a position of the target 122 and controls an orientation of the tracker head to follow the target 122. The target 122 typically includes a target sensor that senses the radiation beam and a target tracking system that tracks a position of the tracking base and controls an orientation of the target to follow the tracker head. Angle sensors are provided in the head and the target that determine an orientation of the head and target respectively. A tracker processing system determines a relative position of the tracker base and target in accordance with signals from the sensors, specifically using signals from the angle sensors to determine relative angles of the tracker and target, whilst time of flight of the radiation beam can be used to determine a physical separation. In a further example, the radiation can be polarised in order to allow an orientation of the base relative to the tracking head to be determined. Although a single tracking system 120 including a head and target is shown, this is not essential and in other examples multiple tracking systems and/or targets can be provided as will be described in more detail below.

In one particular example, the tracking system is a laser tracking system and example arrangements are manufactured by API (Radian and OT2 with STS (Smart Track Sensor)), Leica (AT960 and Tmac) and Faro. These systems measure position at 300 Hz, or 1 kHz or 2 kHz (depending on the equipment) and rely on a combination of sensing arrangements, including laser tracking, vision systems using 2D cameras, accelerometer data such as from a tilt sensor or INS (Inertial navigation System) and can be used to make accurate position measurements of position, with data obtained from the laser tracker and active target equating to position and optionally orientation of the active target relative to the environment E. As such systems are known and are commercially available, these will not be described in any further detail.

It will also be appreciated that other position/movement sensors, such as an inertial measurement unit (IMU) can also be incorporated into the system, as will be described in more detail below.

A control system 130 is provided in communication with the tracking system 120 and the robot assembly 110 allowing the robot assembly to be controlled based on signals received from the tracking system. The control system typically includes one or more control processors 131 and one or more memories 132. For ease of illustration, the remaining description will make reference to a processing device and a memory, but it will be appreciated that multiple processing devices and/or memories could be used, with reference to the singular encompassing the plural arrangements. In use the memory stores control instructions, typically in the form of applications software, or firmware, which is executed by the processor 131 allowing signals from the tracking system 120 and robot assembly 110 to be interpreted and used to control the robot assembly 110 to allow interactions to be performed.

Figure 2:
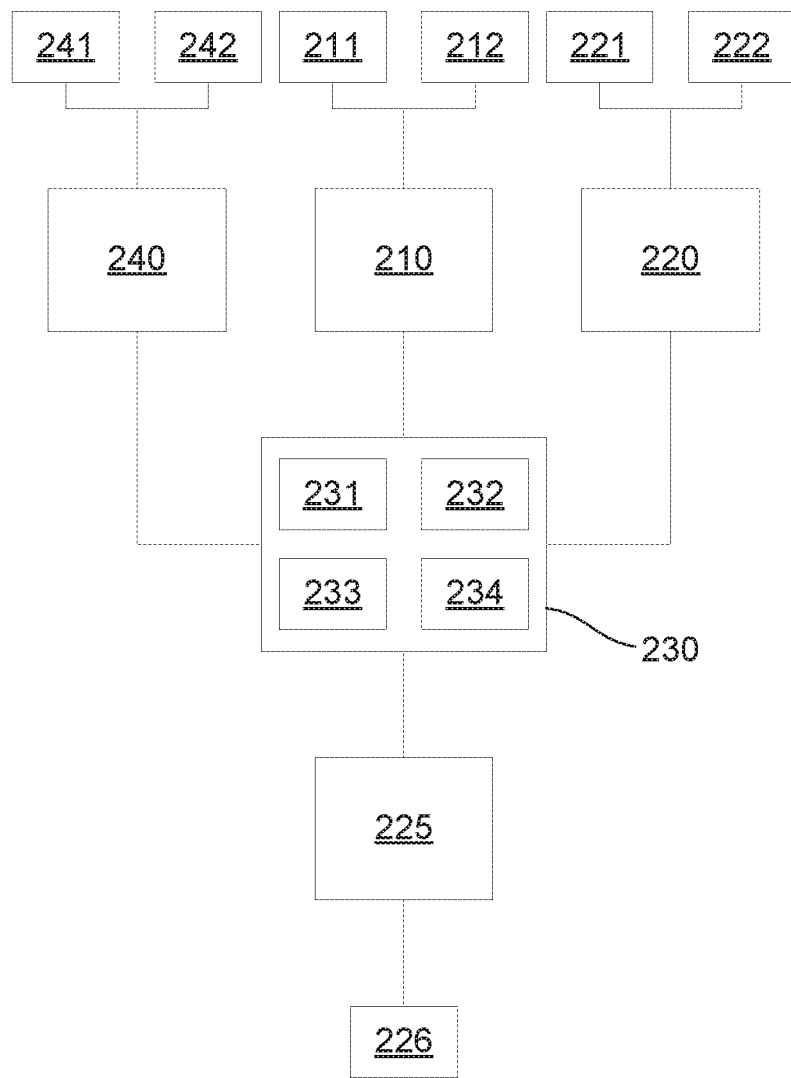
FIG. 2 is a schematic diagram of an example of a control system for the systems of FIGS. 1A to 1C.

An example of the control system 130 is shown in more detail in FIG. 2.

In this example the control system 230 is coupled to a robot arm controller 210, a tracking system controller 220 and a boom controller 240. The robot arm controller 210 is coupled to a robot arm actuator 211 and end effector actuator 212, which are able to control positioning of the robot arm 112 and end effector 113, respectively. The tracking system controller 220 is coupled to the tracking head 221 and target 222, allowing the tracking system to be controlled and relative positions of the tracking head 221 and target 222 to be ascertained and returned to the control system 230. The boom controller 240 is typically coupled to boom actuators 241, 242 which can be used to position the boom and hence robot base. A second tracking system 225 may also be provided, which includes sensors 226, such as inertial sensors, optionally coupled to a controller or processor. It is to be understood that in practice the robot arm, end effector and boom will have multiple actuators such as servo motors, hydraulic cylinders and the like to effect movement of their respective axes (i.e. joints) and reference to single actuators is not intended to be limiting.

Each of the robot arm controller 210, tracking system controller 220, second tracking system 225 and boom controller 240 typically include electronic processing devices, operating in conjunction with stored instructions, and which operate to interpret commands provided by the control system 230 and generate control signals for the respective actuators and/or the tracking system and/or receive signals from sensors and provide relevant data to the control system 230. The electronic processing devices could include any electronic processing device such as a microprocessor, microchip processor, logic gate configuration, firmware optionally associated with implementing logic such as an FPGA (Field Programmable Gate Array), or any other electronic device, system or arrangement. It will be appreciated that the robot arm controller 210, tracking system controller 220 and boom controller 240 typically form part of the boom assembly, robot assembly and tracking system, respectively. As the operation of such systems would be understood in the art, these will not be described in further detail.

The control system 230 typically includes an electronic processing device 231, a memory 232, input/output device 233 and interface 234, which can be utilised to connect the control system 230 to the robot arm controller 210, tracking system controller 220 and boom controller 240. Although a single external interface is shown, this is for the purpose of example only, and in practice multiple interfaces using various methods (eg. Ethernet, serial, USB, wireless or the like) may be provided.

In use, the processing device 231 executes instructions in the form of applications software stored in the memory 232 to allow the required processes to be performed. The applications software may include one or more software modules, and may be executed in a suitable execution environment, such as an operating system environment, or the like.

Accordingly, it will be appreciated that the control system 230 may be formed from any suitable processing system, such as a suitably programmed PC, computer server, or the like. In one particular example, the control system 230 is a standard processing system such as an Intel Architecture based processing system, which executes software applications stored on non-volatile (e.g., hard disk) storage, although this is not essential. However, it will also be understood that the processing system could be any electronic processing device such as a microprocessor, microchip processor, logic gate configuration, firmware optionally associated with implementing logic such as an FPGA (Field Programmable Gate Array), or any other electronic device, system or arrangement.

It will also be appreciated that the above described arrangements are for the purpose of illustration only and practice a wide range of different systems and associated control configurations could be utilised. For example, it will be appreciated that the distribution of processing between the controllers and/or control system could vary depending on the preferred implementation.

For the purpose of the following examples, reference will be made to an environment coordinate system ECS, which is static relative to the environment E, and a robot base coordinate system RBCS, which is static relative to the robot base 111. Additionally, some examples will make reference to a robot base actuator coordinate system BACS, which is a coordinate system used to control movement of the robot base, for example to control movement of the boom assembly.

In practice, in the above described examples, the robot base 111 undergoes movement relative to the environment E. The nature of the movement will vary depending upon the preferred implementation. For example, the robot base 111 could be static, with the environment E moving. A good example of this is when a robot arm is provided on a dock and is attempting to interact with objects present on the deck of a boat, which is undergoing movement relative to the dock. However, it will be appreciated that similar relative movement will arise in a range of different circumstances.

Figure 1B:
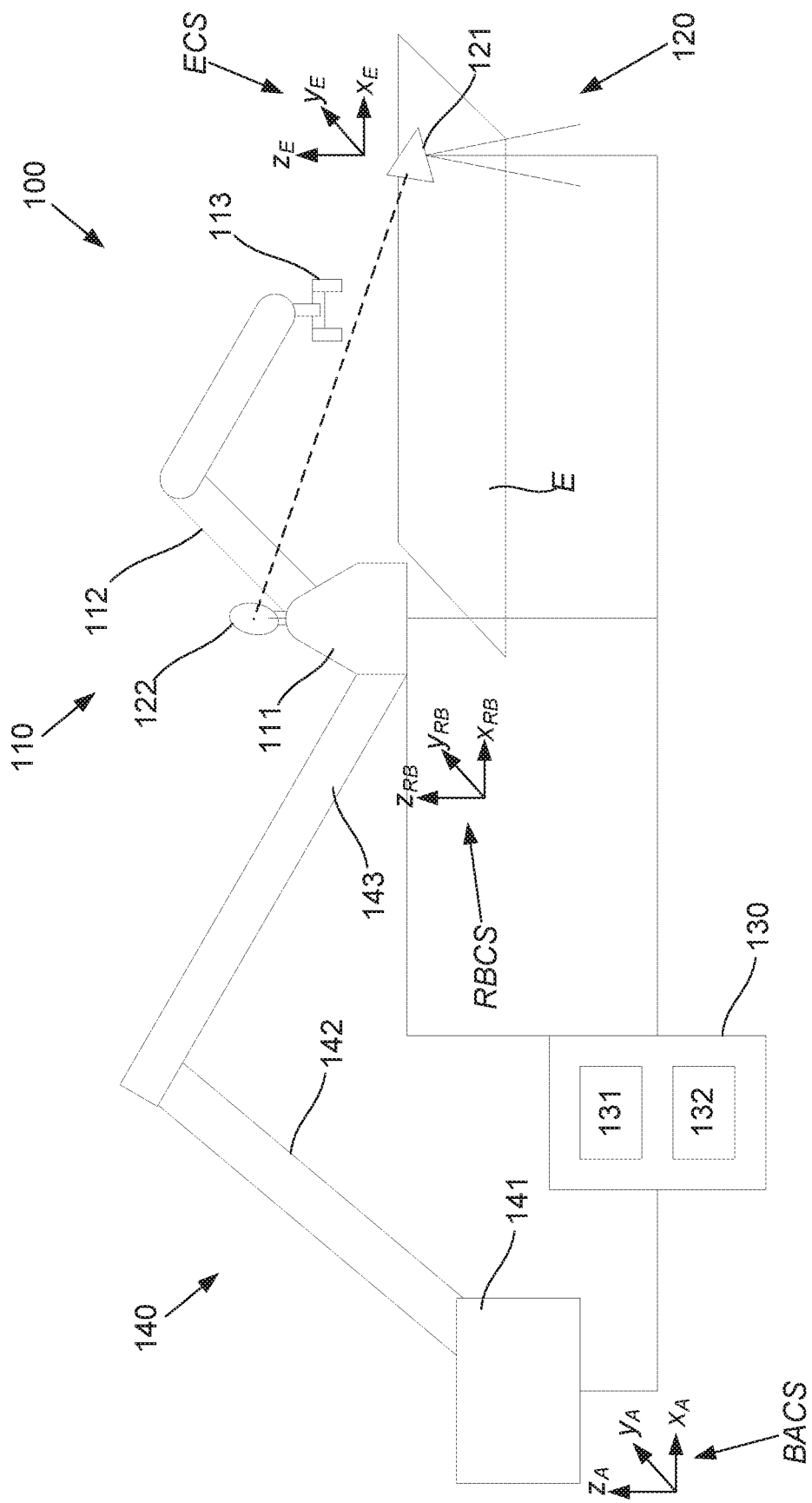
FIG. 1B is a schematic diagram of a second example of a system for performing interactions within a physical environment.

Alternatively, in the example shown in FIG. 1B, the robot base 111 is supported by a robot base actuator 140, which can be used to move the robot base. In this example, the robot base actuator is in the form of a boom assembly including a boom base 141, boom 142 and stick 143. The boom is typically controllable allowing a position and/or orientation of the robot base to be adjusted. The types of movement available will vary depending on the preferred implementation. For example, the boom base 141 could be mounted on a vehicle allowing this to be positioned and optionally rotated to a desired position and orientation. The boom and stick 142, 143 can be telescopic arrangements, including a number of telescoping boom or stick members, allowing a length of the boom or stick to be adjusted. Additionally, angles between the boom base 141 and boom 142, and boom 142 and stick 143, can be controlled, for example using hydraulic actuators, allowing the robot base 111 to be provided in a desired position relative to the environment E. Such operation is typically performed in the robot base actuator coordinate system BACS, although this is not essential as will become apparent from the remaining description.

An example of a system of this form for laying bricks is described in WO 2018/009981 the content of which is incorporated herein by cross reference. It will be appreciated however that such arrangements are not limited to bricklaying, but could also be utilised for other forms of interactions.

Depending on the implementation, the boom assembly can have a significant length, so for example in the case of a construction application, the boom may need to extend across a construction site and could have a length of tens of meters. In such circumstances, the boom is typically subject to a variety of loads, including forces resulting from movement of the boom and/or robot arm, wind loading, machinery vibrations, or the like, which can in turn induce oscillations or other movement in the end of the boom, in turn causing the robot base to move relative to the environment. Such movement will be referred to generally as unintentional movement. Additionally, as described above, the robot base can be moved in a controlled manner by actively moving the boom and such movement will be referred to generally as intentional movement.

In any event, it will be appreciated that in both of the above described examples, the robot base and hence the robot base coordinate system RBCS moves relative to the environment and hence environment coordinate system ECS, which substantially complicates the control process, and in particular the ability of the end effector to be accurately positioned so as to perform an interaction within the environment. In this regard, in normal robot applications, the end effector is controlled in the robot base coordinate system RBCS, whilst the end effector needs to be positioned in the environment coordinate system ECS, and as the movement results in the two coordinate systems moving relative to each other, this makes accurately positioning the end effector difficult.

Figure 3:
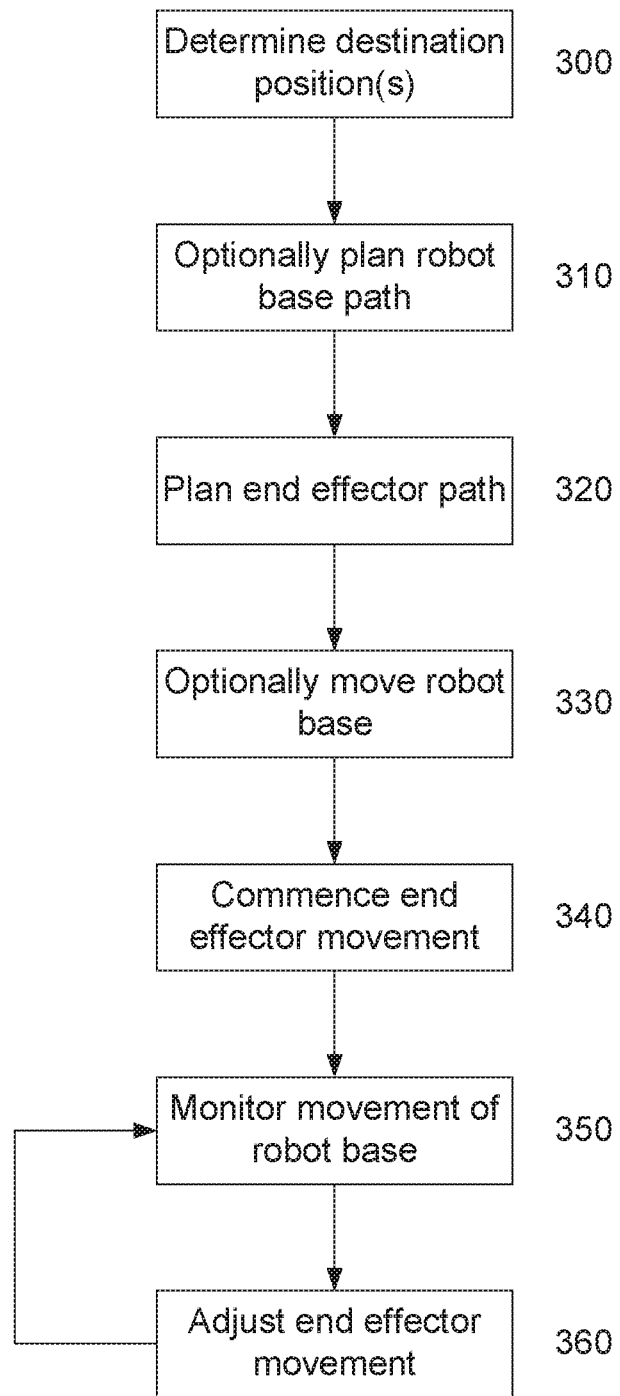
FIG. 3 is a flowchart of an example of a process for performing a physical interaction.

An example of the process for performing an interaction within the environment E will now be described with reference to FIG. 3.

For the purpose of the following explanation reference will be made to a term "destination". The term is intended to refer to a position and optionally orientation (in combination referred to as a pose) at which the end effector 113 is to be provided, either as part of performing an interaction or otherwise. For example, the destination could correspond to the location within the environment at which the interaction is to occur. However, this is not essential, alternatively the destination could correspond to any position through which the end effector should pass, in effect defining multiple destinations leading to a final destination. For example, an interaction may involve sequences of end effector movements, optionally forming part of different steps, and the term destination could refer to any position forming part of the different steps. Thus, the term destination should therefore be interpreted to refer to any particular point at which the end effector is to be positioned and in some examples, a destination could be a static point at which an end effector is to be maintained for a period of time for example while other processes are performed, whereas in other cases the destination could be transitory and correspond to a point on a path through which the end effector is to traverse.

In this example, one or more destination positions are determined at step 300. The manner in which this is achieved will vary depending on the preferred implementation. In one example, destinations can be retrieved from a database or other data store, received from another processing system, determined based on signals from sensors or user input commands, or the like. For example, end effector destinations could be derived from a plan, such as a construction plan for a building, in which case the plan could be retrieved and the destinations derived from the plan. In this regard, the construction plan may identify positions at which objects such as bricks are to be placed in order for a building to be constructed. In this example, the destination positions can simply be retrieved from the plan.

However, this is not essential and alternatively, destination positions may need to be ascertained in other manners. For example, it may be necessary to retrieve an object from an environment, in which case the destination of the end effector corresponds to the object position. In this example, the object position may not be known in advance, in which case the position of the object may need to be detected, for example using a camera based vision system, or other localisation system, allowing the detected position to be used in order to define the destination position. In this regard, the object could be static or moving, meaning whilst the destination is normally static relative to the environment coordinate system ECS, in some examples, the destination could be moving.

It will also be appreciated that destinations could be determined in other appropriate manners, and the above described examples are not intended to be restrictive.

At step 310, a robot base path to allow for movement of the robot base 111 is optionally planned. The robot base path may not be required, for example in the event that the robot base 111 is static or already positioned. However, it will be appreciated that the robot base path may be used to move the robot base 111 to different positions within or relative to the environment E, in order to allow the end effector 113 to be more conveniently provided at the respective destination. The manner in which the base path is calculated will vary depending upon the preferred implementation and examples will be described in more detail below.

At step 320, an end effector path is planned to move the end effector 113 to the destination. The end effector path is typically planned based on a planned position of the robot base 111 relative to the environment E, for example to take into account movement of the robot base 111 along the robot base path. The end effector path may extend from an expected previous position of an end effector 113, for example at the completion of a previous interaction or other step, or could be calculated in real time based on a current end effector position. It will be appreciated that in the event that the destination is based on a current position, the end effector path could be a null path with zero length, with this being used for the purpose of positioning the end effector 113 statically relative to the environment E.

At step 330, the robot base 111 is optionally moved based on the robot base path, for example by controlling the boom assembly 140, or another form of robot base actuator. This process is typically performed in the robot base actuator coordinate system BACS, although this is not essential and robot base path planning and/or control of robot base movement could be performed in other coordinate systems. During and/or following this process, the commencement of end effector movement is performed at step 340, causing the end effector to start moving along the end effector path, assuming this is required. This process is typically performed in the robot base coordinate system RBCS, although this is not essential and end effector path planning and/or control could be performed in other coordinate systems.

As movement of the end effector 113 is performed, or otherwise if the end effector 113 is being held at a static position relative to the environment E, movement of the robot base is monitored at step 350, using the tracking system 120 to continuously detect a position of the robot base 111 relative to the environment E. This is used to adjust end effector movement, for example by adjusting pose of robot arm, at step 360 to ensure the destination position is reached.

In this regard, the robot base may undergo unintentional movement relative to the environment E, either due to a shift in the environment, or due to an unexpected movement of the robot base, resulting from vibrations in or wind loading of the boom, or the like. Such motions mean that the robot base may not be provided in an expected position relative to the environment, for example as a result of the robot base 111 deviating from the calculated robot base path. In this example, by monitoring movement of the robot base 111, such movements can be corrected for, ensuring that the end effector moves correctly along the end effector path to the destination position.

Thus, in one example, a robot base actuator is used to provide a coarse positioning system, whilst the robot arm provides a fine positioning system to allow an end effector to be accurately positioned relative to the environment. Operation is controlled by a control system that uses a tracking system to measure a position and optionally orientation of the robot base in real time, with a measured position (and orientation) of the robot base being used to calculate an offset that is added as a position transformation to the relative position of the fine positioning mechanism so that the end effector is positioned correctly relative to the environment. Thus a large and relatively light and flexible structure can be used to approximately position a fast and accurate fine positioning mechanism, which can be accurately controlled in real time allowing an end effector to be moved relative to an environment in an accurate and fast motion.

This form of operation is referred to by the applicant as dynamic stabilisation technology (DST) and is described in prior publications including U.S. Pat. No. 8,166,727, WO2009/026641, WO2009/026642, WO2018/009981 and WO2018/009986, the contents of which are incorporated herein by cross reference.

It will also be appreciated that DST can also be used to account for intentional movement of the robot base, for example to account for the fact that the robot base 111 may be traversing a robot path whilst an interaction is performed.

An example of a number of different aspects of the above described system will now be described in further detail. These different aspects of the system can be used independently or can be used in conjunction depending on the preferred implementation. It will be appreciated from this that reference to separate aspects should not be considered limiting and that aspects can be used in any number of different combinations, depending on the preferred implementation and the scenario in which the system is used.

Figure 4:
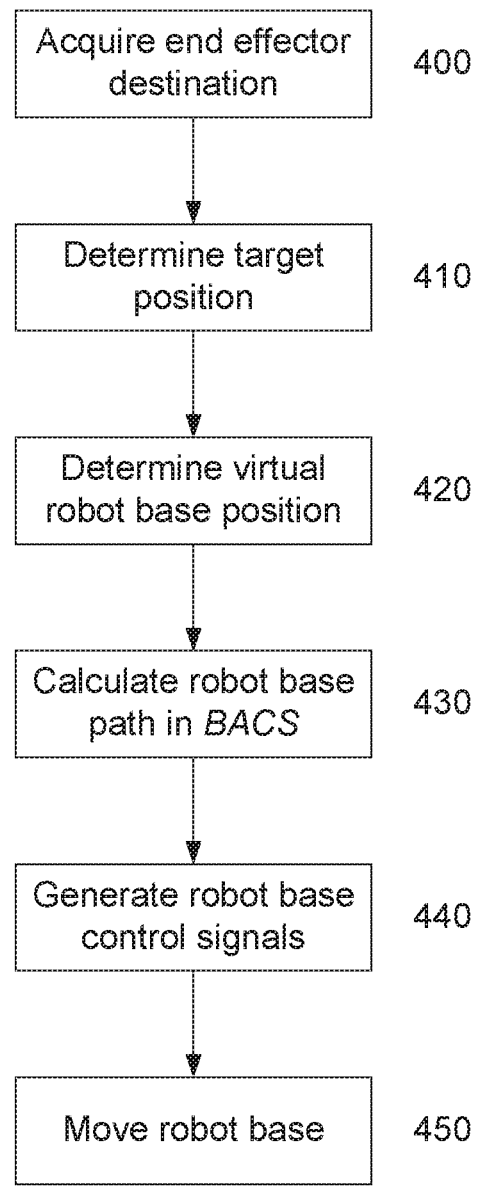
FIG. 4 is a flow chart of an example of a robot base tracking process.

In one aspect a process for controlling the robot base is provided and an example of this will now be described in more detail with reference to FIG. 4.

For the purpose of this example, it is assumed that the robot base can be moved relative to the environment using a robot base actuator. The nature of the actuator and manner in which this is performed can vary depending on the preferred implementation. In one example, the robot base actuator could be a boom assembly 140 similar to that described above with respect to FIGS. 1B and 1C. However, any form of robot base actuator could be provided and this could include a vehicle with the robot base being mounted on the vehicle, or could include the use of a crane or other similar arrangement for suspending the robot assembly above a work environment, or could include the use of self powered robot bases, for example including wheels or tracks, or the like.

In this example, at step 400 the control system acquires an indication of an end effector destination defined relative to the environment coordinate system ECS. As previously described the end effector destination could be determined in any number of manners and this could include retrieving the destination from a plan, based on signals received from a vision system that locates an object relative to the environment, or the like.

At step 410, a tracking target position is determined at least in part using signals from the tracking system 120. The tracking target position represents a position of the target 122, relative to the tracking base 121, and hence the environment E. Thus the target position represents the position of the target 122 in the environment coordinate system ECS.

Figure 5A:
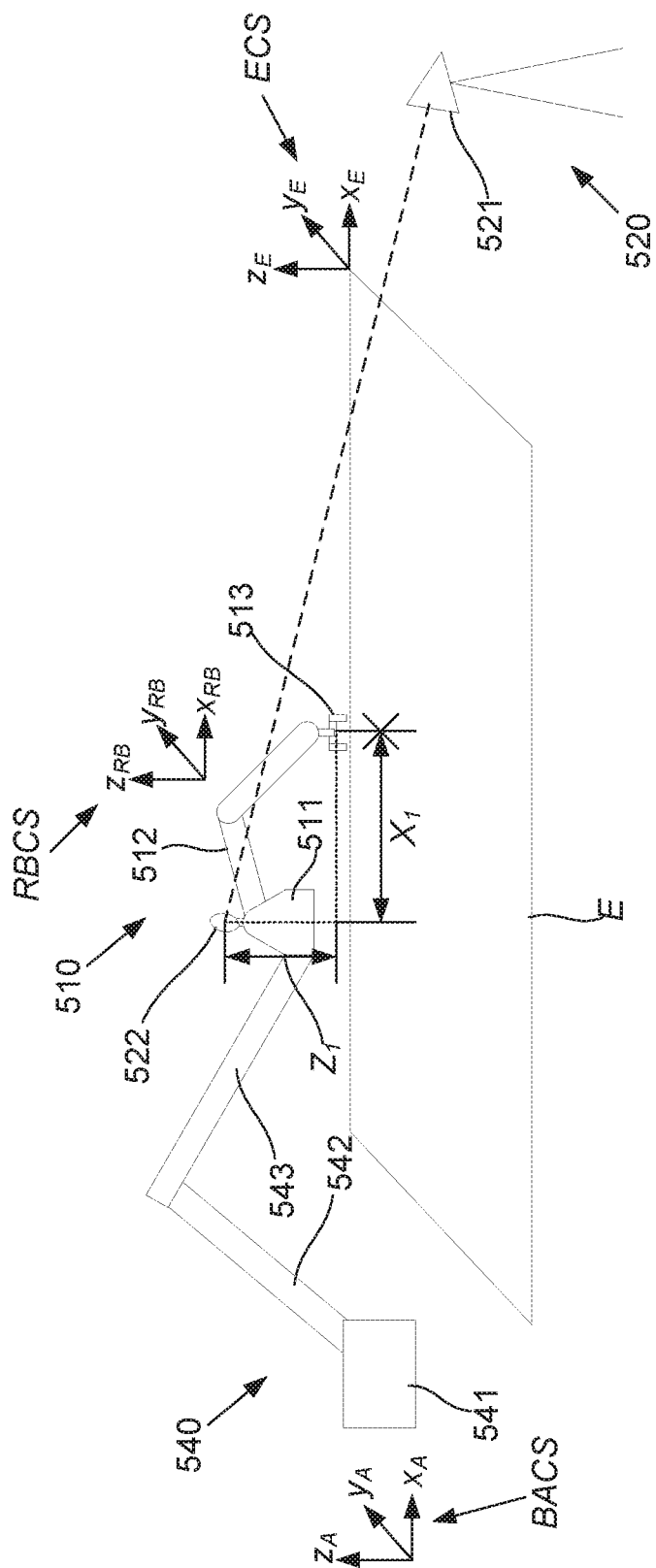
FIG. 5A is a schematic diagram illustrating an example of the robot base tracking process of FIG. 4.

At step 420 the control system determines a virtual robot base position. The virtual robot base position is offset from the actual physical robot base and is defined at least partially in accordance with an end effector position. An example of this is shown in FIG. 5A which shows a system similar to that described above with respect to FIG. 1B, with like components indicated by similar reference numerals increased by 400.

In this example, a robot base 511 is positioned using a boom assembly 540 having a boom base 541 and boom and stick 542, 543. The robot base 511 has a tracker 522 mounted thereon whose position is tracked using the tracking base 521 provided relative to the environment E. In this example, the robot arm 512 is shown provided in a reference position, with the end effector 513 provided at a reference position relative to the robot base.

The end effector reference position can be arbitrarily defined, but is typically based on one or more of an operative position indicative of a position of the end effector 513 when performing an interaction in the environment, a pre-operative position indicative of a position of the end effector 513 prior to commencing an interaction in the environment, or a default position indicative of a position of the end effector 513 following performing an interaction in the environment. Thus, the reference position is a typical position of the end effector, which is used at some point before, during or after an interaction is performed.

At step 430, the control system (not shown) uses the virtual robot base position and end effector destination to calculate a robot base path extending from the current robot base virtual position to the end effector destination.

In this regard, the position of the tracker target 522 is known in the robot base actuator coordinate system BACS by virtue of the robot base actuator kinematics, and in particular the boom kinematics, and the known location of the tracker target 522 on the robot base 511. Thus as the tracker target 522 position is known in the environment coordinate system ECS and the robot base actuator coordinate system BACS, this can be used to allow geometric transformations to transform other positions between these coordinate systems.

Additionally, in this example, the tracker target 522 is offset from the reference end effector location, and hence reference robot base position by offsets $Z_1$ and $X_1$. It will be appreciated that other offsets may also apply, for example a Y axis offset, as well as rotational offsets, may also be present, but not shown in this example for clarity. Accordingly, this allows the virtual robot base position to be known in the different coordinate systems.

At step 440, the control system generates robot base control signals based on the calculated path, and uses these to move the robot base at step 450, for example by controlling the boom assembly 540.

It will be appreciated that as control is typically performed in the robot base actuator coordinate system BACS, the robot base path is typically calculated in the robot base actuator coordinate system BACS, in which case the control system uses the target position to calculate a transformation between the environment coordinate system ECS and the robot base actuator coordinate system BACS. Specifically, this involves transforming the end effector destination into the robot base actuator coordinate system BACS, allowing the robot base path to be calculated in the robot base actuator coordinate system BACS. However, it will be appreciated that this is not essential and alternatively the path could be calculated in the environment coordinate system ECS.

In any event, in the above described example, the control system effectively creates a virtual robot base position, which is a virtual position of the robot base that is offset from the physical location of the robot base, and which is coincident with a reference position of the end effector. The control system then uses this virtual robot base position when controlling movement of the robot base, using a robot base actuator, which can be beneficial in allowing the robot base to be more easily positioned in order to allow interactions to be performed.

For example, when calculating a robot base path, the control system can simply acquire an end effector destination and then use this destination, together with the tracking target position, to define the robot base path, causing the robot base to traverse the environment to a position which is suitable for the interaction to be performed. In particular this can be used to align the end effector with the end effector destination, thereby reducing the complexity of the end effector path and the need for significant control of the end effector.

A useful example of this is illustrated in FIG. 5B, which shows an example in which the robot base actuator is a boom assembly mounted on a vehicle 541, which acts as the boom base. In this regard, when it is required to perform interactions within the environment E, the vehicle 541 may be located at any point relative to the environment E. In this instance, in order for the end effector to be positioned at a destination 551, the robot base 511 must be provided at a position that is physically offset from the destination 551, by an offset O. However, this offset O varies depending on the position of the vehicle 541 and must be calculated in the robot base actuator coordinate system BACS, which can be computationally complex. However, by controlling the robot base actuator using a virtual robot base position, which is aligned with the end effector 513, this automatically aligns the end effector 513 with the end effector destination 551 as needed, irrespective of the positioning of the vehicle relative to the environment.

Thus, utilising the virtual robot base position to control positioning of the robot base 511 means that the robot base 511 can simply be moved so that it is automatically offset from the destination 551 as needed. This means that irrespective of the original position of the robot actuator base, and in particular the boom base 541, the robot base 511 is controlled so that the end effector 513 is effectively automatically aligned with the destination.

Additionally and/or alternatively, this can assist with path planning. For example, path planning and/or tracking of movement of the robot base using a virtual robot base position aligned with the end effector 513 can help avoid collisions of the end effector 513 with the environment or objects or material provided therein.

As mentioned, the virtual robot base position is typically defined to be coincident with a reference end effector position, such as an operative position, a pre-operative position, or a default post-operative position. It will be appreciated that the particular end effector position selected will vary depending upon the preferred implementation, and that other end effector positions could also be used.

In the current example, the robot base includes a head mounted to a boom with the boom in turn being controlled by a boom actuator from a boom actuator base. In one particular example the boom base is attached to a vehicle, with the virtual robot base position being offset from the robot base and defined at least partially in accordance with an end effector position to allow the vehicle to be provided in different positions relative to the environment.

Whilst the above example has focused on robot base position, it will be appreciated that this could also take into account orientation, in which case the robot base pose will be calculated as a virtual robot base pose, which is physically offset from the robot base, and aligned with an end effector pose.

Figure 6:
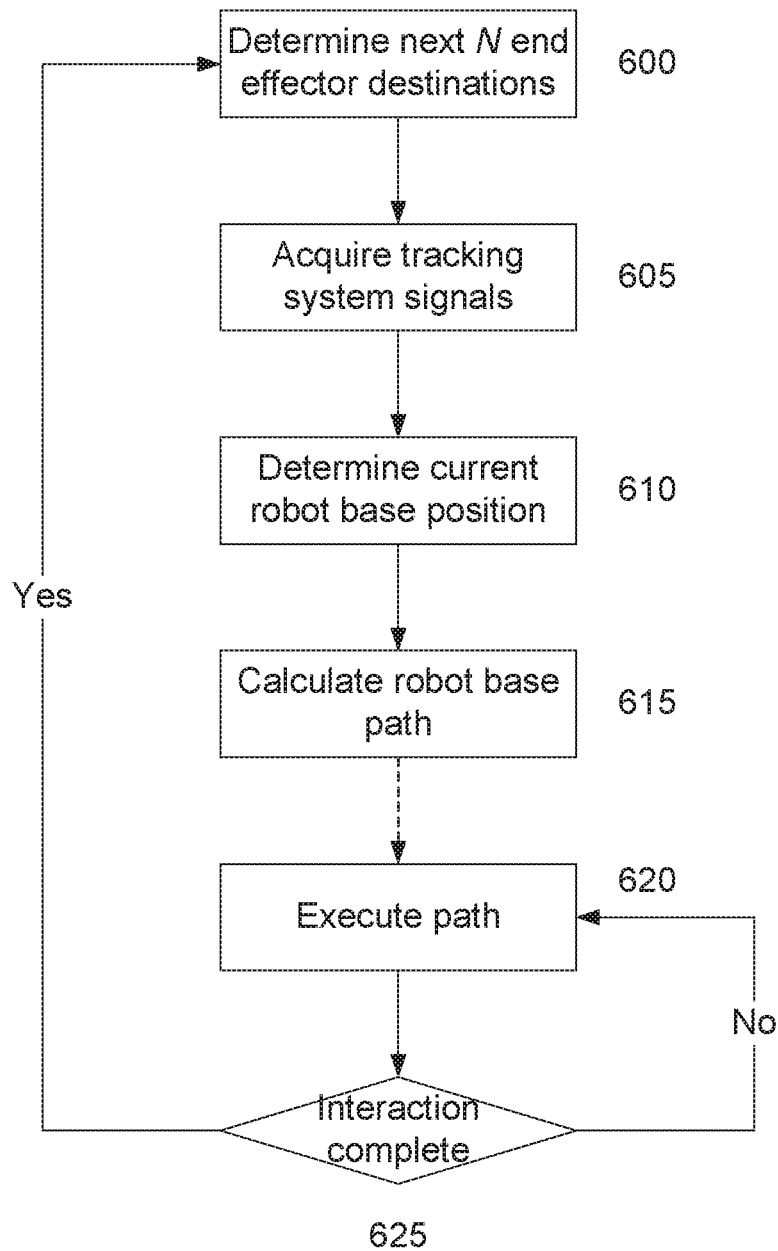
FIG. 6 is a flow chart of an example of a process for calculating a robot base path.

In one aspect a process for planning a robot base path is provided and an example of this will now be described in more detail with reference to FIG. 6.

In this example, a number N of next end effector destinations are determined at step 600. As previously discussed, this can be achieved in any appropriate manner such as retrieving end effector destinations from a plan, detecting objects in an environment, or the like. The number of end effector destinations that are selected will vary depending on the preferred implementation and the nature of the interactions and planning performed, but typically this will be at least 5, and more typically at least 10, and in one preferred example about 20.

At step 605 the control system acquires tracking system signals and uses these to determine a current robot base position at step 610. As previously described, the robot base position may be a virtual robot base position which is offset from the physical robot base, for example to align this with an end effector location.

At step 615 a robot base path is calculated, with this typically being performed in a robot base actuator coordinate system BACS, as described in the previous example. In this example, the robot base path is configured to allow substantially continuous movement of the robot base along the robot base path in accordance with a robot base velocity profile, which defines the robot base velocity along the path.

Once planned, the robot base path can be executed at step 620 by generating robot base control signals based on the robot base path, with these being applied to the robot base actuator, such as the boom assembly, to cause the robot base 511 to be moved.

Optionally, at step 625 it is determined if an interaction is being completed, for example by having the end effector reach a destination, and if not execution of the robot base path continues. Otherwise, once the interaction is complete, the process returns to step 600 to allow a next N end effector destinations to be determined, so that the path is constantly updated as end effector destinations are reached.

Accordingly, the above described arrangement calculates a robot base path by examining a next N destinations and calculating a path based on those destinations. Taking into account a number of destinations and not just a next immediate destination, allows the path to be planned to avoid sudden changes in speed and/or direction of movement, allowing for substantially continuous movement along the path length.

In particular, the path can be calculated so that the path shape and velocity profile, are carefully controlled to minimise changes in robot base velocity, which in turn can be used to avoid discontinuities, such as stepwise or sharp velocity changes. Sudden velocity changes, for example increasing or decreasing the speed of the robot base movement, or changing the direction of movement, can induce vibrations within the robot base actuator, such as the boom arm of a boom assembly. This in turn can lead to greater unintentional movement of the robot base, including more movements and/or movements of larger magnitude, making it more difficult for the DST to correct for movement of the robot base and ensure the end effector is provided at a correct position.

In order to minimise the magnitude of velocity changes, including speed and/or direction changes, a number of different approaches can be used. In one example, the robot base path is curved and/or configured to allow the robot base to be moved gradually whilst interactions are performed, so that the robot base does not need to be halted.

An example of the process for calculating a robot base path will now be described in further detail with reference to FIGS. 7A to 7G.

Figure 7A:
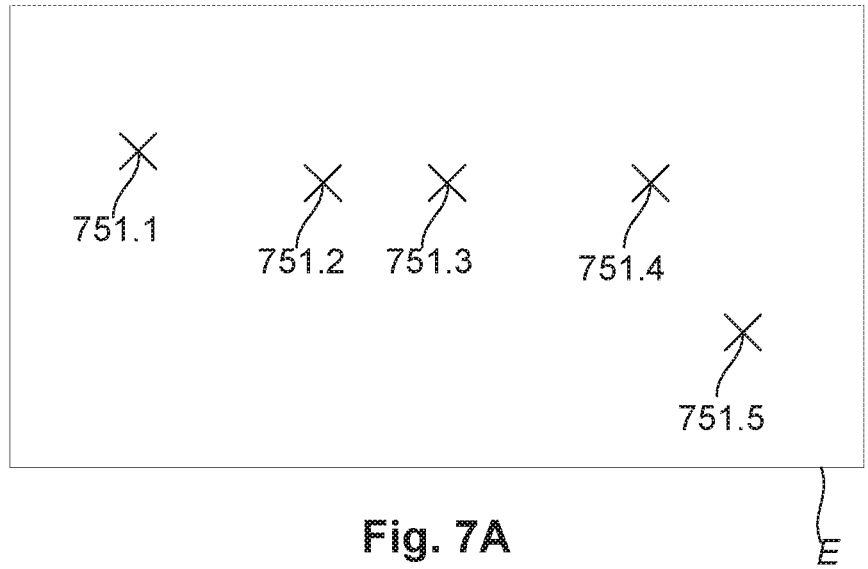
FIGS. 7A to 7G are schematic diagrams illustrating an example of the process for calculating a robot base path.
Figure 7B:
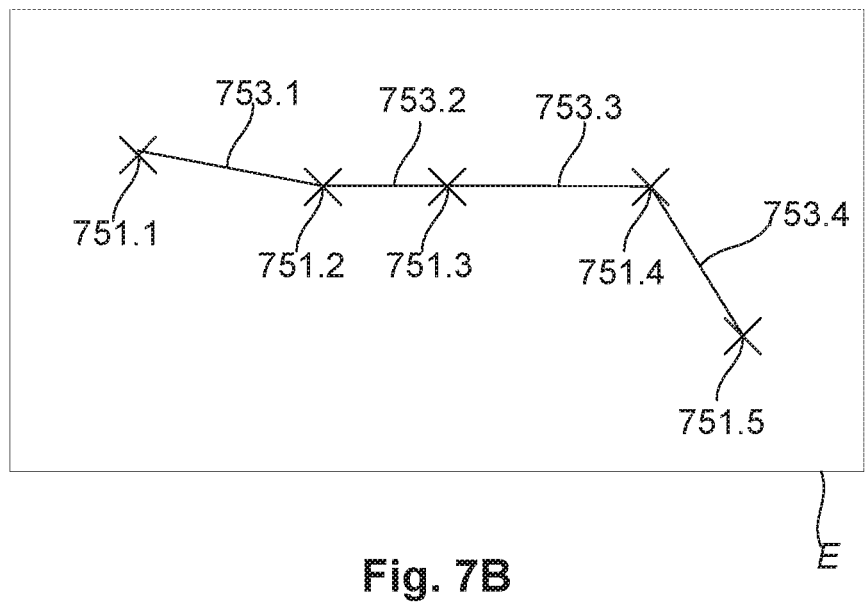

In this regard, as described above a number of destinations are acquired, with an example of five end effector destinations 751.1, 751.2, 751.3, 751.4, 751.5 being shown relative to the environment E in FIG. 7A. It will be appreciated that five end effector destinations only are shown for illustration and in practice a greater number may be examined. Next, the control system calculates path segments 753.1, 753.2, 753.3, 753.4 interconnecting the end effector destinations 751.1, 751.2, 751.3, 751.4, 751.5, with these typically being in the form of straight lines extending directly between the end effector destinations 751.1, 751.2, 751.3, 751.4, 751.5, as shown in FIG. 7B.

Figure 7C:
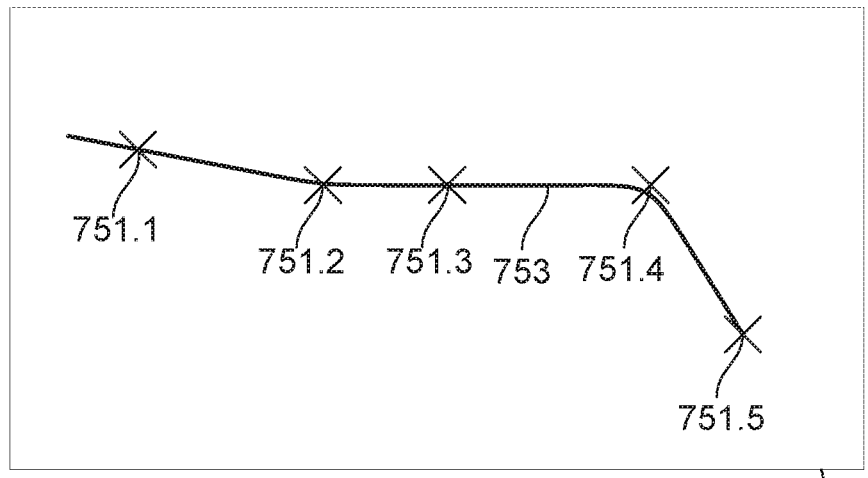

The interconnected path segments 753.1, 753.2, 753.3, 753.4 then undergo smoothing to generate the robot base path and an example of this is shown in FIG. 7C, in which transitions between adjacent path segments, and in particular points where the straight segments of the paths connect at angles, are curved.

Figure 7D:
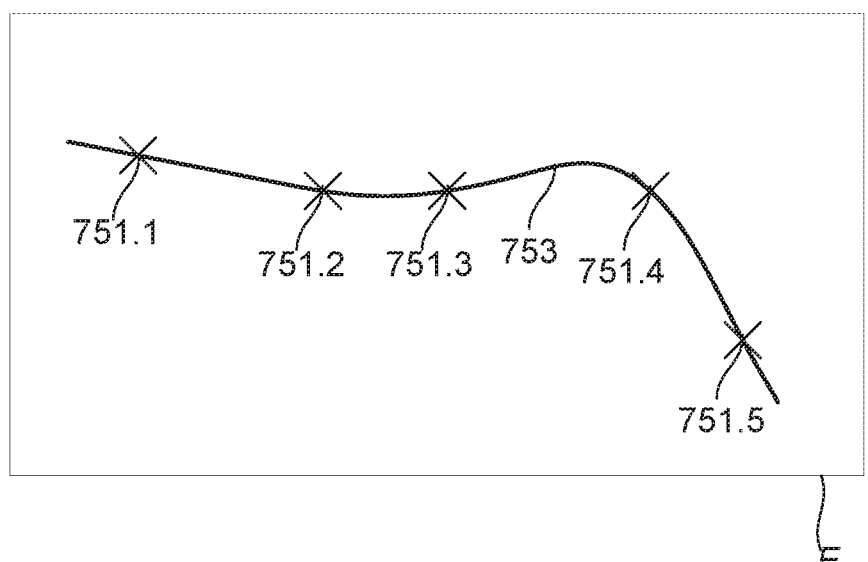

However it will be appreciated that this represents a very basic smoothing approach, and more aggressive smoothing approaches can be used, for example by deviating the path from the original straight path segments, and an example of this is shown in FIG. 7D.

Figure 7E:
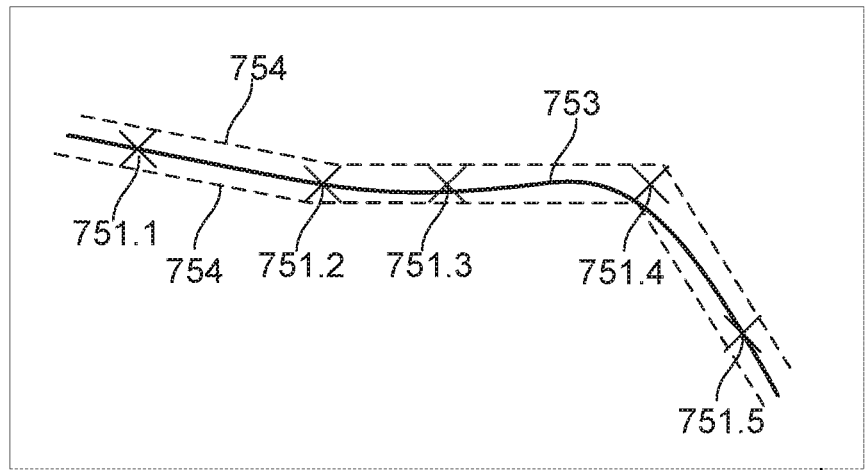

In the example of FIG. 7D, it is noted that the path is constrained to pass through each of the end effector destinations 751.1, 751.2, 751.3, 751.4, 751.5. However, this is not essential, and alternatively, the path can be constrained so that it always passes within a set distance of the end effector destinations 751.1, 751.2, 751.3, 751.4, 751.5. In one example, as shown in FIG. 7E, this is achieved by defining boundaries 754 a set distance from the straight path segments 753.1, 753.2, 753.3, 753.4 which interconnect the end effector destinations 751.1, 751.2, 751.3, 751.4, 751.5, with the resulting path being constrained to be located within the boundaries 754. The magnitude of the set distance of the boundaries 754 can be defined based on kinematics of the robot arm, with this being performed to ensure that the end effector is able to successfully reach the respective destinations assuming the robot base, and in particular the virtual robot base, follows the defined robot base path.

Accordingly, in this example, the robot base path passes within a set distance of each destination and/or is provided within a set distance of straight lines interconnecting adjacent destinations.

As part of the above described approach, the control system can calculate robot base path velocities for each of a plurality of path segments and then perform smoothing of the robot base path velocities to generate the robot base velocity profile, in particular so the velocity varies progressively along the path, thereby requiring minimum amounts of acceleration. For example, if two end effector destinations are positioned closely, such as the end effector destinations 751.2, 751.3, then this might require that the path segment 753.2 has a lower robot base path velocity than that of surrounding paths.

In one example, calculation of the robot base path is performed taking into account an end effector path length, an end effector velocity profile associated with the end effector path, robot kinematics and/or dynamics, as well as robot actuator kinematics and/or dynamics. For example, the path would typically be calculated taking into account a reach of the end effector, so that the path is within reach of the destination, thereby ensuring that the robot arm is capable of performing interactions assuming the robot base follows the robot base path. Similarly, this will also take into account dynamics and kinematics of the robot base actuator, to ensure the actuator is capable of implementing the robot base path.

It will be appreciated that in the above described example, the process is described assuming a virtual robot base position aligned with the end effector is used, similar to that described above with respect to FIGS. 4, 5A and 5B. In the event that such an arrangement is not used, then an offset would need to be introduced to calculate a desired robot base position from the end effector destination.

Figure 7F:
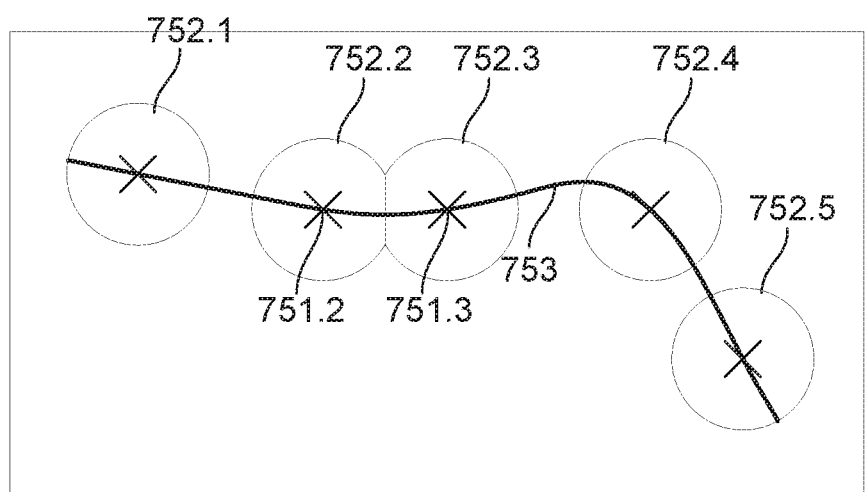
Figure 7G:
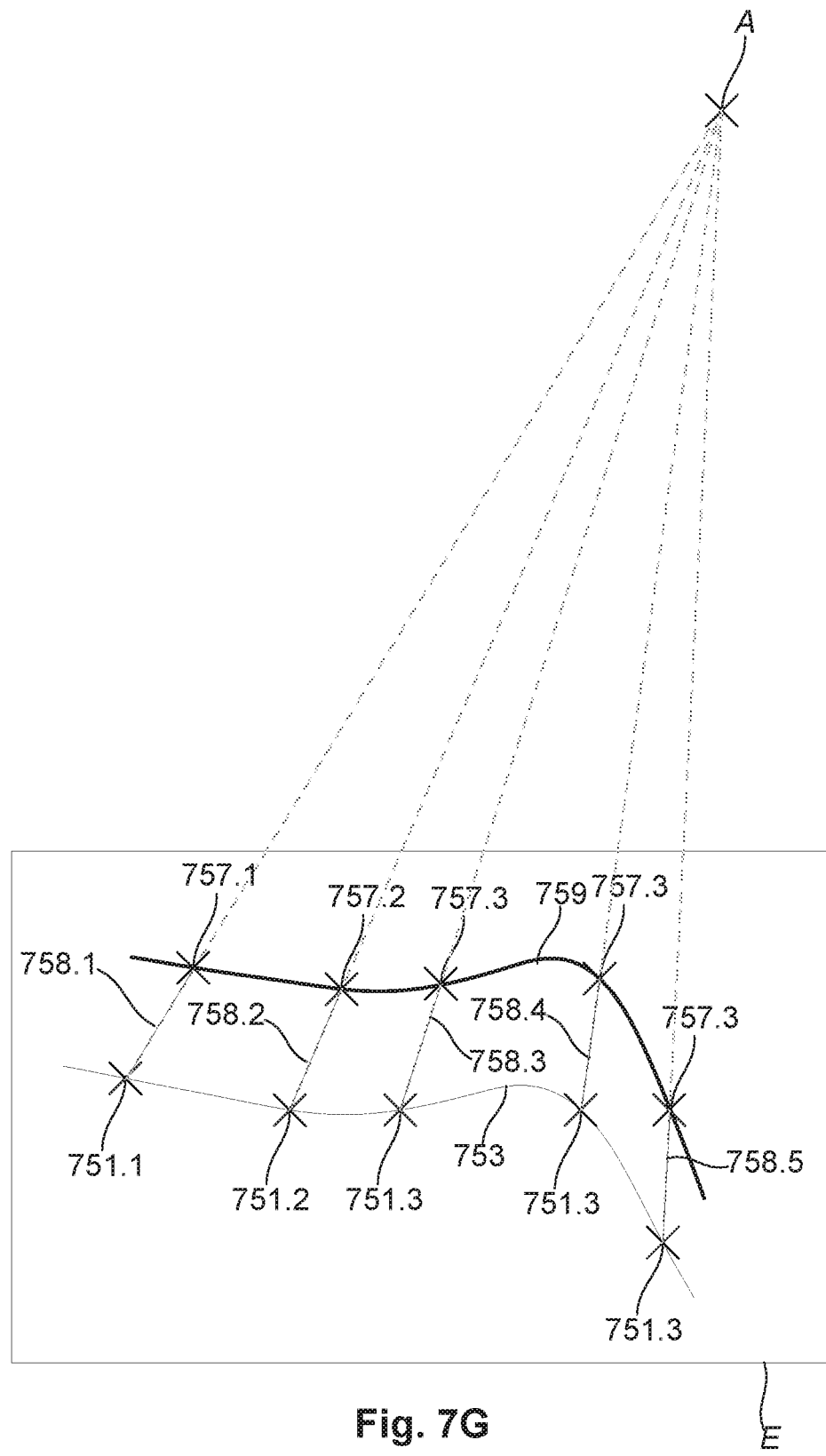

An example of this is shown in FIG. 7G, in which an offset 758.1, 758.2, 758.3, 758.4, 758.5 is added to the end effector destination 751.1, 751.2, 751.3, 751.4, 751.5 to represent the physical offset of the robot base 111 from the end effector 113. This leads to a number of robot base destinations, 757.1, 757.2, 757.3, 757.4, 757.5, which can then be used to calculate a robot base path 759, and it will be appreciated that this can be performed in a similar manner to that described above, albeit performing the calculation on the robot base destinations 757.1, 757.2, 757.3, 757.4, 757.5 as opposed to the end effector destinations 751.1, 751.2, 751.3, 751.4, 751.5.

In this example, the robot base actuator rotates about an axis A, meaning each offset 758.1, 758.2, 758.3, 758.4, 758.5, whilst having the same length, will be at a different orientation, and hence unique for each end effector destination. This further highlights the benefit of using the above described virtual robot base position when calculating robot base paths. In any event, it will be appreciated that otherwise the robot base path can be calculated using similar techniques to those outlined above with respect to the use of the end effector destinations and virtual robot base position and this will not therefore be described in any further detail.

Path planning can also take into account interaction dependencies. In this regard, interactions will typically have dependencies, so that for example laying a particular brick may require that one or more adjacent bricks are laid first. In this instance, the control system typically retrieves interaction dependencies, which are generally defined as part of an interaction plan, such as a construction plan, and then calculates the robot base path in accordance with the interaction dependencies, for example to ensure that interactions are not performed until dependency requirements are met.

Additionally and/or alternatively, path planning can take into account an interaction time, indicative of a time to perform an interaction, which is then used to calculate the robot base path velocity profile and optionally define an interaction window, which can then be used in controlling the robot base dynamically. In this regard, interaction windows typically correspond to a region of the environment surrounding the end effector destination or robot base destination in which the virtual robot base can be provided, whilst still allowing an interaction to be performed, and so this allows the velocity of the robot base as it traverses the robot base path to be controlled, for example depending on a completion status of the interaction.

An example of this will now be described in more detail with reference to FIGS. 8A to 8E. For the purpose of this example, explanation will be made with reference to the virtual robot base position, with the interaction window being calculated based on the end effector position, but it will be appreciated that the technique is equally applicable to arrangements not using the virtual robot base and/or interaction windows defined relative to a robot base destination.

Figure 8A:
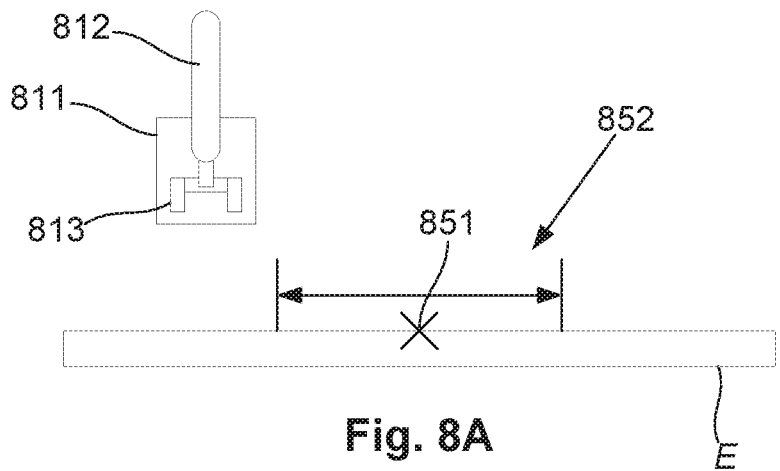
FIGS. 8A to 8E are schematic diagrams illustrating an example of an interaction performed in an interaction window.
Figure 8B:
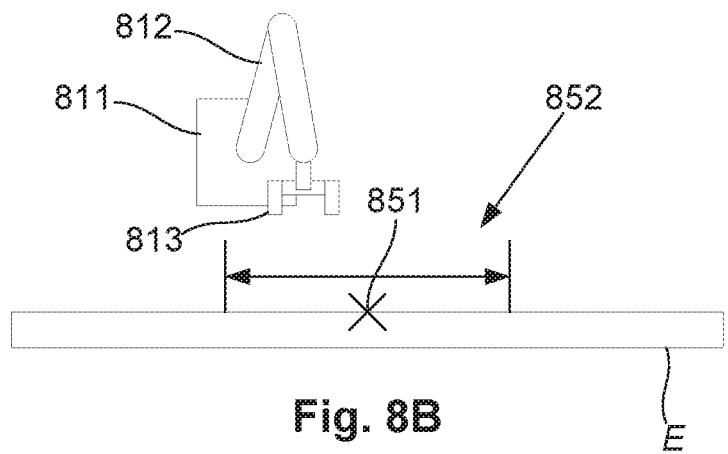
Figure 8C:
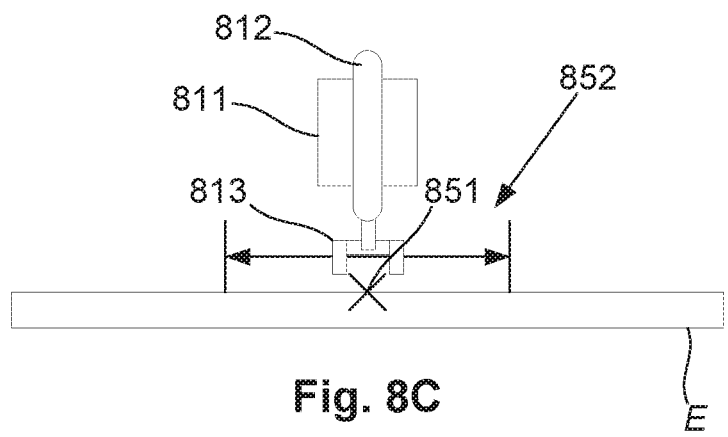
Figure 8D:
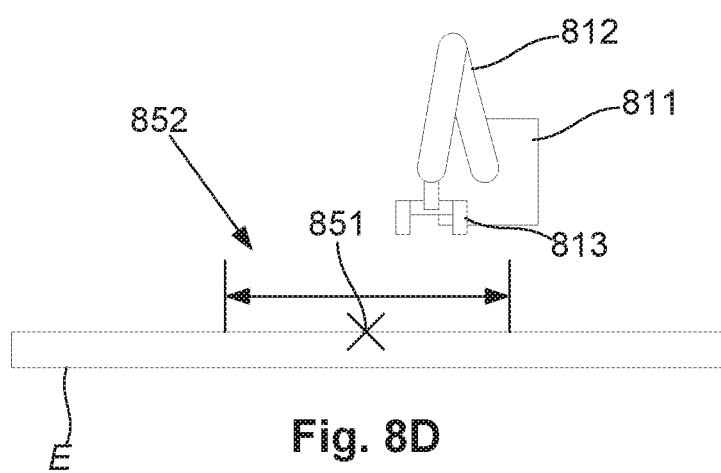
Figure 8E:
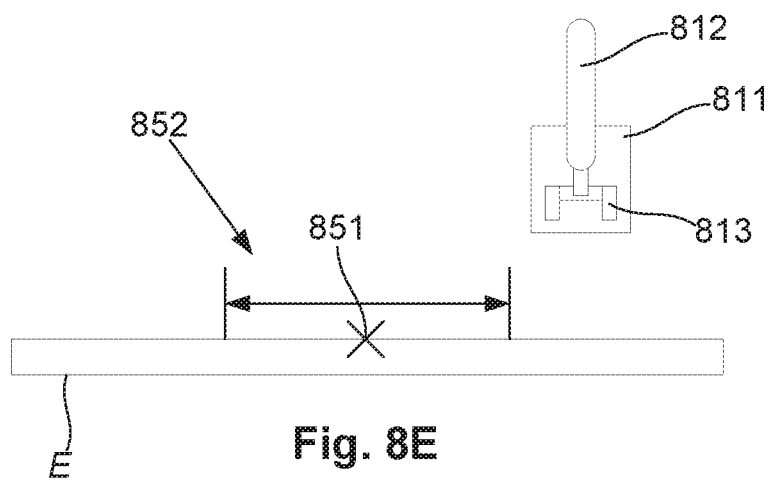

In this example, a robot assembly having a robot base 811, robot arm 812 and end effector 813 is shown. An interaction window 852 is defined relative to an end effector destination 851. As the robot base 811 approaches the interaction window 852, movement of the end effector commences, so that the end effector starts moving along an end effector path towards the destination 851, as shown in FIG. 8B. The end effector can then perform an interaction as shown in FIG. 8C, as the robot base 811 passes the destination 851, with the interaction being concluded as shown in FIG. 8D, and with the end effector returning to an original position as the robot base moves past the interaction window as shown in FIG. 8E.

The interaction windows are typically determined based on the interaction time and a velocity, so that the time required to perform an interaction, such as to pick up an object or place an object, corresponds to the time taken to traverse the interaction window at the defined robot base path velocity profile.

In one particular example, interaction windows are defined based on a set distance surrounding a destination, derived for example based on robot arm kinematics and/or dynamics such as the reach and or velocity of the end effector. An example of this is shown in FIG. 7F. In this example, multiple interaction windows 752.1, 752.2, 752.3, 752.4, 752.5 are provided around the destinations 751.1, 751.2, 751.3, 751.4, 751.5.

In this particular instance the destinations 751.2, 751.3 are sufficiently close together that the interaction windows 752.2, 752.3 would overlap, meaning a next interaction would need to start before a previous interaction has concluded. To take this into account, the extent of each window is reduced to allow the windows to abut at a point midway between the adjacent destinations 751.2, 751.3. It will be appreciated that in this instance, the windows are shorter than for other destinations, and accordingly, the robot base path velocity profile would need to be reduced to allow interactions to be performed within the interaction windows 752.2, 752.3 as compared to other interaction windows.

As an alternative to this however, a destination order could be altered, for example by omitting the destination 751.3 from the path and then returning to perform interaction at that destination at a later point in time. Whether this occurs will to some extent depend on whether or not this is feasible, and in particular this may depend on interaction dependencies, as discussed above.

Having defined the interaction windows, these can then be used in order to control movement of the robot base 811 and end effector 813 and in particular to ensure an interaction is completed without requiring a discrete velocity change. For example, the control system can monitor end effector interaction to determine a completion status, and selectively modify the robot base control signals to cause the robot base to move at different velocities, depending on results of the monitoring.

In one particular example, when the robot base path includes an interaction window associated with each end effector destination, as the robot base enters an interaction window the control system can control the robot arm to commence interaction and/or movement of the end effector along an end effector path to the end effector destination. The control system can then monitor interaction by determining if the interaction will be completed by the time the robot base approaches an exit to the interaction window, optionally progressively reducing the robot base velocity to ensure that the interaction is completed by the time the robot base reaches the exit to the interaction window.

In one example, the interaction includes a number of steps, and wherein the control system monitors the interaction by monitoring completion of steps. As part of this process, the control system determines an end effector path for a next step and then generates control signals to move the end effector to thereby complete the step.

Figure 9:
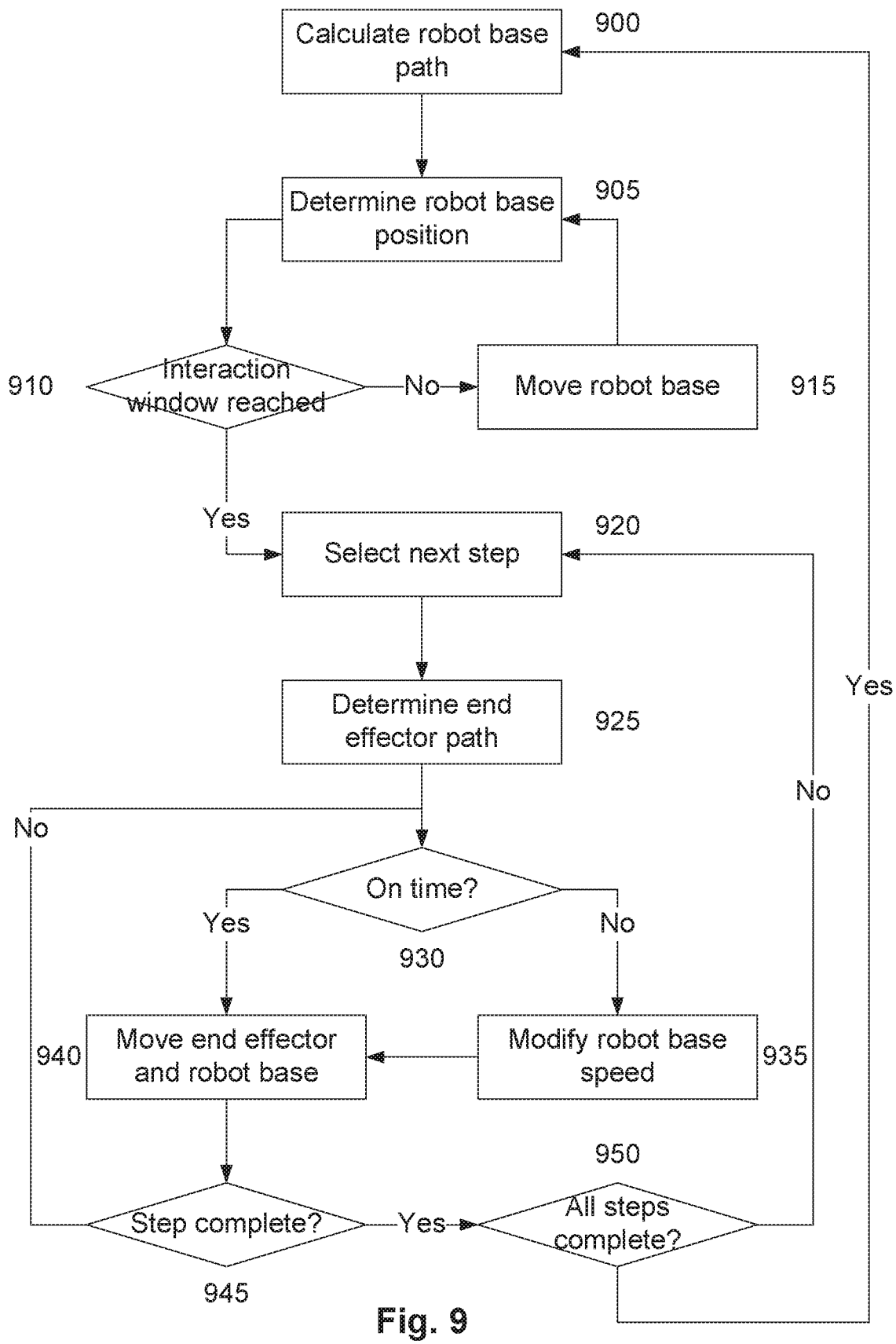
FIG. 9 is a flowchart of an example of a process for controlling robot base movement in accordance with a calculated robot base path.

An example of a control process using the above described path planning arrangement will now be described in more detail with reference to FIG. 9.

In this instance, at step 900 a robot base path is calculated. This is performed using the approached described above with respect to FIG. 6 and this will not therefore be described in further detail.

At step 905, a current robot base position is determined using signals from the tracking system, with this being used by the control system to determine if an interaction window has been reached at step 910. If not the movement of the robot base continues at step 915, with steps 905 to 915 continuing until an interaction window is reached at step 920.

Following this an interaction associated with the interaction window commences. In this regard, interactions typically consist of a sequence of steps, and may include moving the end effector to an end effector destination and then returning the end effector to a starting position, home or reference position. For example, in the case of brick laying, the interaction could involve collecting a brick from a presentation mechanism mounted on the boom and/or robot base, moving the end effector and brick to a destination in the environment to allow the brick to be laid, before returning the end effector to allow a next brick to be collected.

An end effector path associated with the next step is retrieved and/or calculated as required at step 925, with the control system determining if the interaction is proceeding on schedule at step 930. If not, the robot base speed is modified at step 935, so that the robot base is progressively slowed to a velocity below that defined in the robot base path velocity profile. This can be achieved in any manner, but in one example this is achieved by gradually scaling the velocity based on a proximity to an entry to and/or exit from the interaction window.

The end effector 813 and robot base 811 are moved at step 940, with the control system determining if the step has been completed at step 945. If not, steps 930 to 945 are repeated until the step has been completed.

Once the step has been completed the control system determines if all steps have been completed and if not goes on to select a next step otherwise returning to step 900 to calculate a new robot base path.

Accordingly, the above described arrangement operates to calculate a path that avoids discontinuities and/or sudden or sharp changes in direction or speed, to thereby minimise unintentional movements of the robot base, such as unwanted oscillations or other movements. Additionally and/or alternatively, the above described approach uses interaction windows to control the robot base speed during the process of performing interactions within the environment. In this regard, the interaction window is defined together with a path velocity profile, based on a time taken to perform the interaction, so that the interaction can be performed without deviating from the velocity profile. In operation, completion of the interaction is monitored with movement of the robot base along the robot base path being progressively slowed if the interaction is running behind schedule. This is performed to ensure that the interaction can be performed before the robot base exits the interaction window.

As previously described, movement of the end effector is typically controlled to take into account, and in particular correct for movement of the robot base, thereby enabling the end effector to be accurately controlled within the environment coordinate system ECS, irrespective of relative movement between the environment and the robot base. Thus, such DST dynamically adjusts the end effector in order to account for movement of the robot base, which can be used, for example, to keep the end effector static or moving along or in accordance with a defined path within the environment, irrespective of movement of the robot base.

Dynamic stabilisation technology can be implemented utilising different approaches and three example mechanisms will now be described, with these hereinafter being referred to as dynamic compensation, dynamic coordinate system and dynamic path planning.

Dynamic compensation operates by generating a path correction and applying the path correction when generating control signals that control the robot arm, so that the arm follows a modified path that brings the end effector back on to the original planned path.

Dynamic coordinate systems operate by calculating robot arm kinematics in a moving coordinate system which tracks movement of the robot base, so that the end effector always has a correct position in the environment coordinate system ECS. This generally involves shifting the origin of the robot arm kinematics, to ensure the end effector is correctly positioned.

Dynamic path planning involves recalculating end effector paths as the robot base and environment move relative to each other, so that the new path ensures the end effector always progresses to the end effector destination.

Figure 1C:
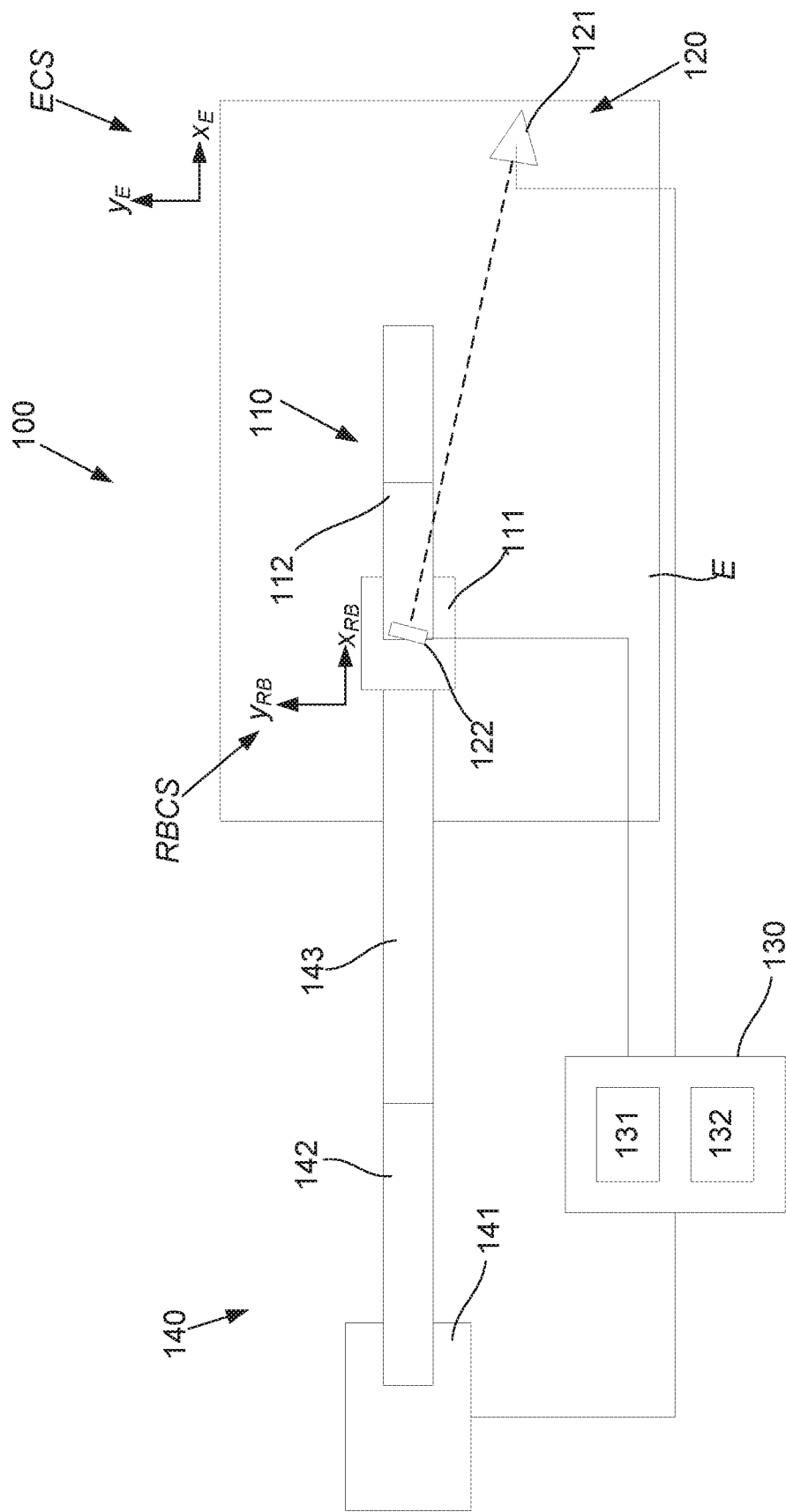
FIG. 1C is a schematic plan view of the system of FIG. 1B.

Accordingly, in one aspect a process for performing dynamic compensation is provided, and an example of this will now be described with reference to FIG. 10, and making reference to the system of FIGS. 1B and 1C.

In this example, at step 1000 the control system 130 acquires an end effector destination, which as will be appreciated can be achieved using techniques described above.

At step 1010, a reference robot base position is determined by the control system 130, with this typically being performed relative to the environment coordinate system ECS. The reference robot base position can be a current position and/or could be a position at a future point in time, and may therefore represent an expected position when the end effector is to perform an interaction, such as positioning an object within the environment.

An end effector path is then calculated by the control system 130 at step 1020, with the path extending to the end effector destination. This process can be performed at least in part using the reference robot base position in order to take into account any movement from the current robot base position to the reference robot base position and/or to transform between the robot base and environment coordinate systems RBCS, ECS, if this required. For example, the end effector path is typically calculated in the robot base coordinate system RBCS, as this allows control signals for the robot arm to more easily map to the movement, meaning the end effector destination is transformed from the environment coordinate system ECS to the robot base coordinate system RBCS. This is performed based on the relative position of the coordinate systems when the robot base is positioned in the reference robot base position, taking into account that the relative position of the robot base and environment coordinate systems RBCS, ECS will vary as the robot base 111 moves along the robot base path. However, this is not essential, and alternatively the current end effector position could be transferred into the environment coordinate system ECS, allowing the end effector path to be calculated in the environment coordinate system ECS.

Having calculated a path, at step 1030, a current robot base position is determined using signals from the tracking system. This is used to calculate a correction which is indicative of a path modification at step 1040. The nature of the correction and the manner in which this is calculated will vary depending upon the preferred implementation but in one example this is in the form of a vector representing deviation of the current end effector position with respect to the end effector path, as determined based on movement of the robot base. For example, if the robot base 111 undergoes movement away from an expected robot base position, this will result in equivalent movement of the end effector 113 away from the end effector path, which will need to be corrected in order to ensure the end effector continues to traverse the path.

Robot control signals are generated by the control system 130 at step 1050, based on the end effector path and the correction, with these being applied to the robot arm to cause the end effector 113 to be moved in accordance with the end effector path and the correction, so that the end effector moves back to the end effector path and continues towards the destination at step 1060. Steps 1030 to 1060 are then repeated as needed until the end effector has reached the destination.

Accordingly, the above described technique operates by calculating a correction based on a deviation of the current measured robot base position from an expected robot base position, using the correction when generating robot control signals to thereby correct the position of the end effector. In one example, the robot base moves with a slower dynamic response, whilst the end effector moves with a faster dynamic response, so that movement of the end effector can be used to correct for movement of the robot base away from an expected robot base position.

A number of different example scenarios will now be described with reference to FIGS. 11A to 11F, to more clearly explain operation of the dynamic compensation in a number of different scenarios. These examples show an end effector 1113 attached to a robot arm 1112, which is in turn attached to a robot base (which is not shown for clarity). The following examples will illustrate the dynamic compensation mechanism operating in two dimensions only, but it will be appreciated that this can extend to six degrees of freedom, and reference to two dimensions only is not intended to be limiting.

Figure 11A:
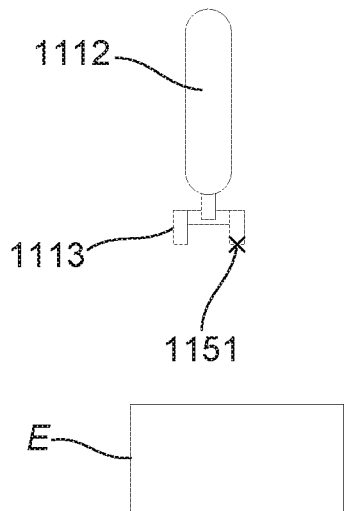
FIGS. 11A and 11B are schematic diagrams illustrating an example of the control process of FIG. 10 to provide the end effector at a static position.
Figure 11B:
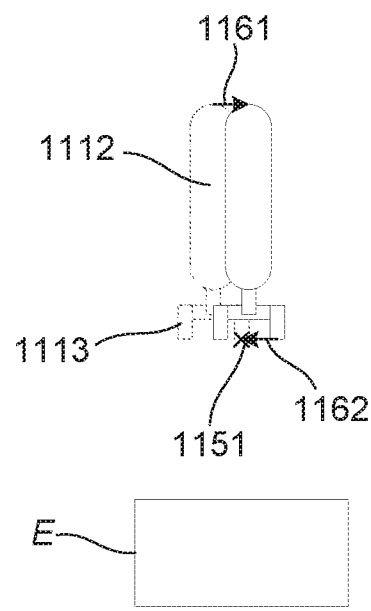

In the example of FIGS. 11A and 11B, the end effector destination is coincident with a current end effector position, meaning the calculated end effector path is in fact a null path with zero path length. Such an arrangement would be used in order to maintain a static end effector position within the environment E.

In this example, an unintentional movement 1161 of the robot base, for example caused by vibrations, wind loading of a boom, or the like, moves the robot arm 1112 and hence end effector 1113. As a result, the end effector 1113 is now offset from the destination 1151. In this instance, a correction is calculated based on the movement 1161, which generates a path correction, in this instance effectively creating a new path 1162, which causes the robot arm to move the end effector and counteract the unintentional movement 1161, thereby returning the end effector to the destination 1151. In this regard, the pose of the robot arm will change in accordance with the unintentional movement of the robot base in order to effect the path correction and bring the end effector 1113 back to the destination 1151.

Figure 11C:
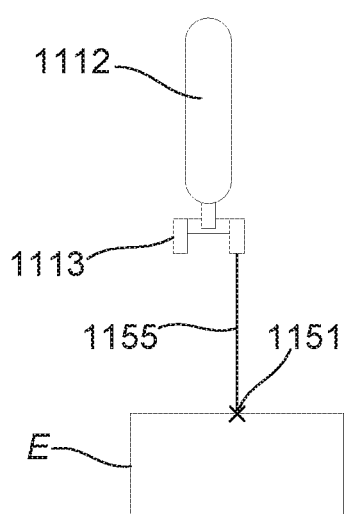
FIGS. 11C and 11D are schematic diagrams illustrating an example of the control process of FIG. 10 to move an end effector along an end effector path.
Figure 11D:
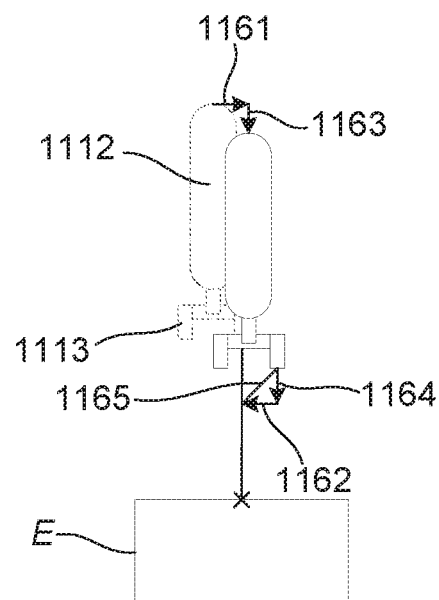

In the example of FIGS. 11C and 11D, the end effector 1113 is traversing along an end effector path 1155 to destination 1151. In this instance, unintentional movement 1161 occurs whilst the robot arm is simultaneously moving along the path as shown by the arrow 1163. In this instance, the correction is calculated to cause the end effector to move in accordance with arrow 1162, with this being combined together with a next movement along the path 1164, resulting in a net movement 1165, which returns the end effector 1113 to the original path 1155.

Figure 11F:
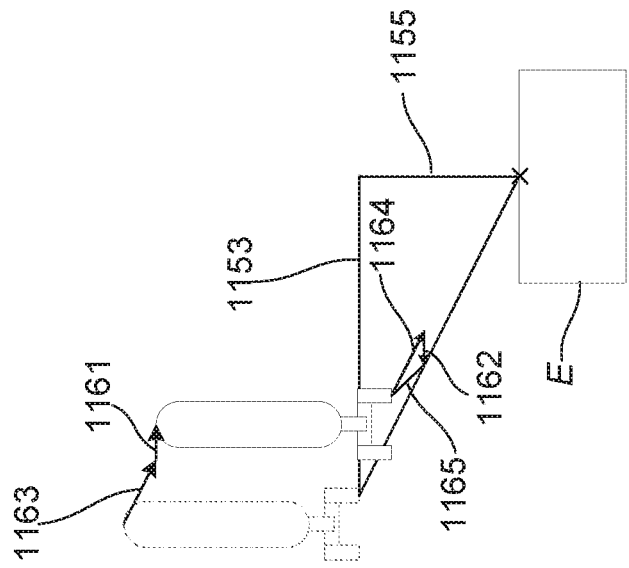
FIGS. 11E and 11F are schematic diagrams illustrating an example of the control process of FIG. 10 to move the robot base along a robot base path and the end effector along an end effector path.
Figure 11E:
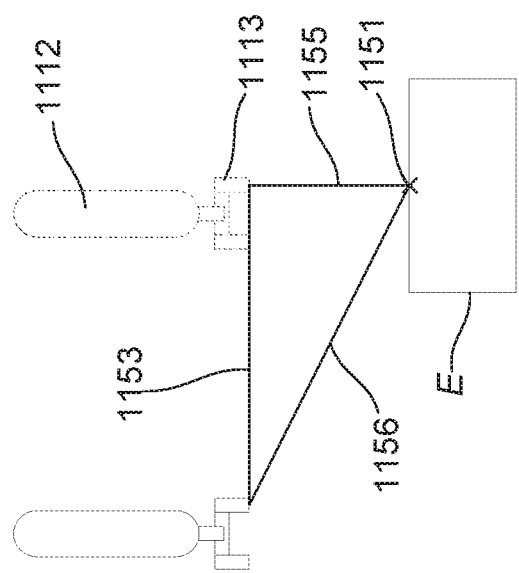

A further example shown in FIGS. 11E and 11F involves moving the end effector along an end effector path 1155, and simultaneously moving the robot base along a robot base path 1153. In this instance the reference robot base position is shown in dotted lines in FIG. 11E, which is based on the expected robot base position when the end effector 1113 reaches the end effector destination 1151. In this instance, from the reference robot base position, the end effector path 1155 is vertically down to the destination 1151, and with a net path 1156 being formed from a combination of the end effector path 1155 and the robot base path 1153, resulting in net end effector movement from the current end effector position to the destination 1151.

In this instance as the robot base and end effector 1113 are moved along the net path, as shown at 1163, an unintentional movement arises as shown as 1161. In this instance a correction 1162 is calculated which combined with next path movement 1164, results in the end effector moving along a path 1165, returning to the original net path 1156.

Accordingly, it will be appreciated that the above described processes operate to correct for at least unintentional movement of the end effector to thereby maintain the end effector 1113 at a desired position, or travelling in accordance with a desired path, within the environment coordinate system ECS, even though the end effector is controlled in the robot base coordinate system RBCS.

As mentioned above, in one preferred example, the control system 130 calculates the end effector path in the robot base coordinate system RBCS, whilst the end effector destination is typically defined in the environment coordinate system ECS. This involves having the control system 130 determine a transformed end effector destination by transforming the end effector destination from the environment coordinate system ECS to the robot base coordinate system RBCS, at least in part using the reference robot base position. The control system 130 can then calculate an end effector path extending to the transformed end effector destination in the robot base coordinate system RBCS. It will be appreciated however that this is not essential and alternatively path calculation can be performed in the environment coordinate system ECS.

In one example, the control system determines an end effector position and then calculates the end effector path using the end effector position, so that the end effector path extends from the end effector position to the end effector destination. The end effector position is typically determined in a robot base coordinate system using robot arm kinematics. In one example, the end effector position is the current position, but alternatively, the end effector position could be an expected position when the robot base reaches the reference robot base position, in which case the end effector position can be determined by transforming a current end effector position based on the reference robot base position.

The correction is typically indicative of a deviation of the end effector from the end effector path, which in turn is based on deviation of the robot base from an expected position. Accordingly, the control system calculates a robot base deviation based on the current robot base position and an expected robot base position, and then calculates the correction based on the robot base deviation. The expected robot base position can be based on a reference robot base position or a position the robot base is expected to be in based on traversal of a robot base path. Additionally, in situations where the end effector is being held stationary within the environment, the expected robot base position can be based on an initial or previous robot base position.

The reference robot base position is used to allow the calculation of the end effector path to take into account that the robot base is expected to move between end effector movement commencing and the destination being reached. Accordingly, while the reference robot base position can be a current or initial robot base position, more typically the reference robot base position is a predicted robot base position, based on movement of the robot base along a robot base path. Specifically, the reference robot base position is preferably an intended robot base position when the end effector reaches the end effector destination. Thus it will be appreciated that the reference robot base position could be calculated based on the expected position of the robot base as the destination is reached, so that the end effector moves along a direct path from the current position to the end effector destination in the robot base coordinate system RBCS.

When the reference robot base position is based on the position during interaction, the compensation need only account for unintentional movement of the robot base away from a robot base path extending to the reference robot base position. Although it will be appreciated this is not essential and alternatively the correction can take into account both unintentional and intentional movement. For example, the end effector path could be calculated based on an initial robot base position, with movement along a robot base path being compensated for using the end effector path.

In some circumstances it may be desirable to control the position of the end effector without using DST. An example of this arises when the end effector is interacting with objects solely within the robot base coordinate system RBCS, for example, to retrieve an object from a delivery mechanism mounted on the robot base. In this instance, as the object and end effector both move with the robot base, this does not require DST to be active.

Accordingly, the DST mechanism may need to be activated and deactivated, for example activating DST as the end effector transitions from collecting an object in the robot base coordinate system RBCS to placing the object in the environment E. As the robot base path might have undergone significant movement between the end effector path being calculated and DST being activated, fully activating the compensation mechanism could result in a large correction being calculated, which might not be practical as a result of robot arm dynamics.

Accordingly, in one example, the control system 130 scales the correction based on a relative distance of the current end effector position from the end effector destination. In particular, scaling can be used to effectively transition turning the DST on and off. Whilst any form of scaling could be used, the control system typically scales the correction using an S shaped curve, to progressively apply the correction. This gradually turns on the correction and reduces the rate of increase of the scaling as the end effector nears the destination, thereby reducing large end effector corrections.

In one particular example, the control system 130 moves the end effector 113 between first and second end effector destinations defined in the robot base and environment coordinate systems RBCS, ECS respectively, with the control system scaling the correction based on the relative distance of the current end effector position from the first and second end effector destinations. Consequently, no correction is performed when the end effector is near the first end effector destination, whilst full correction is performed when the end effector is near the second end effector destination.

Throughout the above example, reference has been made to a robot base and end effector position. However, it will be appreciated that DST can also be applied to the orientation of the end effector, meaning in effect the above described process is implemented based on the end effector and robot base pose, and with the end effector destination being in the form of an end effector pose.

In this particular example, the control system determines an end effector pose relative to the robot base coordinate system, calculates the end effector path using the end effector pose and a reference robot base pose in the environment coordinate system, determines a current robot base pose using signals from the tracking system and calculates the correction based on the current robot base pose. In this example, the correction is typically in the form of a vector indicative of movement in each of six degrees of freedom. The control system then controls the end effector pose, thereby providing correction in all six degrees of freedom.

Whilst the above example has focused on scenarios in which the robot base moves, it will be appreciated that this is not essential and the same techniques can be implemented when the robot base is static and the environment is moving relative to the robot base.

Figure 12:
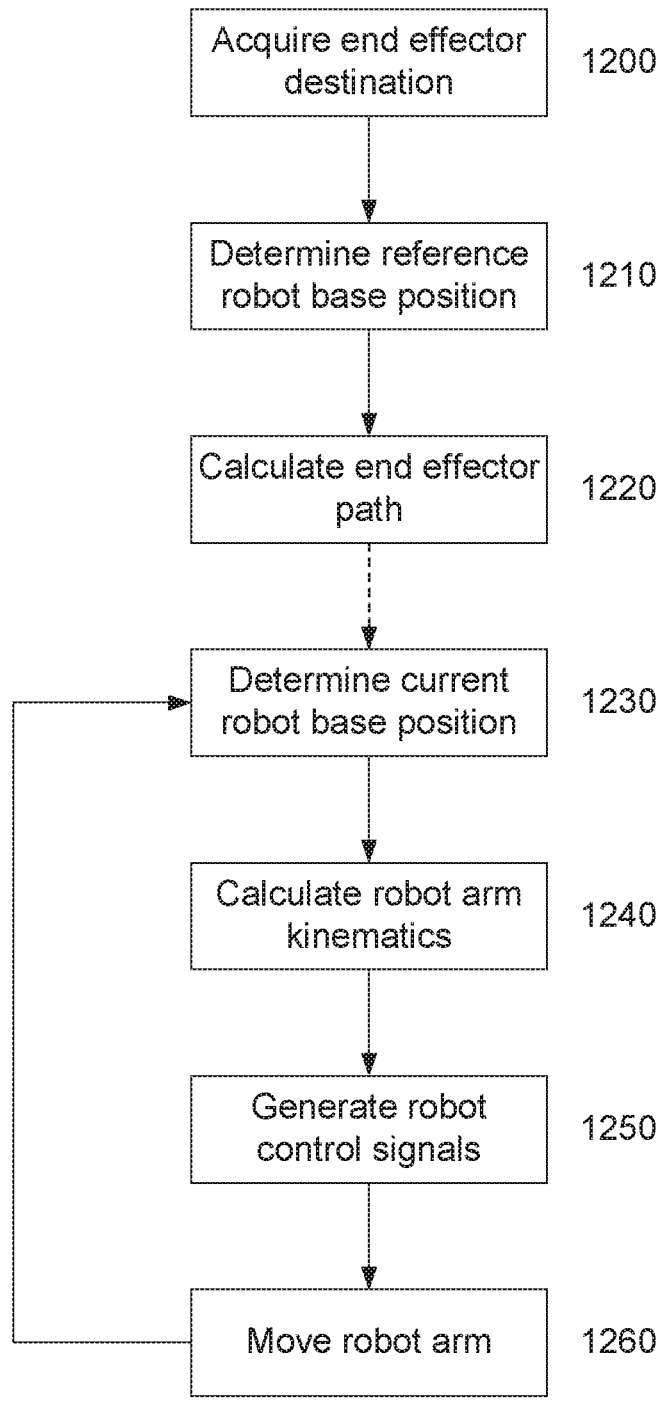
FIG. 12 is a flowchart of a second example of a process for controlling a robot arm to provide end effector stabilisation.

In one aspect a process for using a dynamic coordinate system is provided, and an example of this will now be described with reference to FIG. 12.

In this example, an end effector destination is acquired by the control system 130 at step 1200, using the techniques similar to those described above. At step 1210 the control system 130 determines a reference robot base position, which is typically determined in the environment coordinate system ECS, and which again could correspond to a current position, a position at which an interaction is expected to occur, or the like. At step 1220, an end effector path extending to the end effector destination is determined at least in part using the reference robot base position.

Figure 10:
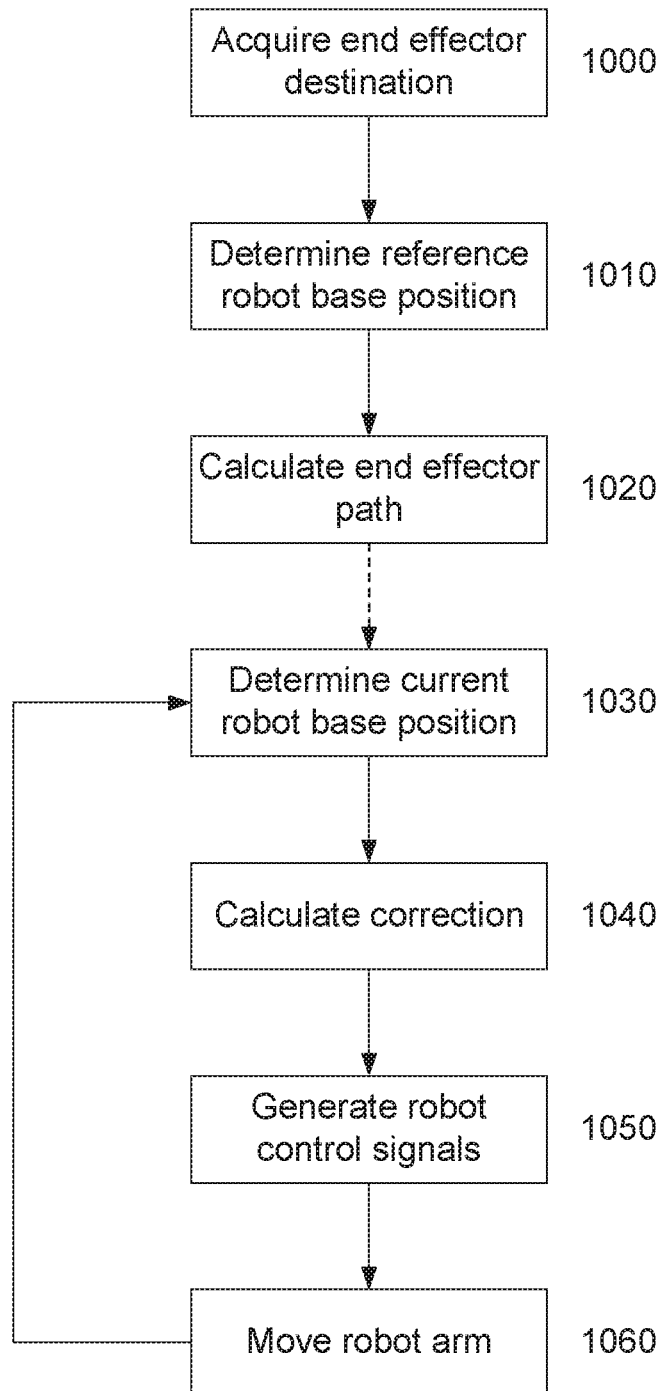
FIG. 10 is a flowchart of a first example of a process for controlling a robot arm to provide end effector stabilisation.

It will be appreciated that the above described steps 1200 to 1220 are generally similar to the equivalent steps previously described with respect to FIG. 10. However, in this example whilst the end effector path could be calculated in the robot base coordinate system RBCS more typically this is performed in the environment coordinate system ECS using the reference robot base position.

At step 1230, the control system 130 determines a current robot base position using signals from the tracking system 120. This is used to calculate robot arm kinematics at step 1240, so that the kinematics take into account the current robot position, and more typically a deviation from an expected robot base position. Specifically, in one example, the robot base position is used as an origin point of the robot arm kinematics, so that as the robot base moves within the environment coordinate system, this allows the origin point of the robot arm kinematics to be updated, allowing the robot arm to be controlled in the environment coordinate system.

At step 1250 control signals are generated based on the end effector path and the calculated robot arm kinematics, allowing the control system to apply the control signals to the robot arm at step 1260, thereby causing the robot arm to move. Steps 1230 to 1260 can then be repeated as needed, for example until an end effector destination is reached.

Accordingly, in contrast to the previous example which calculated a path correction indicative of a deviation of the end effector from a planned path, the above described example operates by modifying robot arm kinematics. In one particular example this is achieved by shifting an origin of the robot arm kinematic chain, based on movement of the robot base from an expected robot base position, so that the origin shift reflects movement of the robot base. This then modifies the positioning of the robot arm, so that the robot arm is controlled in a dynamic coordinate system that moves relative to the environment coordinate system ECS and enables the end effector to remain on the end effector path. This has the benefit of avoiding the need to calculate path corrections, and thereby reducing the computational complexity of performing DST.

Irrespective of this however, the robot base moves with a slower dynamic response, whilst the robot arm and hence end effector moves with a faster dynamic response, so that movement of the robot arm can be used to correct for movement of the robot base away from an expected robot base position, so that the end effector can be maintained in a desired position.

Figure 13A:
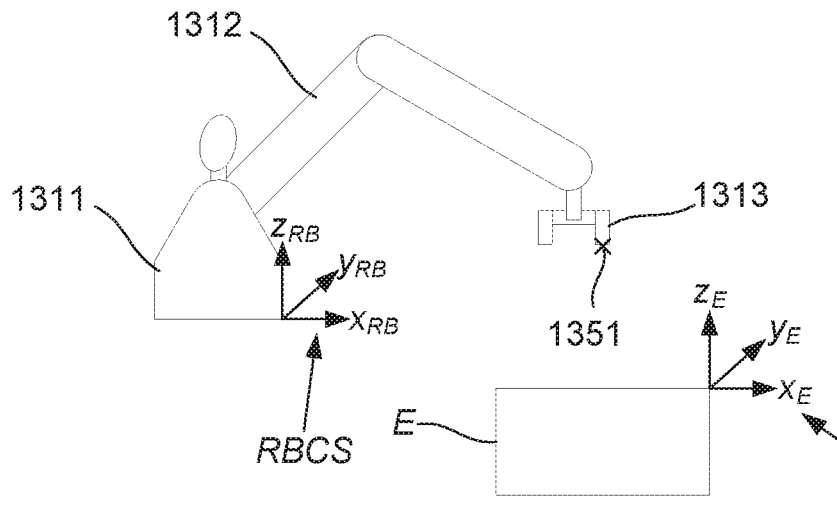
FIGS. 13A to 13C are schematic diagrams illustrating an example of the control process of FIG. 12 to provide the end effector at a static position.

A specific example correction will now be described with reference to FIG. 13A to 13C, which show an end effector 1313 that is attached to a robot arm 1312, extending from a robot base 1311. The following example illustrates the dynamic coordinate system mechanism operating in two dimensions only, but it will be appreciated that this can extend to six degrees of freedom, and reference to two dimensions only is not intended to be limiting.

In this example, the end effector is maintained at a stationary position relative to the environment coordinate system ECS, and so the calculated end effector path is controlled based on a null path having an effective zero path length. Accordingly, the end effector 1313 is initially provided coincident with the destination 1351, as shown in FIG. 13A.

Figure 13B:
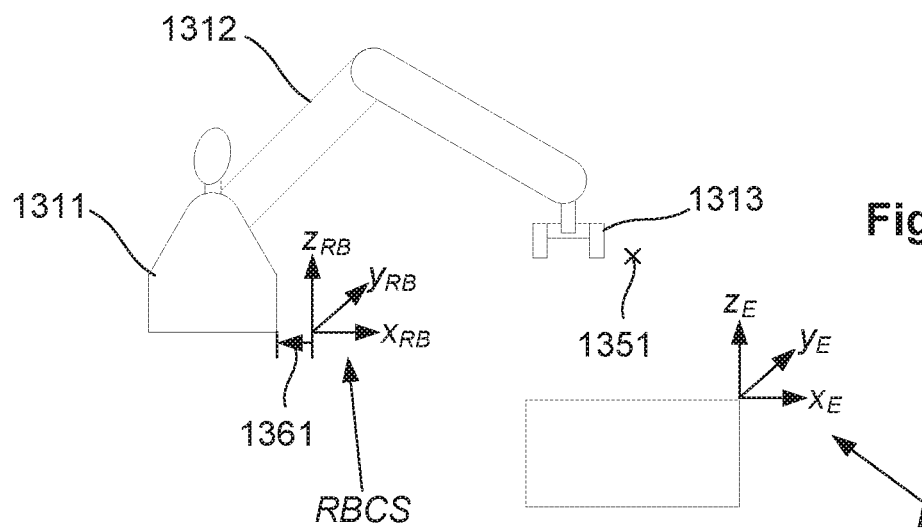
Figure 13C:
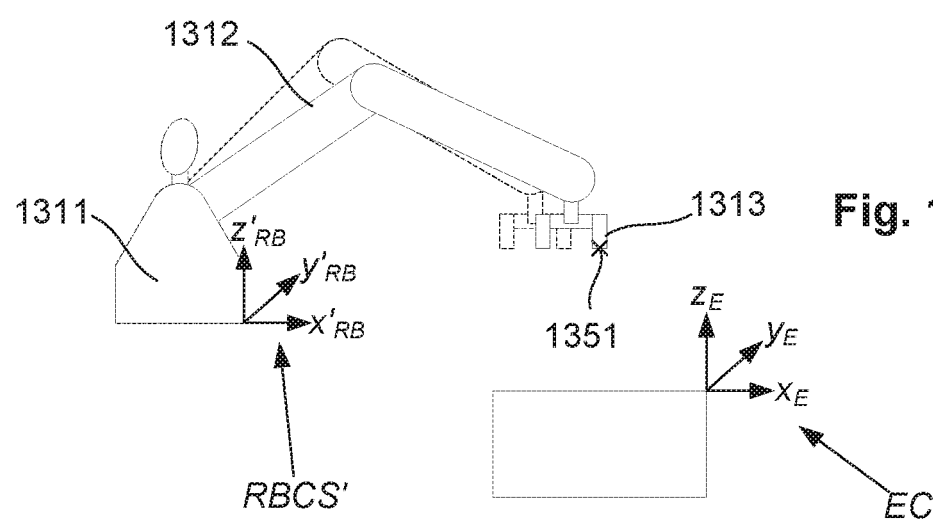

As shown in FIG. 13B, the robot base undergoes unintentional movement, moving a distance shown by arrow 1361, so that the robot base is now offset from the original robot base coordinate system RBCS. This results in a modified robot base coordinate system RBCS', which can be applied to the robot arm kinematics as a shift in origin of the kinematics, causing the robot arm kinematics to be recalculated so that the end effector is moved as shown in FIG. 13C, thereby aligning the end effector with the destination 1351.

Accordingly, for an end effector path having a zero path length, the calculated robot arm kinematics returns the end effector to the end effector destination to thereby maintain the end effector static within an environment coordinate system. In particular, as the origin of the kinematic chain of the robot arm dynamically shifts in the environment coordinate system, the end effector destination is used to update the inverse kinematics (i.e. joint angles for each link of the robot arm) necessary for the end effector to remain static to thereby compensate for the moving origin of the robot arm.

It will be appreciated that similar techniques can be applied when traversing the end effector 1313 along a path and/or when moving the robot base 1311 and this will not therefore be described in further detail. However, it will be appreciated that for an end effector path having a non-zero path length, the calculated robot arm kinematics return the end effector to the end effector path. In this regard, as the origin of the kinematic chain of the robot arm shifts, the control system determines the desired end effector position on the end effector path and calculates the inverse kinematics required to achieve the desired end effector position on the path. In this example, the dynamic origin of the kinematic chain of the robot arm and the end effector destination (which may be a final destination or path point along the end effector path) are both expressed in the environment coordinate system which simplifies control of the system.

In one example, the control system determines an end effector position and then calculates the end effector path using the end effector position, so that the end effector path extends from the end effector position to the end effector destination.

As mentioned above the end effector position is typically determined using robot arm kinematics, based on the robot base position in the environment coordinate system, allowing the end effector path to be directly calculated in the environment coordinate system ECS, and control performed in the environment coordinate system ECS, by shifting an origin of the robot arm kinematics based on movement of the robot base.

In another example, the end effector destination (i.e. desired end effector position) is determined in the environment coordinate system and then a transformation is applied to transform the desired end effector position into the robot base coordinate system RBCS. This is achievable since the origin of the robot base coordinate system RBCS is measured by the tracking system and expressed in environment coordinates. In this example, control could then be implemented in the robot base coordinate system RBCS by calculating the inverse kinematics required to move the end effector to the desired end effector position (which may be a path point along the end effector path or a final destination).

In one example, the end effector position is the current position, but alternatively, the end effector position could be an expected position when the robot base reaches the reference robot base position, in which case the end effector position can be determined by transforming a current end effector position based on the reference robot base position.

Typically the control system operates by calculating a robot base movement based on the current robot base position and then modifies the robot arm kinematics using the robot base movement. The movement is typically movement from an initial or expected robot base position, based on a robot base path extending to the robot base reference position. As in the previous example, the reference robot base position can be based on a current robot base position, a predicted robot base position based on movement of the robot base from a current robot base position, a predicted robot base position based on movement of the robot base along the robot base path, or an intended robot base position when an end effector reaches the end effector destination.

As in the previous example, although reference has been made to position only, the techniques are applicable to position and orientation. Accordingly, the end effector destination typically includes an end effector pose with the tracking system measuring a robot base pose and the control system determining a current robot base pose using signals from the tracking system and calculating the robot arm kinematics based on the robot base pose. In this case, the control system can determine an end effector pose and calculate the end effector path extending from the end effector pose to the end effector destination. Thus it will be appreciated that the above described technique can correct for variations in pose as well as adjusting for position only.

Whilst the above example has focused on scenarios in which the robot base moves, it will be appreciated that this is not essential and the same techniques can be implemented when the robot base is static and the environment is moving relative to the robot base. Additionally, whilst the description focuses on correction of unintentional movement only, it will be appreciated that the arrangement can also compensate for intentional movement of the robot base.

Figure 14:
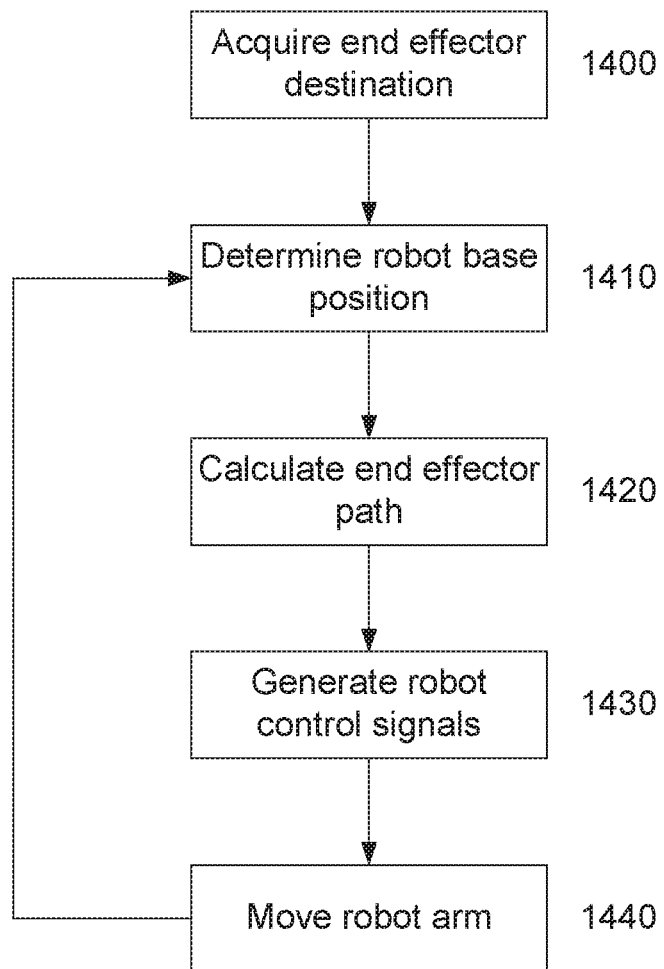
FIG. 14 is a flowchart of a third example of a process for controlling a robot arm to provide end effector stabilisation.

In one aspect a process for performing dynamic path planning is provided, and an example of this will now be described with reference to FIG. 14.

In this example, the end effector path is recalculated as needed based on movements in the robot base position. In order to achieve this, the control system 130 acquires the end effector destination at step 1400.

At step 1410, a robot base position is determined by the control system 130. An end effector path is then calculated at step 1420, with the path extending from the end effector position to the end effector destination. The path is typically calculated in the robot base coordinate system RBCS, which is achieved by transforming the end effector destination into the robot base coordinate system RBCS using the robot base position, although alternatively the path could be calculated in the environment coordinate system ECS.

At step 1430 robot control signals are generated with these being applied to the robot arm to cause the robot arm to move at step 1440. Steps 1410 to 1440 are then repeated as needed so that an end effector path is constantly recalculated based on a robot base position, for example taking into account deviation of the robot base position from a robot base path, thereby moving the end effector towards the destination.

A number of different example scenarios will now be described with reference to FIGS. 15A to 15F, which show an end effector 1513 that is attached to a robot arm 1512, which is in turn attached to a robot base (which is not shown for clarity). The following examples will illustrate the dynamic path planning mechanism operating in two dimensions only, but it will be appreciated that this can extend to six degrees of freedom, and reference to two dimensions only is not intended to be limiting.

Figure 15A:
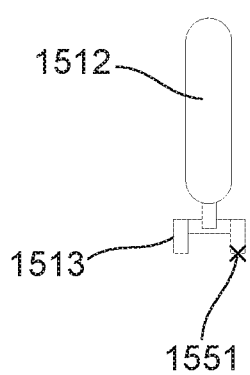
FIGS. 15A and 15B are schematic diagrams illustrating an example of the control process of FIG. 14 to provide the end effector at a static position.
Figure 15B:
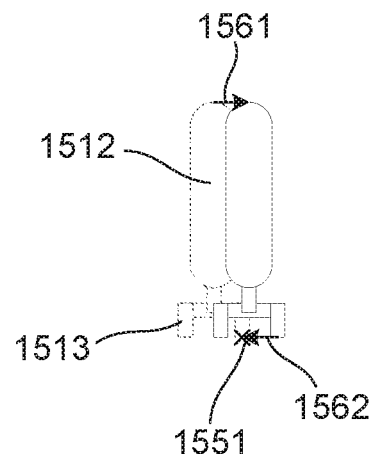

In the example shown in FIG. 15A, the end effector path is of zero length so that a static end effector position relative to the environment is maintained. Accordingly, the end effector 1513 is initially aligned with the destination 1551. Unintentional movement of the robot base introduces an offset 1561 which results in a new path 1562 being calculated at step 1430, which returns the end effector 1513 to the destination 1551.

Figure 15C:
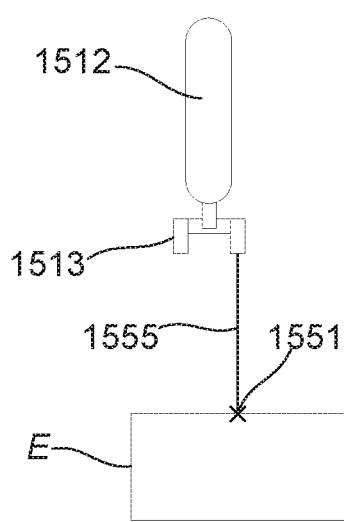
FIGS. 15C and 15D are schematic diagrams illustrating an example of the control process of FIG. 14 to move an end effector along an end effector path.
Figure 15D:
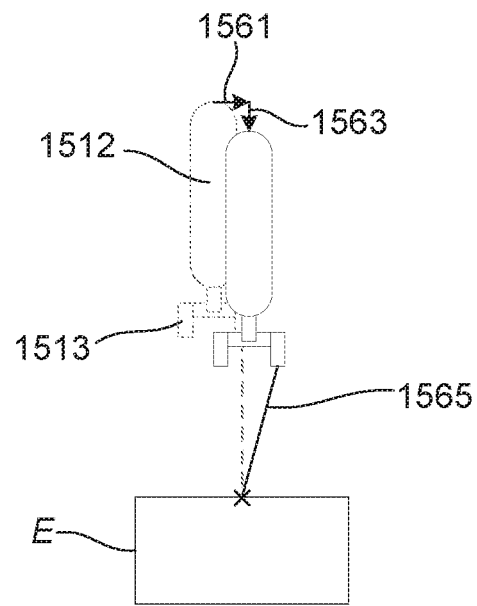

In the example at FIGS. 15C and 15D, the end effector 1513 is being moved along an end effector path 1555 to the destination 1551. In this instance, an unintentional movement results in an offset 1561 as the end effector is moved along the path 1563. This causes a new path 1565 to be calculated returning the end effector towards the destination 1551.

Figure 15F:
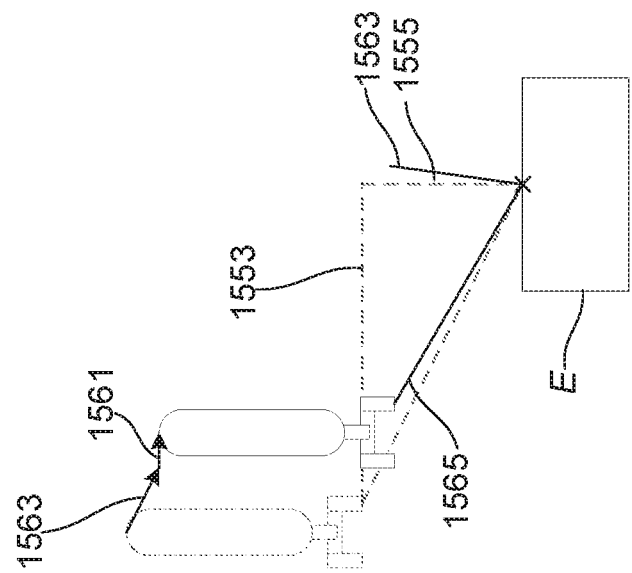
FIGS. 15E and 15F are schematic diagrams illustrating an example of the control process of FIG. 14 to move the robot base along a robot base path and the end effector along an end effector path.
Figure 15E:
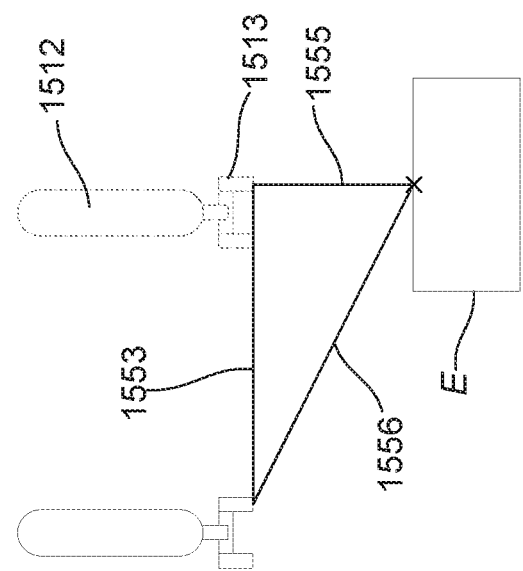

A further example is shown in FIGS. 15E and 15F, which involves moving the end effector along an end effector path 1555, and simultaneously moving the robot base along a robot base path 1553. In this instance, the reference robot base position is shown in dotted lines in FIG. 15E, so that the end effector path 1555 is initially calculated to be vertically down to the destination 1551 from the reference robot base position. The net path 1556 formed from a combination of the end effector path 1555 and the robot base path 1553 results in end effector movement from the current end effector position to the destination 1551.

In this instance as the robot base and end effector are moved along the net path as shown at 1563 an unintentional movement arises as shown as 1561. In this instance a new path 1565 is calculated from an updated reference robot base position, which when combined with robot base movement results in a new net path 1565.

It will be appreciated that whilst the above described technique requires that the path is constantly recalculated, which is generally computational more expensive than the previously described DST arrangements, this can have benefits. For example, the path traversed by the end effector tends to head in a more direct manner towards the destination, which then can result in a reduced number of path corrections and/or a reduced path distance. Additionally or alternatively, by reducing the number of corrections required, this avoids the end effector path oscillating around a target path to correct for movement of the robot base, which can reduce the need for sharp changes in direction, which can in turn help ensure that the path is within the constraints of the robot dynamics and can hence be more easily achieved.

As mentioned above, in one example, the end effector destination is typically defined relative to an environment coordinate system in which case the control system calculates a transformed end effector destination by transforming the end effector destination from the environment coordinate system ECS to the robot base coordinate system RBCS at least in part using the robot base position. An end effector path can then be calculated extending to the transformed end effector destination in the robot base coordinate system. However alternatively the path calculation can be performed in the environment coordinate system ECS.

In one example, the control system determines an end effector position and then calculates the end effector path using the end effector position, so that the end effector path extends from the end effector position to the end effector destination. The end effector position is typically determined in a robot base coordinate system using robot arm kinematics.

It will be appreciated that the current robot base position could take into account robot base movement along a robot base path. Accordingly, in this instance the end effector path would be calculated based on a reference robot base position, to take into account movement of the robot base along a robot base path, with the end effector path being calculated based on a deviation of the robot base position from the robot base path.

As in previous examples, the robot base moves with a slower dynamic response, whilst the end effector moves with a faster dynamic response, so that movement of the end effector can be used to correct for movement of the robot base away from an expected robot base position.

Whilst the above has been described with reference to position only, it will be appreciated that the techniques are also applicable to position and orientation. Accordingly, in one example the end effector destination includes an end effector pose and the tracking system measures a robot base pose. In this example, the control system determines a robot base pose using signals from the tracking system and calculates an end effector path based on the current base pose. In one particular example the control system determines an end effector pose relative to the robot base coordinate system and determines a current robot base pose using signals from the tracking system using both of these to calculate the end effector path.

Whilst the above example has focused on scenarios in which the robot base moves, it will be appreciated that this is not essential and the same techniques can be implemented when the robot base is static and the environment is moving relative to the robot base.

In one example, the control system includes a computer numerical control (CNC) system. In this regard, the CNC system can be formed as a standalone module, implemented as software, firmware, hardware or a combination thereof. In this instance, additional functionality can be calculated by other modules. For example, the system may implement a DST module, which interfaces with the CNC module, to allow the system to be controlled. For example, the DST module can calculate a correction or robot arm kinematic origin shift, providing this to the CNC module to allow the robot arm to be controlled.

Throughout the above examples, and particularly when implementing DST, the steps are repeated to constantly update or correct for movement of the robot base. This is typically repeated for processing cycles of the control system, and in particular consecutive processing cycles of the control system. Thus, a new correction, robot arm kinematic origin shift or new path can be calculated for each clock cycle of the control system. In a further example, this is also performed based on a refresh rate of the tracking system, so that a new correction, etc, is calculated each time the tracking system updates the robot base position. It will be appreciated from this, in one preferred example, the processing cycle of the control system and refresh rate of the tracking system have the same frequency, and even more preferably are time synchronised.

The control signals are typically generated taking into account an end effector velocity profile, robot dynamics and/or robot kinematics. This is performed to ensure that the robot arm is able to perform the necessary motion. For example, a calculated end effector path could exceed the capabilities of the robot arm, for example requiring a change in movement that is not feasible, or requiring movement at a rate that cannot be practically achieved. In this instance, the path can be recalculated to ensure it can be executed.

In one example, this can be achieved by performing a movement that corresponds to the original planned movement, but which is limited in magnitude to a feasible movement. In this instance, if further movement is required, this can be implemented in successive processing cycles.

An example of an overall control approach in which DST is performed using dynamic compensation will now be described with reference to FIGS. 16A to 16C. For the purpose of this example, it is assumed that the system is similar to that described above with respect to FIGS. 1B and 1C, with the robot arm being mounted on a boom.

In this example, a robot base path is retrieved at step 1600. It will be appreciated that this can involve calculating a robot base path, for example using the process described above with respect to FIG. 6.

At step 1602 tracking system signals are acquired with these being used to determine a current robot base pose at step 1604. In particular, this would be calculated based on a tracking target pose, and transformed into a current robot base pose using a geometrical transformation. As previously described, in a preferred arrangement, the robot base pose is preferably a virtual robot base pose, which is physically offset from the robot base, and aligned with the end effector.

At step 1606 it is determined if an interaction window is reached and if not the process moves on to step 1630. Otherwise assuming an interaction window has been reached a next step is selected at step 1608, with an end effector path being calculated and/or retrieved at step 1610, for example using steps 1000 to 1030 of FIG. 10.

At step 1612 it is determined if stabilisation is required and if not, for example if the step involves retrieving an object from a delivery mechanism mounted on the robot base, the process proceeds to step 1624.

Otherwise, at step 1614, a robot base pose deviation is calculated based on a deviation between a current robot base pose and expected robot base pose, as calculated from the robot base path. A scaling factor is then determined at step 1616, based on a proximity of the end effector to the end effector destination. At step 1618, the robot base deviation is used to calculate a correction in the form of a vector including offsets for each of six degrees of freedom, and representing the offset of the robot base pose from the expected robot base pose. The correction is then scaled based on the scaling factor.

A robot kinematic transform is calculated using the end effector path and the scaled correction at step 1620, with this being assessed to ensure dynamics are feasible at step 1622. In this regard, the correction may require that the robot arm undergo a movement which exceeds the robot arm's capabilities, for example requiring a movement that is too rapid. If the movement is not feasible, this can be recalculated or modified, for example by limiting the resulting magnitude of the correction based on the robot arm dynamics. In one example, this is achieved by returning to step 1618, to recalculate the correction. However, this is not essential and in one example, the control signals could be generated at step 1624 based on the robot arm dynamics to simply implement the correction to the maximum degree possible before the next processing cycle of the control system. Thus, if the correction requires end effector movement of 10 mm, but only a 5 mm movement can be achieved prior to the next processing cycle implemented by the controller, then the 5 mm movement would be implemented.

At this point, the control system 130 can determine if the interaction is proceeding on schedule at step 1626, and if not the control system 130 modifies the boom speed at step 1628, for example to slow down movement of the boom. Whether or not the boom speed is modified, the resulting boom control signals are generated by the control system 130 at step 1630.

Control signals are then applied to the respective actuators at step 1632, to thereby move the boom and end effector. Tracking system signals are acquired at step 1634, with this being used to determine a current base pose, following movement of the end effector and robot base, at step 1636.

At step 1638, an assessment is made of whether the step is completed and if not the process returns to step 1612 to again determine if stabilisation is required. Otherwise it is determined if all steps are complete at step 1640, with the process returning to step 1608 to select a next step if not. Otherwise the process returns to 1606 to determine whether a next interaction window has been reached.

It will be appreciated that by following the above described sequence, this allows the boom to be progressively moved along the boom path with interactions being performed by performing sequences of steps, with each step involving the determination of an end effector path with the end effector being moved along the end effector path to a destination.

Figure 16A:
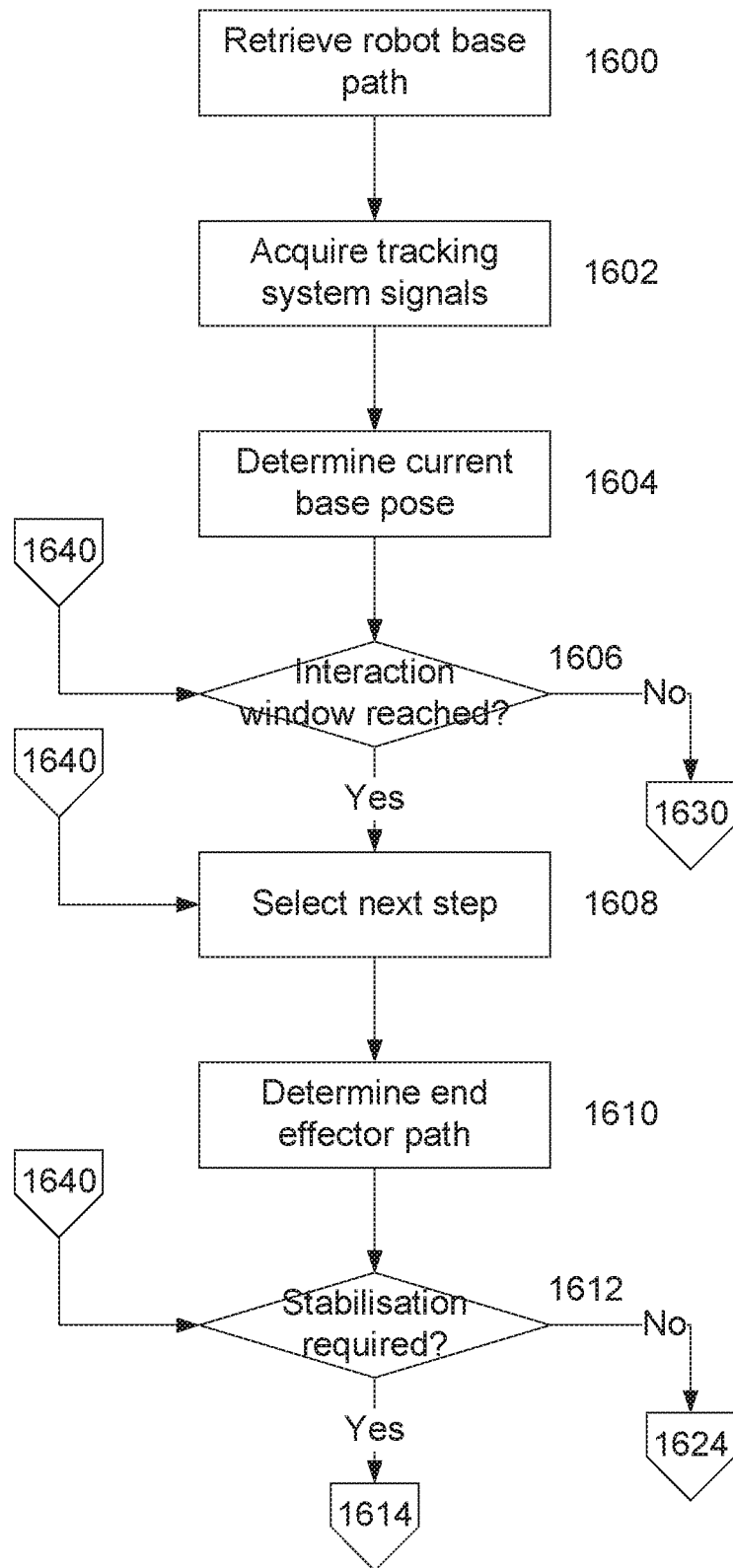
FIGS. 16A to 16C are a flowchart of a specific example of an end effector and robot base control process.
Figure 16B:
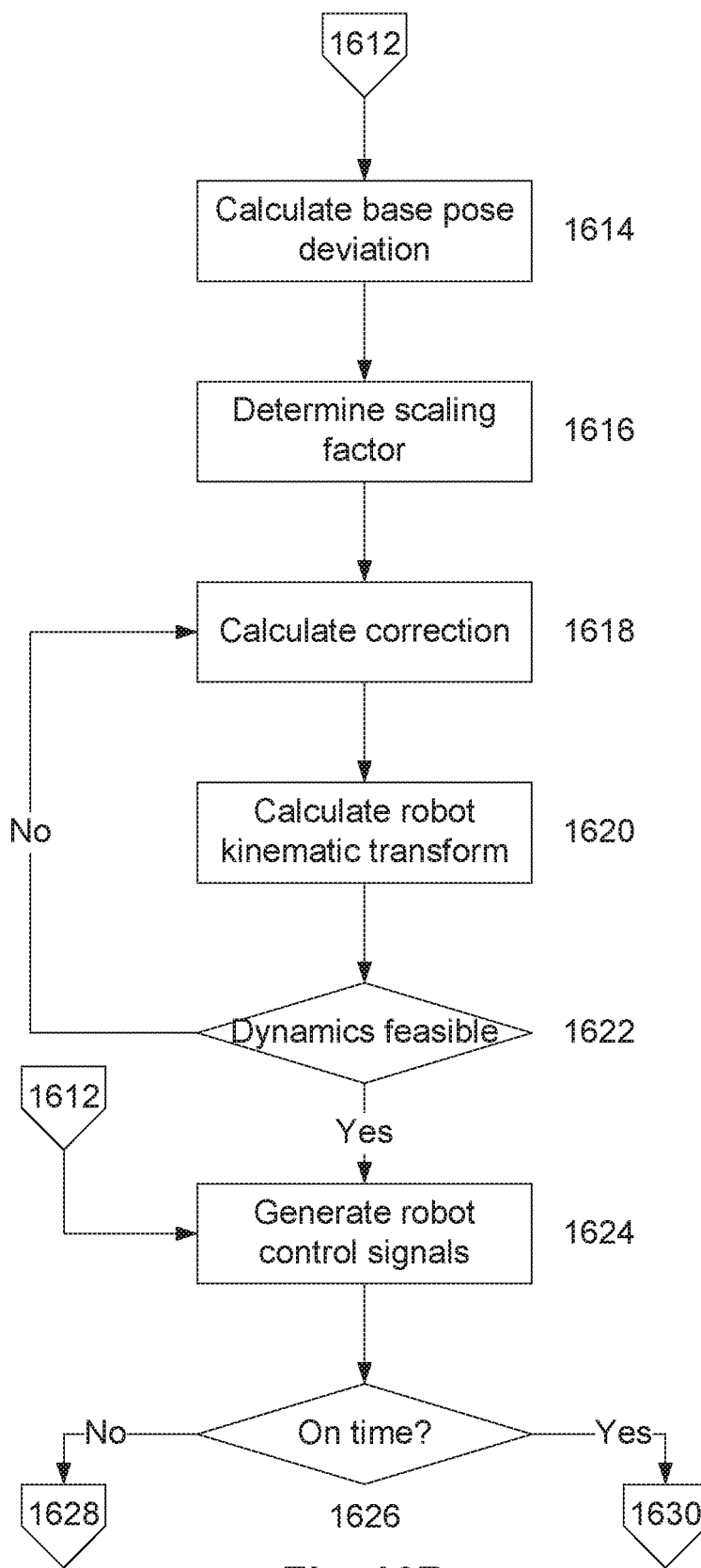
Figure 16C:
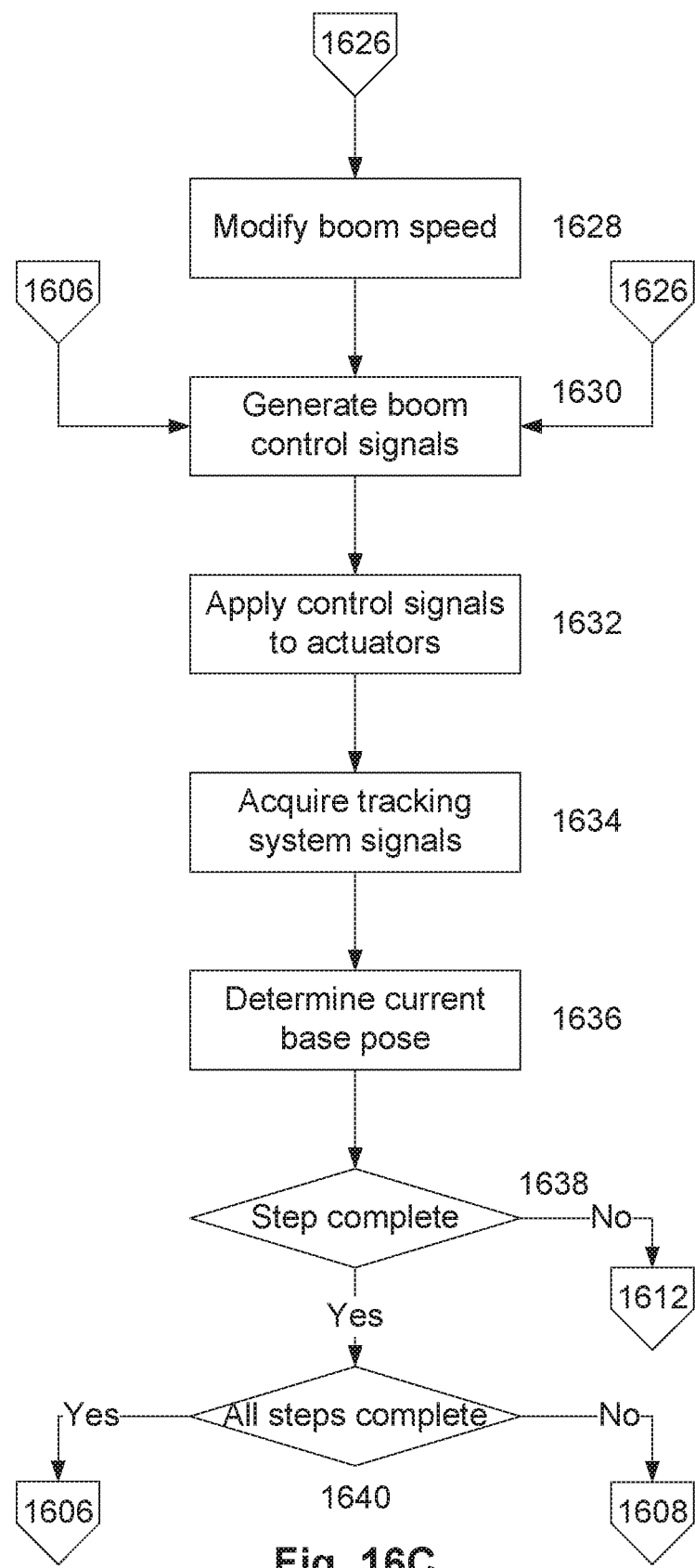

Whilst the example of FIGS. 16A to 16C focus on the use of dynamic compensation, it will be appreciated that similar approaches can be used for both dynamic coordinate system and dynamic path planning approaches to DST.

Figure 17:
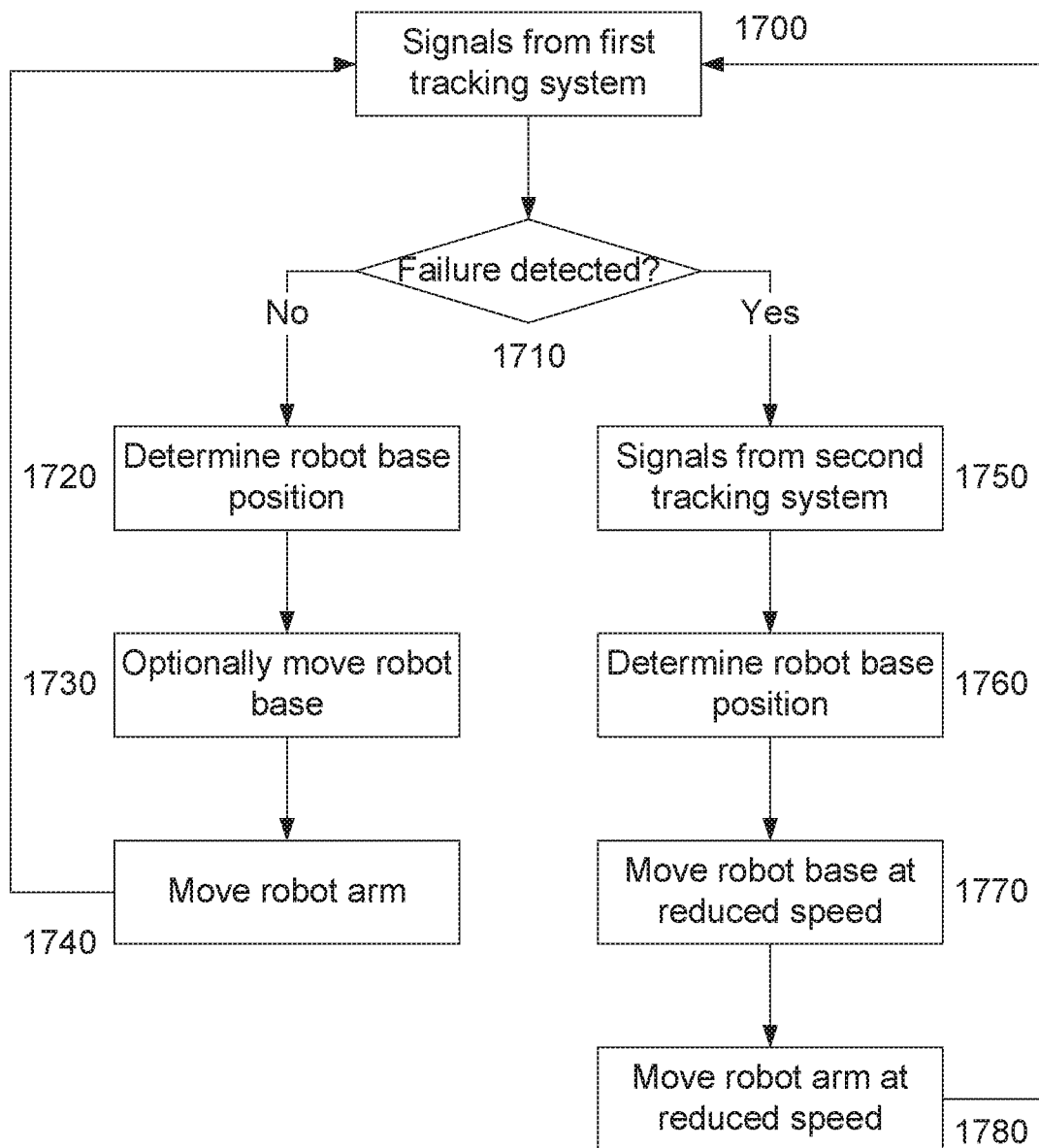
FIG. 17 is a flowchart of an example of a tracking system failure control process.

In one aspect a backup tracking process is provided, and an example of this will now be described with reference to FIG. 17.

In particular, the back-up tracking process is utilised in case the tracking system 120 fails. In this instance, the apparatus typically includes a first tracking system similar to the tracking system 120 described above, which measures the robot base position relative to the environment coordinate system ECS. A second tracking system is also provided, which measures movement of the robot base, for example using an Inertial Measurement Unit (IMU) 226 mounted on the robot base 111, which can communicate with the control system 130 via a respective IMU controller or processor. Such IMUs are well known and will not therefore be described in any detail.

In this arrangement, the first tracking system is typically used exclusively when functioning correctly, with the second tracking system being used as a back-up in the event that the first tracking system fails. In this regard, failure may arise for any one of number of reasons and could include a communications failure, processing failure, or could include occlusion of a tracking beam, such as a laser beam, in the case of a laser tracking system.

In this process, at step 1700 the control system 130 receives signals from the first tracking system, with these being used to detect failure at step 1710. This can be achieved in any suitable manner depending on the nature of the failure and examples of this will be described in more detail below.

If the first tracking system has not failed, the control system 130 calculates the robot base position and/or pose at step 1720, with the robot base and end effector being optionally moved at steps 1730 and 1740. Following this the process returns to step 1700, allowing this process to be repeated. Thus, it will be appreciated in this instance that if the first tracking system has not failed, then operation is substantially as previously described.

However, in the event that tracking system failure is detected at step 1710, signals from the second tracking system are acquired by the control system 130 at step 1750, with these being used to determine a robot base position and/or pose at step 1760. In practice the signals from the second tracking system are typically movement signals indicative of movement of the robot base, with these being used together with a last known location of the robot base, to determine the current robot base position.

At step 1770, the robot arm is optionally moved, depending on whether movement is required to follow a robot base path. In the event that movement occurs, this is typically at a reduced speed below that of the original robot base path velocity profile. Similarly, the end effector could be moved at step 1780, by moving the robot arm, with this again being performed at a reduced speed, compared to an end effector path velocity profile.

Following this the process returns to step 1700 with the control system 130 attempting to determine signals from the first tracking system to determine if this is functioning correctly, allowing the process to be repeated.

Accordingly, the above described system uses a first absolute position tracking system but reverts to use of a second movement tracking system, such as an inertial guidance system, in the event that the absolute position tracking system fails. As such inertial systems are typically not as accurate and are subject to drift over time, it is typical to move the robot base and/or robot arm more slowly to decrease risks of collision, and allowing the inertial to operate as accurately as possible.

Figure 18:
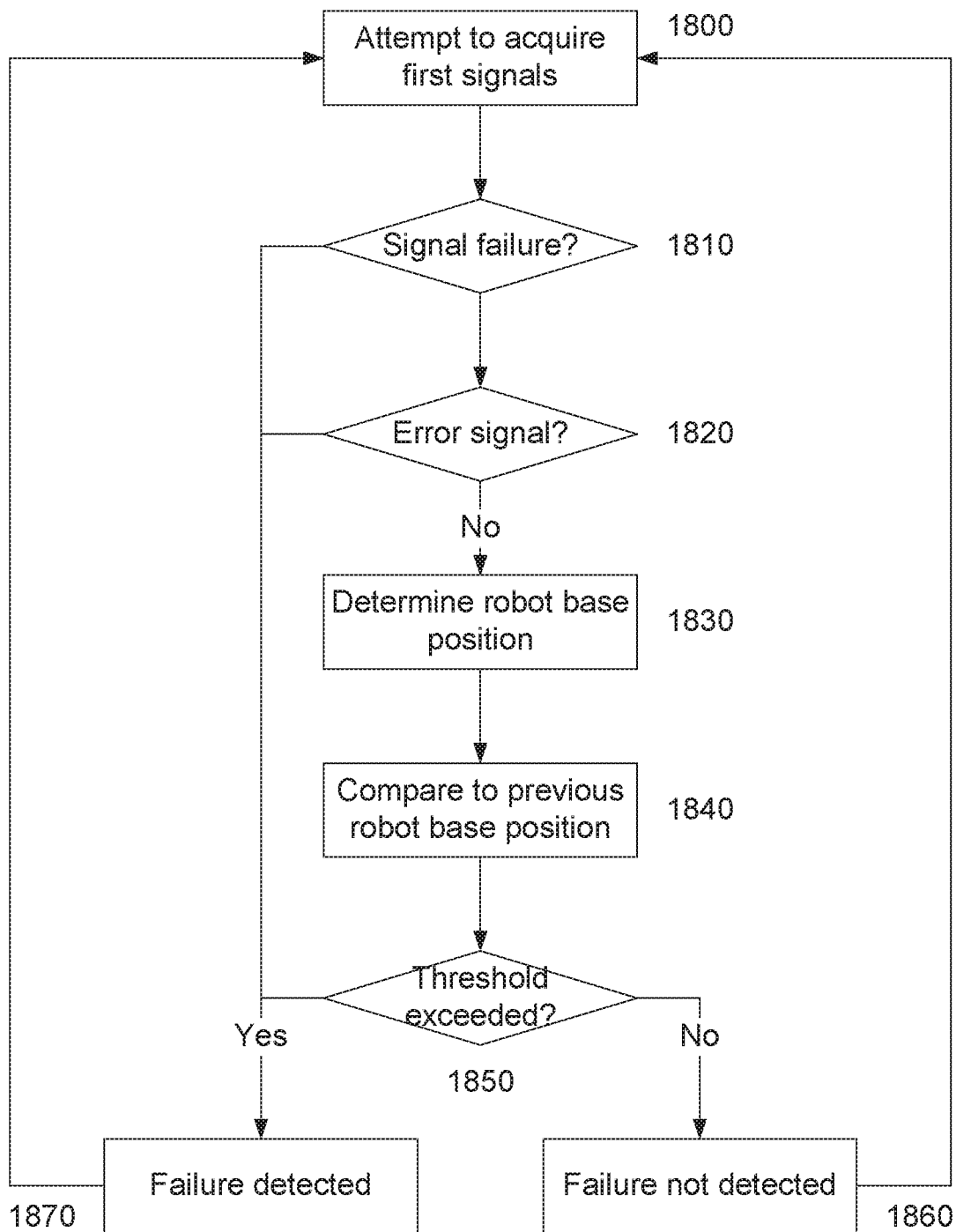
FIG. 18 is a flowchart of an example of a tracking system failure detection process.
Figure 19:
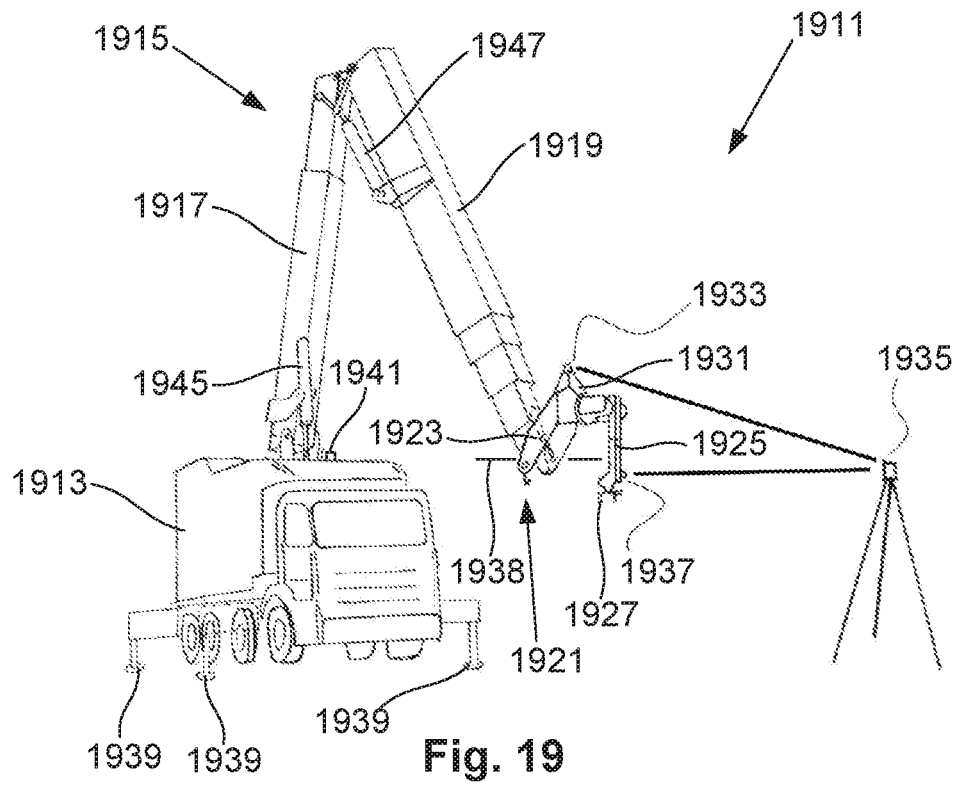
FIG. 19 is a schematic view of an implementation of an invention according to a first embodiment.

An example of the process for detecting failure will now be described with reference to FIG. 18.

In this example, at step 1800 the control system 130 attempts to acquire signals from the first tracking system. If signals cannot be acquired, then a failure is detected at step 1810, and the process moves on to step 1870. If signals are detected, these are assessed to determine if the signals are error signals at step 1820, if so a failure is detected and the process proceeds to step 1870.

Otherwise the control system moves on to determine a robot base position at step 1830. This is then compared to a previous robot base position to determine if a change in position exceeds a threshold, corresponding to a viable amount of movement. For example, if the degree of movement since the last position measurement exceeds the threshold, this is likely to indicate that at least one of the measurements is inaccurate and accordingly, a failure is detected at step 1870. Otherwise a failure is not detected, and the first tracking system can be used to determine the position of the robot base.

In the event of failure of the first tracking system, the control system 130 typically progressively reduces a robot base speed and halts movement of the robot base after a predetermined time period. Similarly the control system typically progressively reduces the end effector speed and halts movement of the end effector after a predetermined time period. Thus, the speed of the robot arm and robot base can be reduced progressively over subsequent processing cycle iterations, so that the robot arm and/or robot base stop after a set period of time, to thereby further prevent any collision. This can be achieved in any suitable manner, but typically involves scaling the end effector path velocity profile and/or robot base path velocity profile. In the event that the first tracking system commences correct operation again, the speeds can be progressively increased over subsequent processing iterations, to thereby gradually return the end effector and robot base to their intended velocities, thereby avoiding sharp transitions in velocity, which could in turn induce vibrations in the robot actuator, leading to unintentional movement of the robot base.

In addition to using signals from the second tracking system to control the robot arm and/or robot base actuator, the control system can also use signals from the second tracking system to control the first tracking system in an attempt to restore operation of the first tracking system. For example, if the tracking system operates by mutual position recognition of the tracking head and target, these can become unsynchronized should robot base move more than a set distance while the first tracking system is not operating. Accordingly, signals from the inertial sensing system can be used to guide the tracking head and target, allowing contact to be re-established without necessarily requiring that the robot arm is halted.

A further specific example will now be described. In particular, in this example, the control systems and methods of the invention have been developed by the inventor in connection with an automated brick laying machine. For a more detailed description of the brick laying machine, reference is made to the patent specification titled "Brick/Block Laying Machine Incorporated in a Vehicle" which is the subject of international patent application PCT/AU2017/050731, the contents of which are incorporated herein by cross-reference.

An example of the automated brick laying machine is shown in FIGS. 19 to 25.

In this example, the automated brick laying machine 1911 is built around a vehicle in the form of a truck 1913 and has a base supporting a telescoping articulated boom assembly indicated generally at 1915, comprising long telescopic boom 1917 and telescopic stick 1919. Mounted to a remote end 1921 of the stick 1919 is an end effector in the form of a laying head 1923 that supports a six axis robot arm 1925 that moves a further end effector 1927 to manipulate the bricks 1929. The robot arm 1925 has a robot base 1931, and mounted above the robot base 1931 is a first target in the form of a six degree of freedom (6 DOF) high data rate position sensor 1933, that provides 6 DOF position coordinates, relative to a fixed ground reference 1935, to a control system. Mounted on the end of the robot arm 1925 immediately above the end effector 1927 is an optional second target in the form of a 6 degree of freedom (6 DOF) high data rate position sensor 1937, which provides 6 DOF position coordinates, relative to the fixed ground reference 1935, to the control system. It will however, be appreciated that the end effector position could be determined based on the robot base position and the robot arm kinematics, thereby obviating the need for the second position sensor 1937.

The head 1923 is supported at the remote end of the stick assembly 1919 (remote end of the boom 1915) about a pivoting horizontal axis 1938 (horizontal with reference to the state of the vehicle 1913, assuming the vehicle is stabilised level, absent any torsion).

In a general embodiment, the vehicle 1913 supports a boom 1915 which supports a robotic arm 1925 that supports an end effector 1927. The head 1923 may optionally be omitted between the boom 1915 and the robot arm 1925, but given the tasks to be performed by the end effector 1927, particularly the application of adhesive in a brick laying application, it is more practical to include the head 1923.

The vehicle 1913 may be parked stationary or jacked up on support legs 1939. As an alternative, the vehicle 1913 may be programmed with a first CNC channel to move, or may be manually driven, along a path. In this case a further third target in the form of a 6 degree of freedom (6 DOF) high data rate position sensor 1941 may be provided, that also provides 6 DOF position coordinates, relative to the fixed ground reference 1935, to the control system. It will however, be appreciated that the vehicle position could be determined based on the robot base position and the boom kinematics, thereby obviating the need for the position sensor 1941. Where the vehicle traverses a path in this manner, there may need to be multiple fixed ground references of the same type of the fixed ground reference 1935. Alternatively, in another embodiment, a low data rate and low accuracy position sensor such as GPS could be utilised, but high data rate is preferred.

Figure 20:
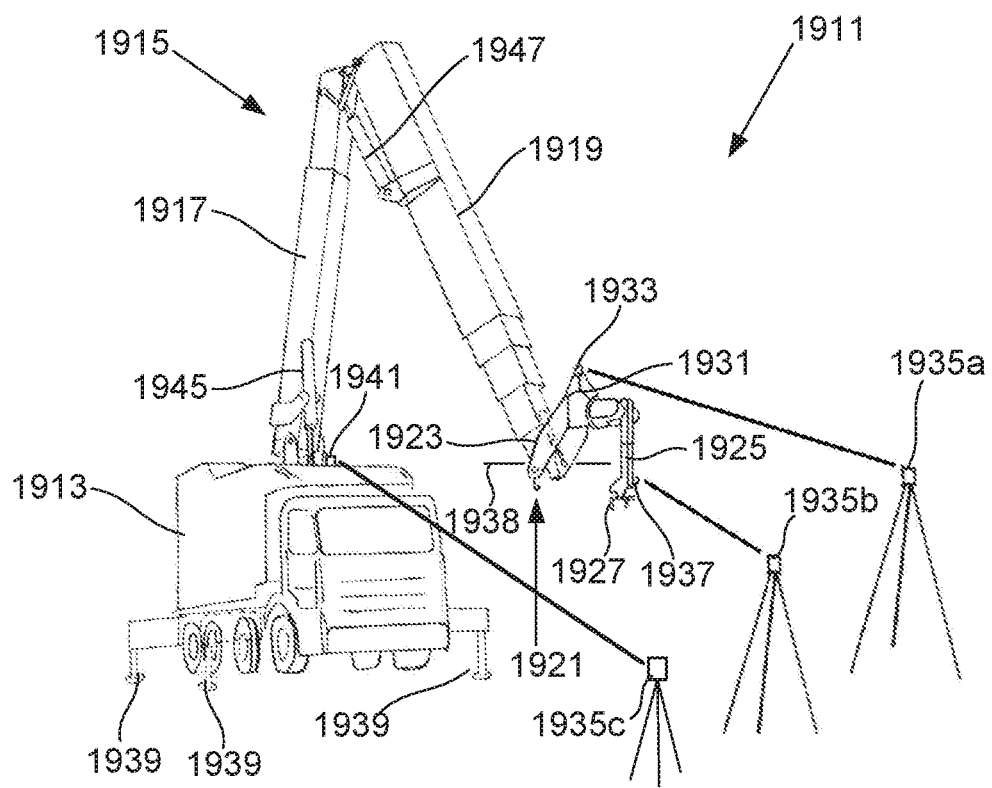
FIG. 20 is a schematic view of an implementation of an invention according to a second embodiment.
Figure 21:
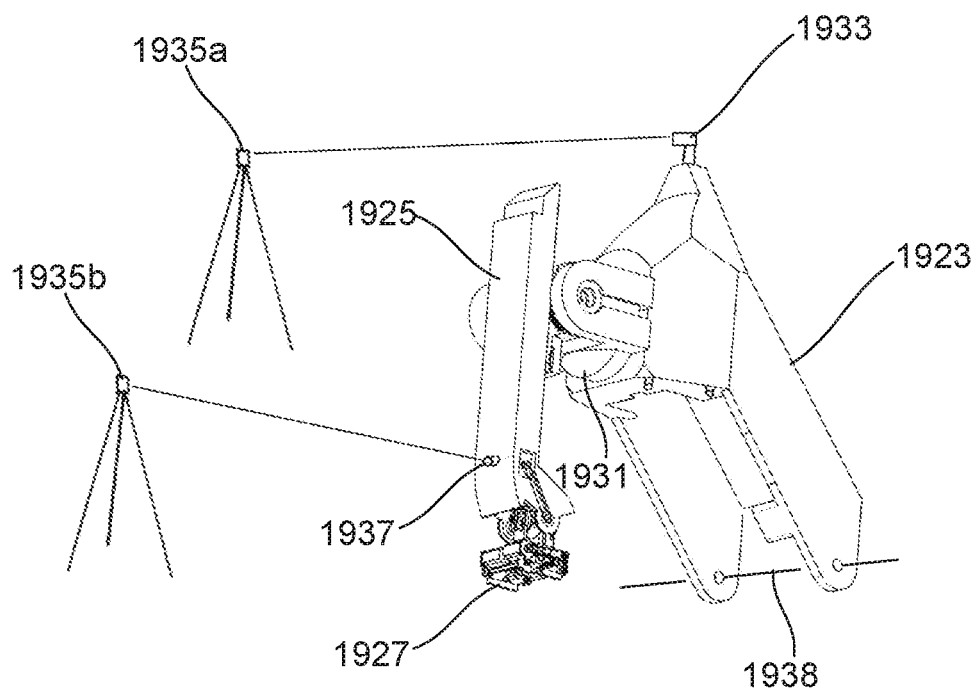
FIG. 21 is a view of the tracker system for interfacing to control the position of an end effector on the end of a boom according to an embodiment of the invention.

For faster data handling it may be desirable to have multiple ground references 1935*a*, 1935*b*, 1935*c*, each dedicated to their respective sensor 1933, 1937 and 1941, as illustrated in FIG. 20.

The boom 1915 is programmed with a second CNC channel to move the TCP of its end effector (located at the tip) of the boom to the required coordinates.

The robot arm 1925 is programmed with a third CNC channel to move the TCP of its end effector 1927 to conduct tasks.

Optionally the end effector 1927 may include a fine dynamic compensation mechanism for very accurate work. Such a system may include a galvo mirror to be used with a high power laser for laser cutting, engraving or 3D additive laser melting manufacture. The end effector is programmed with a fourth CNC channel to move the TCP of the fine dynamic compensation mechanism.

Figure 22:
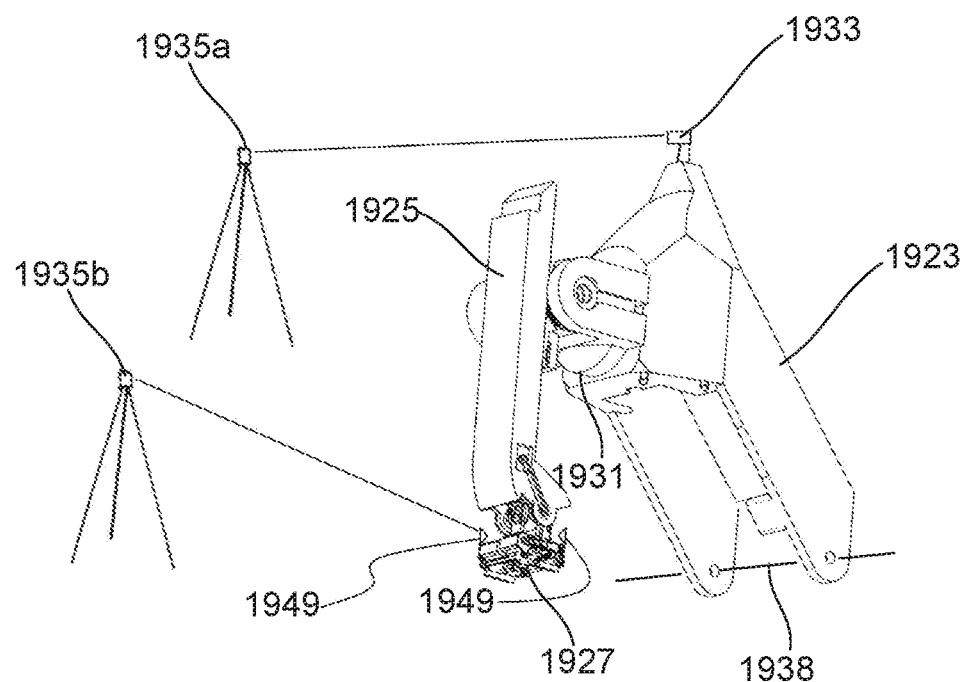
FIG. 22 is a view of the tracker system for interfacing to control the position of an end effector on the end of a boom according to an embodiment of the invention.
Figure 23:
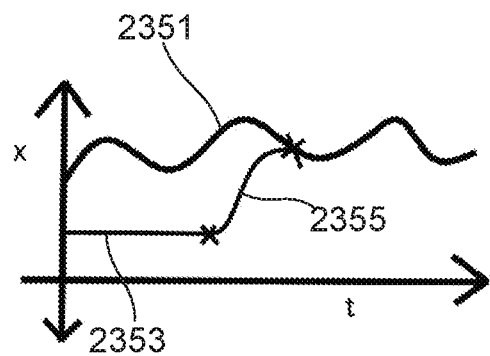
FIG. 23 is a graph showing implementation of damping of movement when stabilisation of the end effector is switched between a ground based first state and a machine based second state.

Referring to FIG. 22, detail of one embodiment is shown. A control system is provided for the boom 1915 supported from a boom base in the form of the truck 1913. The boom 1915 has the head 1923 mounted about a horizontal pivot axis 1938 at the remote end of the stick assembly 1919. The robot arm 1925 is mounted by the robot base 1931 to the head 1923. The end effector 1927 which comprises a gripper to pick up bricks is mounted for pitch roll and yaw movement to the end of the robot arm 1927.

The control system includes a boom controller interfaced with a boom actuator in the form of hydraulic rams 1945 and 1947 (and a rotating mechanism within the truck body—not shown) to move the boom 1915 relative to the vehicle 1913 by to position the head 1923 and hence the robot base 1931 to a programmed location. The control system also includes a robot arm controller interfaced with a robot arm actuator to position said end effector at a programmed position and orientation. The tracker system has fixed ground reference 1935a to track the position of the first target 1933 located by an offset proximal to the robot base 1931. The tracker system has fixed ground reference 1935b to track the position and orientation of one of two second targets 1949 (whichever is visible) located with a TCP offset from the TCP of the end effector 1927. The tracker system tracks the position of the first target 1933 and feeds data to said boom controller to operate said boom actuator with a slow dynamic response to dynamically position said first target 1933 close to said offset to position said robot base 1931 close to said programmed location, so that the end effector 1927 is within range of the position in which it is required to perform work. Since the targets 1949 move with the end effector 1927, and the end effector can move with six degrees of freedom, and the tracker system tracks both the position and orientation of said second target with six degrees of freedom and feeds data to the robot arm controller to operate said robot arm actuator (including the end effector) with a fast dynamic response to dynamically position and orientate said second target to said TCP offset from said programmed position and orientation.

The control system may controllably switch control of the robot arm controller between a first state where the robot arm controller is responsive to positioning feedback data derived from the tracker system, and a second state where pre-calibrated positioning data referenced to the robot base (and hence the remote end of the boom) is relied on. The movement at the end effector 1927 relative to the robot base 1931 is represented by trace 2351 in FIG. 23, which shows deviations due to dynamic structural effects on the boom, wind deflection or vehicle movement, and the second state position for the robot arm is indicated at 2353. When switched between the first state and the second state, said robot arm controller controls movement of the robot arm to damp or smooth movement of the robot arm, through the transition between the first state and the second state, indicated by trace 2355, to avoid sudden movement of the robot arm and said end effector. Such sudden movement could feed back to the boom, causing the boom to undergo reactive movement.

The switching between first and second states deals with applications that require the end effector to alternately be controlled relative to the machine structure and then the ground, for example to pick up a brick from part of the machine and then to lay a brick on a wall relative to the ground.

Figure 24:
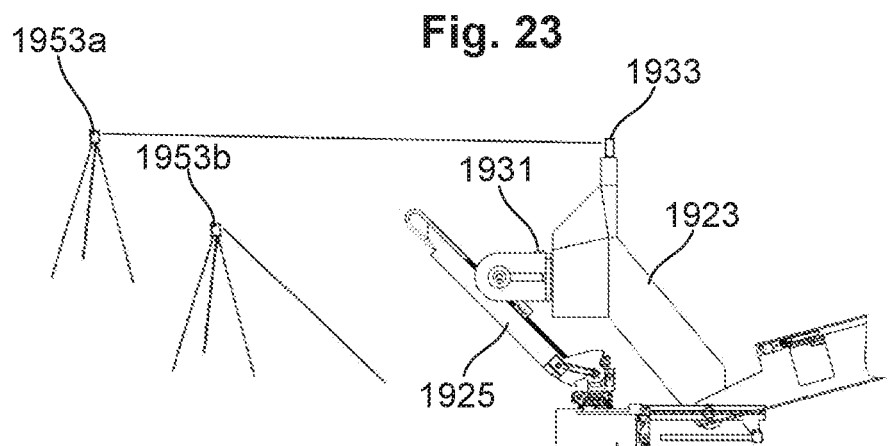
FIG. 24 is a view showing operation of an embodiment showing machine based second state operation.
Figure 25:
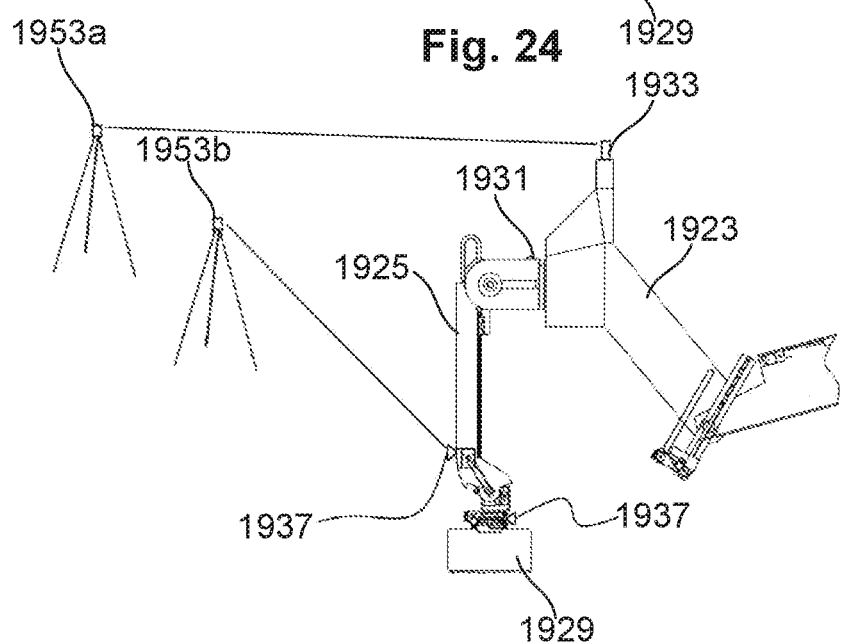
FIG. 25 is a view showing operation of the embodiment of FIG. 24 switched to ground based first state operation.

FIG. 24 shows the end effector 1927 picking up a brick from the end of the boom. In this configuration the control system is in the second state and the tracker system need only track the first target 1933. FIG. 25 shows the end effector 1927 about to lay the brick. In this configuration the control system is in the first state, and the tracker system must track the first target 1933 and the second target 1937. The control system transitions from the second state to the first state and vice versa in a slow manner, over a period of about a second, to damp the movement of the end effector.

If the compensation was turned on or off immediately, the pose of the compensating robot would have to change instantly, giving very large forces and disturbance to the boom. To overcome this problem, it is necessary for the compensation to be transitioned on or off or damped so that the amount of compensation is gradually increased or decreased to the required amount over a period of time, typically 0.2 to 0.5 seconds (or up to 10 seconds for large machines, or perhaps as low as in the order of milliseconds, up to 0.1 seconds for small machines). With a dynamic base coordinate system it is necessary to achieve the transitioning effect by moving the base coordinate system from its programmed position to the actual position over a period of time. It is important to check that the amount of compensation that will be applied is within the working range of the compensation robot.

This is done by checking that the pose of the robot will be within the working envelope. (If the calculated amount of compensation to be applied would move the end effector beyond its working range, or exceed the robot arm dynamic limits of jerk, acceleration, or velocity), if the actual position and orientation of the dynamic base coordinate system would place the robot in a pose beyond its working range of axis travel or the TCP outside of the working envelope of the robot arm, or exceed the end effectors dynamic limits of jerk, acceleration, or velocity the amount of shift of the base dynamic coordinate system from the programmed location to the actual location (or the application of the compensation amount), may be scaled back, or motion may be held until the system is returned to within its working range and/or a warning can be issued within the controller.

Dynamic compensation transitioning works by, incrementing if compensation is turning on, or decrementing if compensation is turning off, a transition factor between a value of 0 and 1, so that it S curve ramps over the desired period of time, then, for each control cycle:
Measure the actual 6dof coordinates of the tip tracker. Calculate the 6DOF coordinates of the actual coordinate system of the base of the fine robot
If the transition factor is 1, then use the actual coordinate system of the base of the fine robot as the dynamic coordinate system.
If the transition factor is not 1 then:
Determine the programmed position of the coordinate system of the base of the fine robot by considering the programmed position of the boom tip and adding the kinematic transformation to the base of the fine robot.
If the transition factor is 0, then use the programmed position of the coordinate system as the dynamic coordinate system.
If the transition factor is between 0 and 1 then:
Calculate a 6DOF delta vector from the programmed to the actual coordinate system of the base of the fine robot.
Scale the 6DOF vector by the transition factor to give a scaled vector
Add the scaled vector to the programmed position of the coordinate system to give the dynamic coordinate system.
Check the pose and dynamics to ensure that the fine robot is within its working range. Go to warning, hold or scaling algorithms.

If the transition factor is less than 1, increment the transition factor, preferably using an S curve formula.

Preferably said machine includes a tracker component mounted to said head, wherein said head has said robotic arm assembly with said end effector and said machine uses a tracker system to measure the position and orientation of the tracker component and uses said measurement to calculate the position and orientation of a base coordinate system for said robotic arm assembly. The robot arm end effector TCP is programmed to do tasks in either a coordinate system fixed to the head (equivalent to the robot base coordinate system RBCS above), or in a coordinate system fixed to a workpiece, fixed to the ground (equivalent to the environment coordinate system ECS above). The programming can shift between the head coordinate system or the workpiece coordinate system, which in one example is performed by transitioning, which will be explained below.

Transitioning to the dynamic base coordinate system involves moving the dynamic base coordinate system from a theoretical perfect position and orientation to an actual position and orientation (obtained by a measurement of the position and orientation of a tracker component fixed to the head), in a gradual and controlled way.

Transitioning from the dynamic base coordinate system involves moving the dynamic base coordinate system from an actual position and orientation (obtained by a measurement of the position and orientation of a tracker component fixed to the head), to the programmed (ie a theoretical) perfect position and orientation in a gradual and controlled way.

The most elegant mathematical approach to the arrangement is to have the boom TCP, tip tracker centre point and the dynamic coordinate system of the base of the robot arm coincident and aligned. In this way the kinematic transform set up in the boom CNC channel has its TCP coincident with the tip tracker centre point. The kinematic transform of the robot arm CNC channel has its dynamic base coordinate system coincident with the tip tracker.

Those skilled in the art will appreciate that the boom TCP could be at position different to the head base dynamic coordinate system and different to the tip tracker centre point and mathematical transforms can be used to calculate the theoretical perfect position of the robot arm base dynamic coordinate system. This is a more complicated and less elegant solution than that outlined above with coincident boom TCP, tip tracker CP and robot arm base dynamic coordinate system.

The control system uses a dynamic coordinate system offset or a plurality of dynamic coordinate system offsets to shift the base coordinate system of the robot arm in real time in the ground coordinate system. The control system then uses a kinematic transformation to calculate the required joint positions (angular or linear joints) to position the end effector at the programmed position in the ground coordinate system, rather than in the robot base co-ordinate system.

For large area tasks it may be necessary to move the vehicle relative to the ground. The vehicle movement relative to the ground may be automatically controlled or may be manually controlled within pre-calculated guidelines. In any case the location of the machine base is guided by either wheels or tracks, chains or rails or legs and feet and may not be very accurate. In this case, a multi stage control system is used, the first stage approximately positions the vehicle, the second stage positions a boom to a desired tip location and corrects at a slow rate any errors due to vehicle position and orientation and boom deflection and a third stage measures the position and orientation of a third stage robot arm base coordinate system and then precisely positions and compensates to stabilise and guide an end effector relative to the ground coordinate system. The number of stages of measurement and control may be extended to any plurality of control systems, dynamic coordinate systems and measurement systems. It is important for stability that the bandwidth of the control and the mechanical response speed of the motion systems increases from vehicle to end effector.

In some situations, it is necessary to stabilise the end effector relative to a moving object rather than the ground. Provided the relative position of the vehicle coordinate system and the tip tracker coordinate system is measured relative to the moving object coordinate system (or vis versa), compared to the vehicle, the moving object may be regarded as analogous to the ground, except that it is not an inertially fixed coordinate system. In this case, preferably a measurement to an inertially fixed coordinate system (eg earth or an INS, albeit a slowly rotating coordinate system) is also made to enable motion dynamic limits to be observed.

The control system can be used for tasks such as automated brick laying, precision mining, machining, robot assembly, painting and 3D printing. It has particular application for automated trenching for infrastructure pipelines, railway and road construction, automated pipe laying and for building long walls such as freeway sound wall.

The invention can be applied to airborne or seaborne equipment for applications such as dredging, seawall construction, oilfield and wind turbine maintenance, crew transfer, ship to ship transfer or air to air transfer or refuelling or helicopter powerline maintenance or helicopter logging.

The invention applies to multiple kinematic chains and multiple dynamic coordinate systems. The invention is particularly useful to stabilise, relative to the ground, an end effector, attached to a boom that is on a moving machine. When a machine moves, the acceleration of the machine imparts a dynamic force to the boom and the boom starts to oscillate at its natural frequency. Provided the compensating robot at the end of the boom has an amplitude larger than the amplitude of the boom motion, and a response much faster than the natural frequency of the boom (and vehicle), the compensating robot can correct for the boom motion due to bounce from the vehicle travel. The compensating robot does not have much range of motion so it is necessary to also correct the pose of the boom to keep the compensating robot within its available range of motion.

The actuation of the compensating robot imparts dynamic forces to the boom, which in turn further excite the boom. To minimise jerky motion of the boom, it is desirable for the boom to be rigid and free of mechanical play and backlash.

It is desirable for the (optional) moving vehicle to travel smoothly, so it is desirable for the ground it moves over to be graded and it is desirable for the vehicle to have suspension. Ideally the suspension is self-levelling. Optionally the vehicle may be fitted with a controllable blade so that it levels the ground before it drives over it. Optionally the end effector may be a blade or bucket and the machine may grade and level its own path prior to moving on to it.

To minimise jerky motion of the machine and the boom the control system of the vehicle of the machine is used to carefully control the motion. Preferably a mode of operation can be set when stabilised end effector operation is desired. The vehicle and boom motion is preferably jerk, acceleration and velocity limited. In an electro hydraulic control system, the electrical pilot system is controlled to limit the available control input. In a servo electric system, the servo dynamics are limited, preferably by the CNC channel and axis configuration. Preferably full CNC path planning is utilised rather than set point or point to point motion control. A full CNC path planner calculates path points for every control cycle (typically every ms). Preferably it calculates a path to optimise position, velocity, acceleration and jerk. A point to point control simply changes the set point to the desired end point, so that a large control feedback error value is created and the feedback control loop commands the motion to close the error.

The measurement of the vehicle position and orientation may be back calculated from the measurement of the 6DOF tip tracker (using the inverse kinematic chain of the boom, which of course will not take into account deflection or vibration of the boom, unless it was measured for example by accelerometers, but would typically have the tip tracker motion heavily filtered to smooth the vibration component of the motion). Preferably the vehicle position and orientation is provided by a position tracking device fitted to the vehicle of the machine, or a part of the machine near the vehicle, such as the cab on an excavator. The vehicle tracking device may have a relatively low data rate and low accuracy such as GPS or total station target but the best performance would be achieved with an accurate sensor system such as a laser tracker and smart track sensor.

The motion of the boom is controlled at a bandwidth significantly less than its natural frequency (1% to 10% or 10% to 20% or 30% to 50% or 50% to 99%) so as to slowly compensate for boom motion errors and deflection and base motion errors or movement. The controlled motion of the boom aims to correct the position of the tip of the boom, but not necessarily the boom tip orientation. The boom control and response may have a bandwidth of 0.1 to 1 Hz, or 1 Hz to 10 Hz or 10 Hz to 30 Hz. The end effector compensating robot must have a high natural frequency (relative to the boom and base) and a fast dynamic response. The compensating robot compensates and stabilises in 6 DOF. The measurement system of the tip tracker must have a high data rate, preferably at the same servo loop control rate as the end effector control system, a minimum of 250 Hz and preferably 1000 Hz or greater (perhaps 10 kHz). If the data rate is significantly lower, the dynamic coordinate system position and orientation (ultimately resulting in a compensation input) has step changes that may induce structural vibration as the system responds to the actuator force inputs. If the step changes are filtered to provide a smooth change, a delay and motion lag is introduced and the end effector position is not accurate and may oscillate relative to the ground.

A chain of dynamic coordinate systems and a machine with a chain of compensating booms and robotic compensating end effectors is useful in many applications requiring fine position and motion control over a large working volume.

Some example applications are given below:
Ship Transfer

Ship to ship, or ship to oil rig, or ship to gas rig, or ship to wind turbine, transfer of goods, liquids or personnel, is a potential application for the control system of the invention. It is known to stabilise a vessel for position holding. It is also known to roll stabilise a vessel with gyros or thrusters. It is known to yaw stabilise a vessel with thrusters. It is also known to provide heave, pitch, roll and yaw compensation to working devices such as booms.

However, it is known that for long booms in heavy sea states the existing methods of compensation have limitations. A coarse boom positioning and fine end effector positioning, or even additional stages of fine positioning would enable safer transfer, hook up, disconnection and operations in larger sea states and rougher weather.

Figure 27:
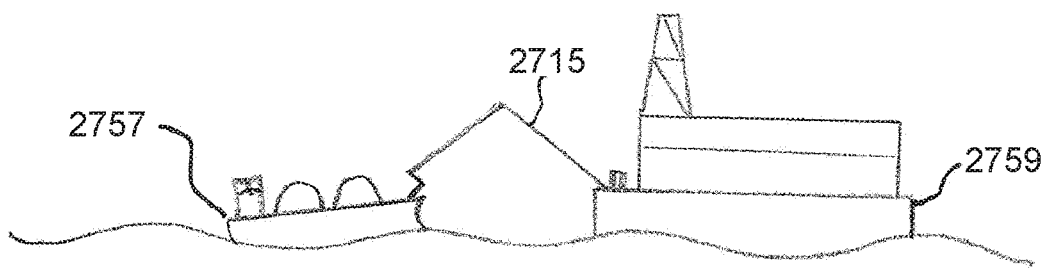
FIG. 27 is a side view showing use of a boom with a robotic arm mounted to an oil rig, in use to transfer items from a vessel subject to movement in ocean swell.
Figure 28:
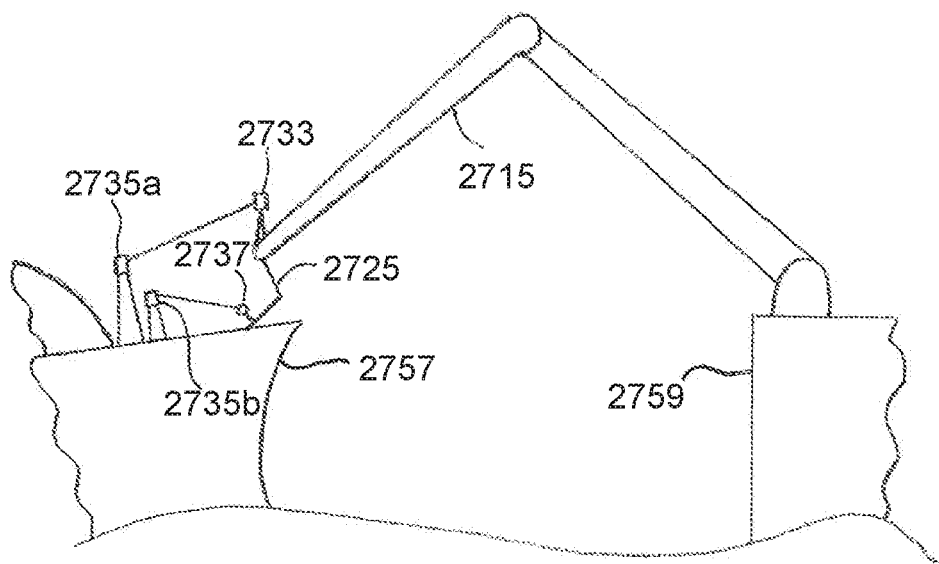
FIG. 28 is a view of detail of the embodiment illustrated in FIG. 27.

For example FIGS. 27 and 28 show a boom 2715 mounted on a FPSO 2759 (Floating, Production, Storage and Offloading vessel) transferring LNG to a LNG tanker 2757. The boom 2715 has a fine positioning arm 2725 which can approach close to or connect to the tanker. Trackers 2735a, 2735b measure the relative position of the boom tip 2733 and the tip 2737 of the fine positioning arm. If the fine positioning arm is connected or engaged with the tanker 2757, the control system is switched to a passive mode (ie no active control) so that the fine positioning arm now acts as a suspension system to absorb relative movement between the boom tip and the tanker.

Figure 29:
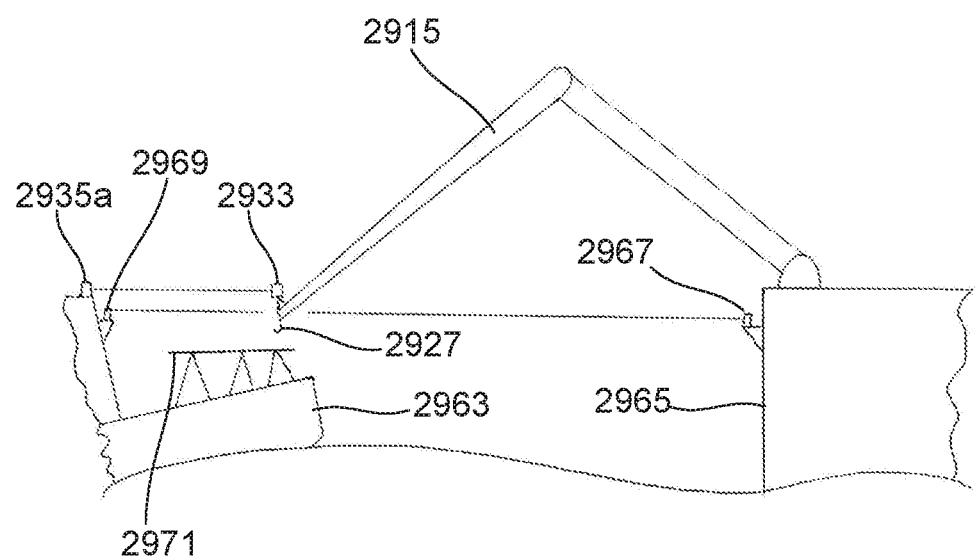
FIG. 29 is a view showing use of a boom with a robotic arm mounted to an oil rig, in use to transfer items from a supply vessel subject to movement in ocean swell.

Referring to FIG. 29, a platform stabilised in six degrees of freedom by a Stewart Platform 2971 on the deck of a supply vessel 2963, relative to an oil or gas rig 2965 or FPSO (Floating Production Storage and Offloading vessel), as illustrated, would enable much safer transfer of goods and personnel using the existing cranes on the rig or FPSO. Tracker 2967 on the rig 2965 tracks target 2969 on the vessel 2963, while tracker 2935a on the vessel tracks target 2933 at the end of the boom 2915. This data is fed to the control system located with the base of the boom on the rig via radio link as necessary to control the boom 2915 and end effector 2927 as discussed, and may also be fed back to assist to control the Stewart Platform 2971 on the deck of the vessel 2963. This provides a particularly significant operating advantage for handling large and expensive items. Currently when sea state reaches a limit, transfers have to be stopped.

This could have great benefit for petrochemical, renewable energy and military operators (and others) that require or desire to transfer things from vessel to vessel or vessel to fixed objects in all weather conditions.

Long Building

Figure 26:
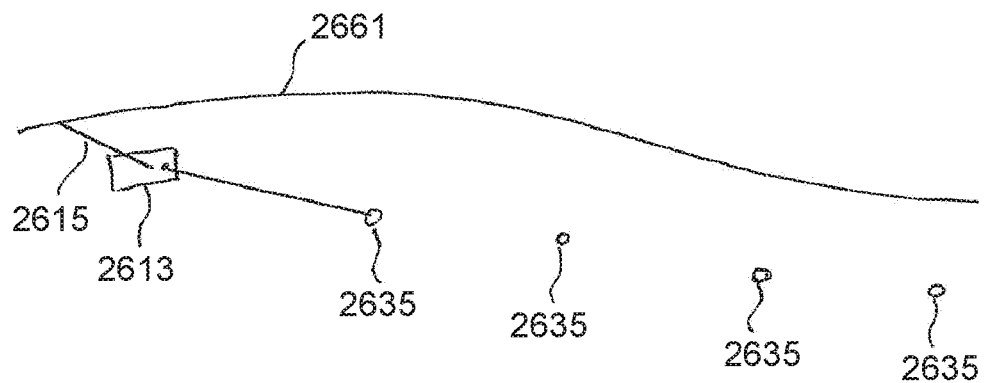
FIG. 26 is a top plan view showing use of an embodiment being a mobile block laying machine incorporating the control system of the invention, in use to build a sound proofing wall along a freeway/motorway.

Long structures such as road freeway sound walls can be built by the brick laying machine, as shown in FIG. 26. With traditional arrangements it is necessary to build from one location, then reposition periodically and build from the next stationary location. It would be advantageous to be able to build from a creeping machine. This would reduce lost time to reposition and would enable a smaller more compact machine with a shorter boom. A track mounted machine 2613 with a short boom 2615 would be ideal. Multiple fixed ground references 2635 are provided to facilitate this.

Long Trenching

Long trenches for infrastructure such as underground pipe lines and underground cables can be dug with known continuous trenching machines (such as made by Ditch Witch or Vermeer) or for larger cross section trenches with excavators (such as made by Caterpillar, Volvo, John Deere, Komatsu and others). For many applications the precise grade and location of the trench and pipe is important, such as for sewerage pipe. For many applications knowing the precise position is important, such as in cities to avoid damaging existing infrastructure such as pipes, cables, foundations and underground train and road tunnels. Current systems allow some control of the digging and provide feedback to the operator of dig depth or bucket position. In current system the base of the machine (the tracks) must be stationary.

The dynamic control system described allows precision digging to a tolerance that cannot be currently achieved by other methods. Further-more it allows pre-programmed digging for completely autonomous operation. Further-more it allows precision digging from a continuously moving machine such as a tracked excavator creeping along the path of the proposed trench.

Ground Contouring

It is known to use graders, bulldozers, loaders, gradall or automated screeding machines to smooth earth or concrete surfaces with blades or buckets. The inherent design of the machine will achieve a flatter surface than it moves over because the geometry of the machine provides a smoothing action. It is known that a more accurate and faster result can be achieved with automatic control to maintain the bucket or blade on a predefined level, grade or contour. The blade or bucket is moved up or down or tilted about a roll axis automatically to maintain a laser plane level or grade or to match a contour referenced by GPS or total station measurements. These known control systems have a low bandwidth and the machine achieves an accurate result because the inherent design of the machine will achieve a flatter surface than it drives over, even without machine guidance.

The present invention allows more complex machine arrangements such as a (modified) excavator, to be fitted with a multi axis controlled blade or bucket to achieve very complex earthmoving tasks in a completely programmable way.

Mining

It is known to use autonomous trucks for mining.

Excavators and face shovels are currently operated by machine operators. This technology enables autonomous control of excavators and face shovels by pre-programming the base movement (track base) and the dig program in mine coordinates.

Dredging

Excavators mounted on barges are used for dredging. Dredged channel depth, width, profile and location is extremely important for shipping safety. Dredging is expensive so it is advantageous to minimise the amount of spoil moved. The more accurate the dredging, the less spoil needs to be removed.

The barges are floating so as the excavator moves, the barge pitches and rolls and moves. Measuring the barge position and orientation in 6dof in real time enables the bucket position to be precisely calculated (via known sensors that measure the pose of the excavator), or even controlled to a set of pre-programmed dig locations.

Elevated Work Platforms

It is known to use various kinds of elevated work platforms (EWP) such as boom lifts or scissor lifts or vertical telescoping lifts made by manufacturers such as JLG, Snorkel and Genie. It is known that very tall boom lifts sway with a large amplitude and make work difficult, dangerous or impossible. The sway is the limiting factor for the height that boom lifts can work at. It is known that driving the boom lift or EWP with the platform up excites sway and makes the platform uncomfortable or dangerous. The present invention provides means to make a stabilised platform so that the platform is stabilised relative to the ground, or to a desired trajectory when the platform or EWP is moved.

Cable Suspended Robots

It is known to support a robot on a platform suspended by cables in tension supported by an overhead gantry or towers (see PAR Systems—Tensile Truss and Chernobyl Crane and demolition robot). The cables can support high loads but the structure has low stiffness. The lateral stiffness is very low. The accuracy of the positioning of the robot and end effector would be greatly improved by adding a tracking component to the suspended platform to provide a 6DOF position of the base of the robot arm. This would enable such a system to do accurate work, rather than the relatively inaccurate demolition work it is presently employed to do.

Very Accurate Applications

Such a system may include a galvo mirror to be used with a high power laser for laser cutting, laser engraving or 3D additive laser melting manufacture.

It will be appreciated that a wide range of other uses are also envisaged. For example, the system can be used to perform construction of multi-story and/or high-rise buildings. In this regard, the robot base can be supported by or remotely to the building during construction, with the system being used to compensate for movement of the robot base relative to the building, which might arise from wind loading of the building and/or the support system used to support the robot base.

The system could also be used with a wide range of additional vehicles to those mentioned above, such as space vehicles. In this example, the robot base could be mounted on the space vehicle, allowing this to be used to perform an interaction with another vehicle, for example to facilitate docking, satellite retrieval, or the like, or other objects, such as interaction with an asteroid or similar.

In one example, the system uses a cascading system of positioning devices, measurement systems and control channels. In one embodiment, a wide ranging inaccurate gross motion system guides a vehicle which supports a large area coarse positioning boom which then supports a small dynamic compensation and fine positioning robot which then in turn supports an even finer dynamic compensation and positioning mechanism.

In one example, the system describes dynamic coordinate systems and methods of moving machines and stabilising end effectors. In preferred embodiments, methods of transitioning compensation on and off, or damping transitioning are provided, so that the robot arm moving the end effector may work alternately in a head coordinate system and a ground or work coordinate system.

It is advantageous to code a kinematic transformation as a stand-alone piece of software. This means that the CNC kernel does not have to be modified to accommodate different kinematic chains. By using a dynamic coordinate system as the base of the end effector robot kinematic chain, the end effector can be programmed in a work coordinate system and all of the normal CNC coordinate shifts and transformations work, such as offsets for work coordinates and coordinate system rotation.

With a dynamic coordinate system for the base of the kinematic chain of the robot arm the concept of a compensation amount is abstract. If the base of the kinematic chain of the robot arm was at its programmed location there would be no compensation amount and the robot arm would be in a first pose. If the base is at its actual location and the robot arm was in the first pose, the end effector would be at the wrong location (and in the wrong orientation), the difference being the compensation amount.

In one example, there is provided a control system for an arm supported from an arm base, said arm having an end effector mounted therefrom, said end effector having a further arm supported by a further arm base and said further arm having a further end effector mounted thereon, said arm being moveable relative to said arm base by an arm controller interfaced with an arm actuator to position said end effector to a programmed location, said further arm being movable by a further arm controller interfaced with a further arm actuator to position said further end effector at a programmed position; said control system having a tracker system to track the position of a first target located by an offset proximal to said further arm base or end effector, and to track the position and orientation of a second target located with a TCP offset from said further end effector;

wherein said tracker system tracks the position of said first target and feeds data to said arm controller to operate said arm actuator with a slow dynamic response to dynamically position said first target close to said offset to position said further arm base close to said programmed location, and said tracker system tracks the position and orientation of said second target and feeds data to said further arm controller to operate said further arm actuator with a fast dynamic response to dynamically position and optionally orientate said second target to said TCP offset from said programmed position and optionally orientation. The TCP offset may be defined by position and optionally orientation data. The difference between the slow dynamic response and the fast dynamic response is inversely proportional to the potential inertia of the arm and the further arm. Where the further arm is much smaller than the arm, the further arm will possess less potential inertia and may be moved with a relatively fast dynamic response.

In one example, said second target is located with said TCP offset from said further end effector so as to move with movement and pose of said further end effector. In this case the TCP offset is defined by position and orientation data, and said tracker system measures the position and orientation of said second target.

By "close to" said programmed location, the further arm base is moved sufficiently close that the further end effector is within range of its programmed task, i.e. the further arm can move the further end effector to a position in order that the task the further end effector is to perform can be completed. By dynamically position and dynamically position and orientate, it is to be understood that as the position of the further arm base varies due to deflection, its position (and orientation if applicable, see hereinafter) is constantly under review and adjusted by the arm actuator with slow dynamic response, and the position and orientation of the further end effector is also constantly under review and adjusted by the further arm actuator with fast dynamic response.

In one example, said further arm base is mounted proximal to a remote end of said arm, away from said arm base.

In one example, said further arm base and said first target is mounted on a head, mounted to the remote end of the arm.

In one example, said head is pivotally mounted to the remote end of the arm.

In one example, said head is pivotally mounted about a horizontal axis to the remote end of the arm.

In one example, said tracker system tracks the position and orientation of said first target, and feeds data to said arm controller to operate said arm actuator with a slow dynamic response to position and orientate said first target close to said offset to position said further arm base close to said programmed location.

Where the head is pivotally mounted to the remote end of the arm, the poise of the head may be controlled by a separate controller to the arm controller, in which case the arm controller need only operate the arm actuator to position the first target along three orthogonal axes. However, control of the poise of the head may be integrated into the arm controller, in which case the position and orientation of the first target can be tracked.

Where the head is pivotally mounted to the remote end of the arm about a multi axis mechanism, the position and orientation of the first target can be tracked with six degrees of freedom. The position and orientation of the second target can be tracked with six degrees of freedom.

In one example, said tracker system includes separate target tracking devices for said first target and said second target.

In one example, said further arm controller may be controllably switched between a first state wherein said further arm controller is responsive to positioning feedback data derived from said tracker system, to a second state where pre-calibrated positioning data referenced to the further arm base (and hence the remote end of the arm) is relied on, and when switched between said first state and said second state, said further arm controller controls movement of said further arm to dampen movement of the further arm, to avoid sudden movement of said further arm and said further end effector. Such sudden movement could feed back to the arm, causing the arm to undergo reactive movement.

In one example, said arm base is provided with movement apparatus to move said arm base relative to the ground. The movement apparatus may be selected from a wheeled conveyance, incorporating locomotion or not, or self-powered endless tracks. The movement apparatus may incorporate self-levelling to level the arm base.

In one example, said arm base is mounted on an active suspension system, and said arm base incorporates a third target for said tracker system, said active suspension system having a suspension controller interfaced with a suspension actuator to control the position and orientation of said arm base in response to data from said tracker system reading the position and orientation of said third target.

Alternatively, said arm base is mounted to an object having larger inertia than said arm on an active suspension system, and said arm base incorporates a third target for said tracker system; said active suspension system having a suspension controller interfaced with a suspension actuator to control the position and orientation of said arm base relative to said object in response to data from said tracker system reading the position and orientation of said third target, said suspension actuator to control the position of said arm base with a slower dynamic response than said arm controller operates said arm actuator.

In another example, there is provided a control system for a boom supported from a boom base, said boom having a robot arm mounted by a robot base therefrom, said robot arm having an end effector, said boom being moveable relative to said boom base by a boom controller interfaced with a boom actuator to position said robot base to a programmed location, said robot arm being movable by a robot arm controller interfaced with a robot arm actuator to position said end effector at a programmed position and orientation; said control system having a tracker system to track the position of a first target located by an offset proximal to said robot base, and to track the position and orientation of a second target located with a TCP offset from said end effector TCP; wherein said tracker system tracks the position of said first target and feeds data to said boom controller to operate said boom actuator with a slow dynamic response to dynamically position said first target close to said offset to position said robot base close to said programmed location, and said tracker system tracks the position and orientation of said second target and feeds data to said robot arm controller to operate said robot arm actuator with a fast dynamic response to dynamically position and orientate said second target to said TCP offset from said programmed position and orientation. The TCP offset may be defined by position and orientation data.

In one example, said second target is located with said TCP offset from said end effector TCP so as to move with movement and pose of said end effector.

By "close to" said programmed location, the robot base is moved sufficiently close that the end effector is within range of its programmed task, i.e. the robot arm can move the end effector to a position in order that the task the end effector is to perform can be completed. By dynamically position and dynamically position and orientate, it is to be understood that as the position of the robot base varies due to deflection, its position (and orientation if applicable, see hereinafter) is constantly under review and adjusted by the boom actuator with slow dynamic response, and the position and orientation of the end effector is also constantly under review and adjusted by the robot arm actuator with fast dynamic response.

In one example, said robot base is mounted proximal to a remote end of said boom, away from said boom base.

In one example, said robot base and said first target is mounted on a head, mounted to the remote end of the boom.

In one example, said head is pivotally mounted to the remote end of the boom.

In one example, said head is pivotally mounted about a horizontal axis to the remote end of the boom.

In one example, said tracker system tracks the position and orientation of said first target, and feeds data to said boom controller to operate said boom actuator with a slow dynamic response to position and orientate said first target close to said offset to position said robot base close to said programmed location.

Where the head is pivotally mounted to the remote end of the boom, the poise of the head may be controlled by a separate controller to the boom controller, in which case the boom controller need only operate the boom actuator to position the first target along three orthogonal axes. However, control of the poise of the head may be integrated into the boom controller, in which case the position and orientation of the first target can be tracked.

Where the head is pivotally mounted to the remote end of the boom about a multi axis mechanism, the position and orientation of the first target can be tracked with six degrees of freedom. The position and orientation of the second target can be tracked with six degrees of freedom.

In one example, said tracker system includes separate target tracking devices for said first target and said second target.

In one example, said robot arm controller may be controllably switched between a first state wherein said robot arm controller is responsive to positioning feedback data derived from said tracker system, to a second state where pre-calibrated positioning data referenced to the robot base (and hence the remote end of the boom) is relied on, and when switched between said first state and said second state, said robot arm controller controls movement of said robot arm to dampen movement of the robot arm, to avoid sudden movement of said robot arm and said end effector. Such sudden movement could feed back to the boom, causing the boom to undergo reactive movement.

In one example, said boom base is provided with movement apparatus to move said boom base relative to the ground. The movement apparatus may be a vehicle selected from a wheeled conveyance, incorporating locomotion or not, or self-powered endless tracks. The movement apparatus may incorporate self-levelling to level the boom base. Such self-levelling should move the boom base to stabilise the boom base and hence the boom, against changes of position and orientation of the boom base, brought about by undulations in the ground over which the vehicle traverses.

In one example, said boom base is mounted on an active suspension system, and said boom base incorporates a third target for said tracker system, said active suspension system having a suspension controller interfaced with a suspension actuator to control the position and orientation of said boom base in response to data from said tracker system reading the position and orientation of said third target.

Alternatively, said boom base is mounted to an object having larger inertia than said boom on an active suspension system, and said boom base incorporates a third target for said tracker system; said active suspension system having a suspension controller interfaced with a suspension actuator to control the position and orientation of said boom base relative to said object in response to data from said tracker system reading the position and orientation of said third target, said suspension actuator to control the position of said boom base with a faster dynamic response than said boom controller operates said boom actuator.

The control system may include multiple tracker components at various positions on the machine so that a tracker (or multiple trackers) has or have line(s) of sight to one or more tracker components supported by the machine.

In one example, the control system of the machine includes algorithms to evaluate line of sight so that the best line of sight, between tracker and tracker component, in a particular pose can be chosen. The criteria for the best line of sight include, most accurate position and orientation solution (which may depend on the pose of the tracker or its sensor), field of view of the tracker or the sensor, distance to the end effector (closer is better), maintaining line of sight at all times during a programmed path or a critical operation.

In one example, said machine includes a further tracker component supported on said robotic arm, or on said end effector, and said machine uses a further tracker system to measure the position of the further tracker component and applies further compensating movement to the robotic arm assembly to correct for variance between programmed further tracker component position and measured further tracker component position.

The boom base may be a vehicle which may include a tracker component at a position on the vehicle or a plurality of tracker components at various positions on the vehicle. The tracker component(s) may be used to determine the position and orientation of the vehicle relative to a workspace coordinate system. The tracker component(s) may be used to determine the position and orientation of a vehicle for a moving vehicle. The tracker system may include multiple ground references to track the tracker targets as the vehicle progresses along a path.

The arrangements described above can achieve a high degree of dynamic motion quality and position tolerance over a large size of workspace. This results in smoother motion for end effectors located at the end of long booms or towers or supported on long cable trusses. The arrangements of the invention can smooth motion for an end effector supported by a long boom or tower supported by a moving vehicle.

Further details of the applicants technology are described in patent publications and co-pending applications U.S. Pat. No. 8,166,727, PCT/AU2008/001274, PCT/AU2008/001275, PCT/AU2017/050731, PCT/AU2017/050730, PCT/AU2017/050728, PCT/AU2017/050739, PCT/AU2017/050738, PCT/AU2018/050698, AU2017902625, AU2017903310, AU2017903312, AU2017904002 and AU2017904110, the contents of which are incorporated herein by cross reference.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers. As used herein and unless otherwise stated, the term "approximately" means±20%.

Persons skilled in the art will appreciate that numerous variations and modifications will become apparent. All such variations and modifications which become apparent to persons skilled in the art, should be considered to fall within the spirit and scope that the invention broadly appearing before described.

The claims defining the invention are as follows:

1. A system for performing interactions within a physical environment, the system including:
   a) a robot base that undergoes movement relative to the environment, the robot base being mounted on a boom extending from a boom base;
   b) a robot arm mounted to the robot base, the robot arm including an end effector mounted thereon;
   c) a tracking system that measures a robot base position indicative of a position of the robot base relative to the environment; and
   d) a control system that:
      i) acquires an indication of an end effector destination;
      ii) determines a reference robot base position, wherein the reference robot base position is:
         (1) a predicted robot base position based on movement of the robot base from a current robot base position; and/or
         (2) a predicted robot base position based on movement of the robot base along a robot base path;
      iii) calculates an end effector path extending to the end effector destination at least in part using the reference robot base position;
      iv) determines the current robot base position using signals from the tracking system;
      v) calculates a correction based on the current robot base position, the correction being indicative of a path modification, wherein the correction takes into account movement of the robot base relative to the environment that is at least one of:
         (1) unintentional movement, and
         (2) intentional movement;
      vi) generates robot control signals based on the end effector path and the correction;
      vii) applies the robot control signals to the robot arm to cause the end effector to be moved in accordance with the end effector path and the correction towards the destination; and
      viii) repeats steps (iv) to (vii) to move the end effector towards the end effector destination as the robot base moves relative to the environment.

2. The system according to claim 1, wherein the end effector destination is defined relative to an environment coordinate system and the control system:
   a) calculates a transformed end effector destination by transforming the end effector destination from the environment coordinate system to a robot base coordinate system at least in part using the reference robot base position; and
   b) calculates an end effector path extending to the transformed end effector destination in the robot base coordinate system.

3. The system according to claim 1, wherein the control system:
   a) determines an end effector position; and
   b) calculates the end effector path using the end effector position.

4. The system according to claim 3, wherein the control system determines the end effector position in a robot base coordinate system using robot arm kinematics.

5. The system according to claim 1, wherein the control system:
   a) calculates a robot base deviation based on the robot base position and an expected robot base position; and
   b) calculates the correction based on the robot base deviation.

6. The system according to claim 5, wherein the expected robot base position is based on at least one of:
   a) an initial robot base position;
   b) the reference robot base position; and
   c) a robot base path extending to the robot base reference position.

7. The system according to claim 1, wherein the correction is a vector indicative of movement in each of six degrees of freedom.

8. The system according to claim 1, wherein the control system scales the correction based on a relative distance of the current end effector position from the end effector destination.

9. The system according to claim 8, wherein the control system scales the correction using an S curve to progressively apply the correction.

10. The system according to claim 1, wherein the control system moves the end effector between first and second end effector destinations defined in a robot base coordinate system and an environment coordinate system respectively, and wherein the control system scales the correction based on a relative distance of the current end effector position from the first and second end effector destinations.

11. The system according to claim 10, wherein:
    a) no correction is applied when the current end effector position is proximate the first end effector destination; and
    b) full correction is applied when the current end effector position is proximate the second end effector destination.

12. The system according to claim 1, wherein the end effector destination includes an end effector pose, the tracking system measures a robot base pose and wherein the control system:
    a) determines a current robot base pose using signals from the tracking system; and
    b) calculates a correction based on the current robot base pose.

13. The system according to claim 12, wherein the control system:
    a) determines an end effector pose relative; and
    b) calculates the end effector path using the end effector pose at least in part using a reference robot base pose.

14. The system according to claim 1, wherein for an end effector path having a zero path length, the path modification returns the end effector to the end effector destination to thereby maintain the end effector static within an environment coordinate system.

15. The system according to claim 1, wherein for an end effector path having a non-zero path length, the path modification returns the end effector to the end effector path.

16. The system according to claim 1, wherein the robot base moves with a slower dynamic response and the end effector moves with a faster dynamic response to correct for movement of the robot base away from an expected robot base position.

17. A method for performing interactions within a physical environment using a system including:
- a) a robot base that undergoes movement relative to the environment, the robot base being mounted on a boom extending from a boom base;
- b) a robot arm mounted to the robot base, the robot arm including an end effector mounted thereon; and
- c) a tracking system that measures a robot base position indicative of a position of the robot base relative to the environment, and wherein the method includes, in a control system:
  - i) acquiring an indication of an end effector destination;
  - ii) determining a reference robot base position, wherein the reference robot base position is:
    - (1) a predicted robot base position based on movement of the robot base from a current robot base position; and/or
    - (2) a predicted robot base position based on movement of the robot base along a robot base path;
  - iii) calculating an end effector path extending to the end effector destination at least in part using the reference robot base position;
  - iv) determining the current robot base position using signals from the tracking system;
  - v) calculating a correction based on the current robot base position, the correction being indicative of a path modification, wherein the correction takes into account movement of the robot base relative to the environment that is at least one of:
    - (1) unintentional movement, and
    - (2) intentional movement;
  - vi) generating robot control signals based on the end effector path and the correction;
  - vii) applying the robot control signals to the robot arm to cause the end effector to be moved in accordance with the end effector path and the correction towards the destination; and
  - viii) repeating steps (iv) to (vii) as the robot base moves relative to the environment and until the end effector destination is reached.

18. A computer-implemented method that causes a system to perform interactions within a physical environment, the system including:
- a) a robot base that undergoes movement relative to the environment, the robot base being mounted on a boom extending from a boom base;
- b) a robot arm mounted to the robot base, the robot arm including an end effector mounted thereon; and
- c) a tracking system that measures a robot base position indicative of a position of the robot base relative to the environment and wherein the method includes, in a control system:
  - i) acquiring an indication of an end effector destination;
  - ii) determining a reference robot base position, wherein the reference robot base position is:
    - (1) a predicted robot base position based on movement of the robot base from a current robot base position; and/or
    - (2) a predicted robot base position based on movement of the robot base along robot base path;
  - iii) calculating an end effector path extending to the end effector destination at least in part using the reference robot base position;
  - iv) determining the current robot base position using signals from the tracking system;
  - v) calculating a correction based on the current robot base position, the correction being indicative of a path modification, wherein the correction takes into account movement of the robot base relative to the environment that is at least one of:
    - (1) unintentional movement, and
    - (2) intentional movement;
  - vi) generating robot control signals based on the end effector path and the correction;
  - vii) applying the robot control signals to the robot arm to cause the end effector to be moved in accordance with the end effector path and the correction towards the destination; and
  - viii) repeating steps (iv) to (vii) to move the end effector towards the end effector destination as the robot base moves relative to the environment.

* * * * *